United States Patent
Kazumura et al.

(10) Patent No.: US 12,541,084 B2
(45) Date of Patent: Feb. 3, 2026

(54) CALCULATION METHOD, CALCULATION DEVICE, AND CALCULATION PROGRAM

(71) Applicant: HAMAMATSU PHOTONICS K.K., Hamamatsu (JP)

(72) Inventors: Kimiko Kazumura, Hamamatsu (JP); Masaki Hattori, Hamamatsu (JP); Yukiko Hatano, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 714 days.

(21) Appl. No.: 17/987,121

(22) Filed: Nov. 15, 2022

(65) Prior Publication Data

US 2023/0168483 A1  Jun. 1, 2023

(30) Foreign Application Priority Data

Dec. 1, 2021 (JP) .................. 2021-195482

(51) Int. Cl.
   *G02B 21/00* (2006.01)
(52) U.S. Cl.
   CPC .................. *G02B 21/0076* (2013.01)
(58) Field of Classification Search
   CPC ........... G02B 21/0076; G01N 21/76; G01N 21/6408; G01N 21/01; G01N 21/6428; G01N 2021/0143; G01N 2201/129
   USPC ........................................ 359/385
   See application file for complete search history.

(56) References Cited

U.S. PATENT DOCUMENTS

| | | | |
|---|---|---|---|
| 2008/0154512 A1* | 6/2008 | Leong | C12Q 1/6851 435/6.16 |
| 2021/0090694 A1* | 3/2021 | Colley | G16B 30/00 |

FOREIGN PATENT DOCUMENTS

| | | |
|---|---|---|
| CN | 115876995 A | 3/2023 |
| JP | H02-025749 A | 1/1990 |
| JP | 2008-546412 A | 12/2008 |
| JP | 6285691 B2 | 2/2018 |
| JP | 2019-213464 A | 12/2019 |
| JP | 2020-115807 A | 8/2020 |
| JP | 2020-153864 A | 9/2020 |
| WO | 2007/002316 A2 | 1/2007 |

* cited by examiner

*Primary Examiner* — Balram T Parbadia
*Assistant Examiner* — Rahman Abdur
(74) *Attorney, Agent, or Firm* — Faegre Drinker Biddle & Reath LLP

(57) ABSTRACT

There is provided a calculation method of calculating a starting point $(X_s, Y_s)$ of signal rise from a fluorescence signal measured using a biological sample, wherein the fluorescence signal is time-series data including a dataset (measurement time, fluorescence intensity) of the fluorescence intensity for the measurement time and wherein the calculation method includes a process of calculating a temporary starting point $(X_{s'}, Y_{s'})$ and a process of calculating the starting point $(X_s, Y_s)$ of the signal rise on the basis of the temporary starting point $(X_{s'}, Y_{s'})$.

6 Claims, 24 Drawing Sheets

CALCULATION METHOD, CALCULATION DEVICE, AND CALCULATION PROGRAM

TECHNICAL FIELD

The present invention relates to a calculation method, a calculation device, and a calculation program. More specifically, the present invention relates to a calculation method, a calculation device, and a calculation program for calculating a starting point of signal rise and an increased signal intensity from a fluorescence or chemiluminescence signal acquired from a biological sample.

BACKGROUND

In order to evaluate a biological reaction, a reagent, which causes the biological reaction, is added to a biological sample and changes associated with the biological reaction are detected using fluorescence, chemiluminescence, or the like. For example, as a method of evaluating the activity of neutrophil cells, a method in which the myeloperoxidase activity or superoxide production activity of a biological sample to which a neutrophil stimulant is added is detected using fluorescence or chemiluminescence is known (for example, Patent Document 1 and Patent Document 2).

PATENT DOCUMENT

[Patent Document 1] Japanese Unexamined Patent Publication No. 2019-213464
[Patent Document 2] Japanese Patent No. 6285691

SUMMARY

When fluorescence, chemiluminescence, or the like is measured using a biological sample (for example, a sample containing whole blood disclosed in Patent Document 2), a signal associated with fluorescence, chemiluminescence, or the like that has been measured tends to be disturbed in addition to a low signal intensity due to an influence of impurities (for example, red blood cells and other impurities in the case of whole blood) contained in the biological sample. Thus, it is difficult to accurately ascertain a starting point of signal rise and an increased signal intensity and therefore it is difficult to calculate an accurate index (see FIGS. 18 and 19).

The present invention has been made to solve the above-mentioned problems. That is, an objective of the present invention is to provide a calculation method in which a starting point of signal rise and an increased signal intensity can be accurately calculated from a fluorescence or chemiluminescence signal acquired from a biological sample. Another objective of the present invention is to provide a calculation device and a calculation program for performing the calculation method.

According to the present invention, there is provided a calculation method of calculating a starting point $(X_s, Y_s)$ of signal rise from a fluorescence signal measured using a biological sample,
  wherein the fluorescence signal is time-series data including a dataset (measurement time, fluorescence intensity) of the fluorescence intensity for the measurement time,
  wherein the calculation method includes:
  a process of calculating a temporary starting point $(X_{s'}, Y_{s'})$; and
  a process of calculating the starting point $(X_s, Y_s)$ of the signal rise on the basis of the temporary starting point $(X_{s'}, Y_{s'})$,
  wherein the process of calculating the temporary starting point $(X_{s'}, Y_{s'})$ includes steps of:
  calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;
  calculating a right end $X_2$ value for which an approximate line of the fluorescence signal having the $X_1$ value at the left end has a highest inclination;
  calculating an approximate line $f_{max}(x)$ having a highest inclination among approximate lines of fluorescence signal data having the $X_2$ value at a right end;
  calculating an intersection between the approximate line $f_{mim}(x)$ and the approximate line $f_{max}(x)$ as a temporary criterion point $(X_{c'}, Y_{c'})$; and
  calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'},$
  wherein the process of calculating the starting point $(X_s, Y_s)$ includes steps of:
  calculating an approximate line $f_b(x)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;
  calculating an intersection between the approximate line $f_b(x)'$ and the approximate line $f_{max}(x)$ as a criterion point $(X_c, Y_c)$; and
  calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$, and
  wherein the starting point $(X_s, Y_s)$ is set as a starting point of signal rise.

According to the present invention, there is provided a calculation method of calculating an increased signal intensity from a fluorescence signal measured using a biological sample, the calculation method including:
  a process of calculating a starting point $(X_s, Y_s)$ of signal rise in the above-described calculation method of calculating the starting point $(X_s, Y_s)$ of the signal rise from the fluorescence signal measured using the biological sample; and
  a process of calculating an increased intensity of the fluorescence signal on the basis of the starting point $(X_s, Y_s)$,
  wherein the process of calculating the increased intensity of the fluorescence signal includes steps of:

calculating an average value Y of a fluorescence intensity from consecutive datasets of at least two points retroactively from an $X_s$ value of the starting point and calculating a horizontal line of the average value Y as a line Yline;

setting a point at which a fluorescence intensity of the fluorescence signal is highest as a peak point $(X_p, Y_p)$ and calculating a Y value at a peak point $X_p$ value on the line Yline as a $Y_l$ value;

calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;

calculating a Y value at a peak point $X_p$ value on the approximate line $f_b(x)$ as a $Y_b$ value; and calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal, and wherein the increased intensity (l) of the fluorescence signal or the increased intensity (b) of the fluorescence signal is set as the increased signal intensity.

According to the above-described calculation method of the present invention, a starting point of signal rise and an increased signal intensity can be accurately calculated from a fluorescence signal acquired from a biological sample.

Also, according to the present invention, there is provided a calculation method of calculating a starting point $(X_s, Y_s)$ of signal rise from a chemiluminescence signal measured using a biological sample, wherein the chemiluminescence signal is time-series data including a dataset (measurement time, chemiluminescence intensity) of the chemiluminescence intensity for the measurement time, wherein the calculation method includes:

a process of calculating a temporary starting point $(X_{s'}, Y_{s'})$;

a process of calculating an initial starting point $(X_s, Y_s)$ on the basis of the temporary starting point $(X_{s'}, Y_{s'})$;

a process of calculating a criterion point $(X_c, Y_c)$; and a process of calculating the starting point $(X_s, Y_s)$ from the initial starting point and the criterion point $(X_c, Y_c)$, wherein the process of calculating the temporary starting point $(X_{s'}, Y_{s'})$ includes steps of:

calculating a peak point $(X_p, Y_p)$ at which a chemiluminescence intensity is highest in a range after a timepoint when a reagent is added after the addition of the reagent, which causes a biological reaction, to the biological sample;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the process of calculating the initial starting point $(X_s, Y_s)$ includes steps of:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point $(X_s, Y_s)$, wherein the process of calculating the criterion point $(X_c, Y_c)$ includes steps of:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_c)$, wherein the process of calculating the starting point $(X_s, Y_s)$ is a process of:

calculating the initial starting point as the starting point $(X_s, Y_s)$ when a difference ($X_c$ value−$X_s$ value) between the $X_c$ value of the criterion point and the $X_s$ value of the initial starting point is less than a recalculated reference value; and calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value−$X_s$ value) between the $X_c$ value of the criterion point and the $X_s$ value of the initial starting point is greater than or equal to the recalculated reference value, and wherein the starting point $(X_s, Y_s)$ is set as a starting point of signal rise.

Also, according to the present invention, there is provided a calculation method of calculating an increased signal intensity from a chemiluminescence signal measured using a biological sample, the calculation method including:

a process of calculating a starting point $(X_s, Y_s)$ of signal rise in the above-described calculation method of calculating the starting point $(X_s, Y_s)$ of the signal rise from the chemiluminescence signal measured using the biological sample;

a process of calculating an end point $(X_e, Y_e)$; and a process of calculating an increased intensity of the chemiluminescence signal, wherein the process of calculating the end point $(X_e, Y_e)$ is a process of calculating an initial point included in a range in which a moving average calculated from consecutive datasets of at least two points is less than or equal to the line Yline consecutively at least twice after the $X_p$ value of the peak point as the end point $(X_e, Y_e)$, wherein the process of calculating the increased intensity of the chemiluminescence signal is a process of setting the line Yline as a baseline and calculating an integral value of a chemiluminescence intensity from an $X_s$ value of the starting point to an $X_e$ value of the end point, and wherein the integral value is set as the increased signal intensity.

According to the above-described calculation method of the present invention, a starting point of signal rise and an increased signal intensity can be accurately calculated from a chemiluminescence signal acquired from a biological sample.

Also, the present invention relates to a calculation device and a calculation program for use in the above-described calculation method. The calculation device and the calculation program according to the present invention are, for example, as follows.

There is provided a calculation device for calculating a starting point $(X_s, Y_s)$ of signal rise from a fluorescence signal measured using a biological sample, the calculation device including:

a data acquisition unit configured to acquire the fluorescence signal as time-series data including a dataset (measurement time, fluorescence intensity) of the fluorescence intensity for the measurement time;

a first calculation unit configured to calculate a temporary starting point $(X_{s'}, Y_{s'})$ by processing time-series data acquired by the data acquisition unit; and a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit, wherein the first calculation unit executes a process including:

calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;

calculating a right end $X_2$ value for which an approximate line of the fluorescence signal having the $X_1$ value at the left end has a highest inclination;

calculating an approximate line $f_{max}(x)$ having a highest inclination among approximate lines of fluorescence signal data having the $X_2$ value at a right end;

calculating an intersection between the approximate line $f_{min}(x)$ and the approximate line $f_{max}(x)$ as a temporary criterion point $(X_{c'}, Y_{c'})$; and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and wherein the second calculation unit executes a process including:

calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;

calculating an intersection between the approximate line $f_b(X)'$ and the approximate line $f_{max}(x)$ as a criterion point $(X_c, Y_c)$;

calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$; and setting the starting point $(X_s, Y_s)$ as a starting point of signal rise.

There is provided a calculation device for calculating an increased signal intensity from a fluorescence signal measured using a biological sample, the calculation device including:

in addition to the above-described calculation device for calculating the starting point $(X_s, Y_s)$ of the signal rise from the fluorescence signal, a third calculation unit configured to calculate an increased intensity of the fluorescence signal by processing data of the starting point $(X_s, Y_s)$ of the signal rise calculated by the second calculation unit and time-series data acquired by the data acquisition unit, wherein the third calculation unit executes a process including:

calculating an average value Y of a fluorescence intensity from consecutive datasets of at least two points retroactively from an $X_s$ value of the starting point and calculating a horizontal line of the average value Y as a line Yline;

setting a point at which a fluorescence intensity of the fluorescence signal is highest as a peak point $(X_p, Y_p)$ and calculating a Y value at a peak point $X_p$ value on the line Yline as a $Y_l$ value;

calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;

calculating a Y value at a peak point $X_p$ value on the approximate line $f_b(x)$ as a $Y_b$ value;

calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and setting the increased intensity (l) of the fluorescence signal or the increased intensity (b) of the fluorescence signal as the increased signal intensity.

There is provided a calculation program for calculating a starting point $(X_s, Y_s)$ of signal rise from a fluorescence signal measured using a biological sample, the calculation program causing a computer to function as:

a data acquisition unit configured to acquire the fluorescence signal as time-series data including a dataset (measurement time, fluorescence intensity) of the fluorescence intensity for the measurement time;

a first calculation unit configured to calculate a temporary starting point $(X_{s'}, Y_{s'})$ by processing time-series data acquired by the data acquisition unit; and a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit, wherein the first calculation unit executes a process including:

calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;

calculating a right end $X_2$ value for which an approximate line of the fluorescence signal having the $X_1$ value at the left end has a highest inclination;

calculating an approximate line $f_{max}(x)$ having a highest inclination among approximate lines of fluorescence signal data having the $X_2$ value at a right end;

calculating an intersection between the approximate line $f_{min}(x)$ and the approximate line $f_{max}(x)$ as a temporary criterion point $(X_{c'}, Y_{c'})$; and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and wherein the second calculation unit executes a process including:

calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;

calculating an intersection between the approximate line $f_b(X)'$ and the approximate line $f_{max}(x)$ as a criterion point $(X_c, Y_c)$;

calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$, and setting the starting point $(X_s, Y_s)$ as a starting point of signal rise.

There is provided a calculation program for calculating an increased signal intensity from a fluorescence signal measured using a biological sample, the calculation program causing a computer to function as:

in addition to the above-described calculation program for calculating the starting point $(X_s, Y_s)$ of the signal rise from the fluorescence signal, a third calculation unit configured to calculate an increased intensity of the fluorescence signal by processing data of the starting point $(X_s, Y_s)$ of the signal rise calculated by the second calculation unit and the time-series data acquired by the data acquisition unit, wherein the third calculation unit executes a process including:

calculating an average value Y of a fluorescence intensity from consecutive datasets of at least two points retroactively from an $X_s$ value of the starting point and calculating a horizontal line of the average value Y as a line Yline;

setting a point at which a fluorescence intensity of the fluorescence signal is highest as a peak point $(X_p, Y_p)$ and calculating a Y value at a peak point $X_p$ value on the line Yline as a $Y_l$ value;

calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;

calculating a Y value at a peak point $X_p$ value on the approximate line $f_b(x)$ as a $Y_b$ value;

calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and setting the increased intensity (l) of the fluorescence signal or the increased intensity (b) of the fluorescence signal as the increased signal intensity.

There is provided a calculation device for calculating a starting point $(X_s, Y_s)$ of signal rise from a chemiluminescence signal measured using a biological sample, the calculation device including:

a data acquisition unit configured to acquire the chemiluminescence signal as time-series data including a dataset (measurement time, chemiluminescence intensity) of the chemiluminescence intensity for the measurement time;

a first calculation unit configured to calculate a temporary starting point $(X_{s'}, Y_{s'})$ by processing time-series data acquired by the data acquisition unit;

a second calculation unit configured to calculate an initial starting point $(X_s, Y_s)$ by processing data of the temporary starting point $(X_{s'}, Y_{s'})$ calculated by the first calculation unit and the time-series data acquired by the data acquisition unit;

a third calculation unit configured to calculate a criterion point $(X_c, Y_c)$ by processing the time-series data acquired by the data acquisition unit; and a fourth calculation unit configured to calculate the starting point $(X_s, Y_s)$ by processing initial starting point data calculated by the second calculation unit, criterion point $(X_c, Y_c)$ data calculated by the third calculation unit, and the time-series data acquired by the data acquisition unit, wherein the first calculation unit executes a process including:

calculating a peak point $(X_p, Y_p)$ at which a chemiluminescence intensity is highest in a range after a timepoint when a reagent is added after the addition of the reagent, which causes a biological reaction, to the biological sample;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the second calculation unit executes a process including:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point $(X_s, Y_s)$, wherein the third calculation unit executes a process including:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_c)$, and wherein the fourth calculation unit executes a process including:

calculating the initial starting point as the starting point $(X_s, Y_s)$ when a difference ($X_c$ value–$X_s$ value) between the $X_c$ value of the criterion point and the $X_s$ value of the initial starting point is less than a recalculated reference value;

calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value–$X_s$ value) between the $X_c$ value of the criterion point and the $X_p$ value of the initial starting point is greater than or equal to the recalculated reference value; and setting the starting point $(X_s, Y_s)$ as a starting point of signal rise.

There is provided a calculation device for calculating an increased signal intensity from a chemiluminescence signal measured using a biological sample, the calculation device including:

in addition to the above-described calculation device for calculating the starting point $(X_s, Y_s)$ of the signal rise from the chemiluminescence signal, a fifth calculation unit configured to calculate an end point $(X_e, Y_e)$ by processing the time-series data acquired by the data acquisition unit; and a sixth calculation unit configured to calculate an increased intensity of the chemiluminescence signal by processing data of the starting point $(X_s, Y_s)$ of the signal rise calculated by the fourth calculation unit, data of the end point $(X_e, Y_e)$ calculated by the fifth calculation unit, and the time-series data acquired by the data acquisition unit, wherein the fifth calculation unit executes a process including calculating an initial point included in a range in which a moving average calculated from consecutive datasets of at least two points is less than or equal to the line Yline consecutively at least twice after the $X_p$ value of the peak point as the end point $(X_e, Y_e)$, and wherein the sixth calculation unit executes a process including setting the line Yline as a baseline, calculating an integral value of a chemiluminescence intensity from an $X_s$ value of the starting point to an $X_e$ value of the end point, and setting the integral value as the increased signal intensity.

There is provided a calculation program for calculating a starting point $(X_s, Y_s)$ of signal rise from a chemiluminescence signal measured using a biological sample, the calculation program causing a computer to function as:

a data acquisition unit configured to acquire the chemiluminescence signal as time-series data including a dataset (measurement time, chemiluminescence intensity) of the chemiluminescence intensity for the measurement time;

a first calculation unit configured to calculate a temporary starting point $(X_{s'}, Y_{s'})$ by processing time-series data acquired by the data acquisition unit;

a second calculation unit configured to calculate an initial starting point $(X_s, Y_s)$ by processing data of the temporary starting point $(X_{s'}, Y_{s'})$ calculated by the first calculation unit and the time-series data acquired by the data acquisition unit;

a third calculation unit configured to calculate a criterion point $(X_c, Y_c)$ by processing the time-series data acquired by the data acquisition unit; and a fourth calculation unit configured to calculate the starting point $(X_s, Y_s)$ by processing initial starting point data calculated by the second calculation unit, criterion point $(X_c, Y_c)$ data calculated by the third calculation unit, and the time-series data acquired by the data acquisition unit, wherein the first calculation unit executes a process including:

calculating a peak point $(X_p, Y_p)$ at which a chemiluminescence intensity is highest in a range after a timepoint when a reagent is added after the addition of the reagent, which causes a biological reaction, to the biological sample;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the second calculation unit executes a process including:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point ($X_s$, $Y_s$), wherein the third calculation unit executes a process including:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point ($X_c$, $Y_c$), and wherein the fourth calculation unit executes a process including:

calculating the initial starting point as the starting point ($X_s$, $Y_s$) when a difference ($X_c$ value–$X_s$ value) between the $X_c$ value of the criterion point and the $X_s$ value of the initial starting point is less than a recalculated reference value;

calculating an initial point at which an average value calculated for each of the consecutive datasets of at least two points is greater than or equal to a previous average value consecutively at least twice after an $X_s$ value of the initial starting point as the starting point ($X_s$, $Y_s$) when the difference ($X_c$ value–$X_s$ value) between the $X_c$ value of the criterion point and the $X_s$ value of the initial starting point is greater than or equal to the recalculated reference value; and setting the starting point ($X_s$, $Y_s$) as a starting point of signal rise.

There is provided a calculation program for calculating an increased signal intensity from a chemiluminescence signal measured using a biological sample, the calculation program causing a computer to function as:

in addition to the above-described calculation program for calculating the starting point ($X_s$, $Y_s$) of the signal rise from the chemiluminescence signal, a fifth calculation unit configured to calculate an end point ($X_c$, $Y_e$) by processing the time-series data acquired by the data acquisition unit; and a sixth calculation unit configured to calculate an increased intensity of the chemiluminescence signal by processing data of the starting point ($X_s$, $Y_s$) of the signal rise calculated by the fourth calculation unit, data of the end point ($X_c$, $Y_e$) calculated by the fifth calculation unit, and the time-series data acquired by the data acquisition unit, wherein the fifth calculation unit executes a process including calculating an initial point included in a range in which a moving average calculated from consecutive datasets of at least two points is less than or equal to the line Yline consecutively at least twice after the $X_p$ value of the peak point as the end point ($X_c$, $Y_e$), and wherein the sixth calculation unit executes a process including setting the line Yline as a baseline, calculating an integral value of a chemiluminescence intensity from an $X_p$ value of the starting point to an $X_e$ value of the end point, and setting the integral value as the increased signal intensity.

One aspect of the present invention relates to the following inentions (1) to (12).

(1) A calculation method of calculating a starting point ($X_s$, $Y_s$) of signal rise from a fluorescence signal measured using a biological sample, wherein the fluorescence signal is time-series data including a dataset (measurement time, fluorescence intensity) of the fluorescence intensity for the measurement time, wherein the calculation method includes:

a process of calculating a temporary starting point ($X_{s'}$, $Y_{s'}$); and a process of calculating the starting point ($X_s$, $Y_s$) of the signal rise on the basis of the temporary starting point ($X_{s'}$, $Y_{s'}$), wherein the process of calculating the temporary starting point ($X_{s'}$, $Y_{s'}$) includes steps of:

calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;

calculating a right end $X_2$ value for which an approximate line of the fluorescence signal having the $X_1$ value at the left end has a highest inclination;

calculating an approximate line $f_{max}(x)$ having a highest inclination among approximate lines of fluorescence signal data having the $X_2$ value at a right end;

calculating an intersection between the approximate line $f_{min}(x)$ and the approximate line $f_{max}(x)$ as a temporary criterion point ($X_{c'}$, $Y_{c'}$); and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point ($X_{s'}$, $Y_{s'}$), wherein the process of calculating the starting point ($X_s$, $Y_s$) includes steps of:

calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;

calculating an intersection between the approximate line $f_b(X)'$ and the approximate line $f_{max}(x)$ as a criterion point ($X_c$, $Y_c$); and calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point ($X_s$, $Y_s$), and wherein the starting point $(X_s, Y_s)$ is set as a starting point of signal rise.

(2) A calculation device for calculating a starting point $(X_s, Y_s)$ of signal rise from a fluorescence signal measured using a biological sample, the calculation device comprising:
  a data acquisition unit configured to acquire the fluorescence signal as time-series data including a dataset (measurement time, fluorescence intensity) of the fluorescence intensity for the measurement time;
  a first calculation unit configured to calculate a temporary starting point $(X_{s'}, Y_{s'})$ by processing time-series data acquired by the data acquisition unit; and
  a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit,
  wherein the first calculation unit executes a process including:
  calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;
  calculating a right end $X_2$ value for which an approximate line of the fluorescence signal having the $X_1$ value at the left end has a highest inclination;
  calculating an approximate line $f_{max}(x)$ having a highest inclination among approximate lines of fluorescence signal data having the $X_2$ value at a right end;
  calculating an intersection between the approximate line $f_{min}(x)$ and the approximate line $f_{max}(x)$ as a temporary criterion point $(X_{c'}, Y_{c'})$; and
  calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and
  wherein the second calculation unit executes a process including:
  calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;
  calculating an intersection between the approximate line $f_b(X)'$ and the approximate line $f_{max}(x)$ as a criterion point $(X_c, Y_c)$;
  calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$; and setting the starting point $(X_s, Y_s)$ as a starting point of signal rise.

(3) A calculation program for calculating a starting point $(X_s, Y_s)$ of signal rise from a fluorescence signal measured using a biological sample, the calculation program causing a computer to function as:
  a data acquisition unit configured to acquire the fluorescence signal as time-series data including a dataset (measurement time, fluorescence intensity) of the fluorescence intensity for the measurement time;
  a first calculation unit configured to calculate a temporary starting point $(X_{s'}, Y_{s'})$ by processing time-series data acquired by the data acquisition unit; and
  a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit,
  wherein the first calculation unit executes a process including:
  calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;
  calculating a right end $X_2$ value for which an approximate line of the fluorescence signal having the $X_1$ value at the left end has a highest inclination;
  calculating an approximate line $f_{max}(x)$ having a highest inclination among approximate lines of fluorescence signal data having the $X_2$ value at a right end;
  calculating an intersection between the approximate line $f_{min}(x)$ and the approximate line $f_{max}(x)$ as a temporary criterion point $(X_{c'}, Y_{c'})$; and
  calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and
  wherein the second calculation unit executes a process including:
  calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;
  calculating an intersection between the approximate line $f_b(X)'$ and the approximate line $f_{max}(x)$ as a criterion point $(X_c, Y_c)$;
  calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$, and setting the starting point ($X_s$, $Y_s$) as a starting point of signal rise.

(4) A calculation method of calculating an increased signal intensity from a fluorescence signal measured using a biological sample, the calculation method comprising:
- a process of calculating a starting point ($X_s$, $Y_s$) of signal rise in the calculation method according to (1); and
- a process of calculating an increased intensity of the fluorescence signal on the basis of the starting point ($X_s$, $Y_s$),
wherein the process of calculating the increased intensity of the fluorescence signal includes steps of:
- calculating an average value Y of a fluorescence intensity from consecutive datasets of at least two points retroactively from an $X_s$ value of the starting point and calculating a horizontal line of the average value Y as a line Yline;
- setting a point at which a fluorescence intensity of the fluorescence signal is highest as a peak point ($X_p$, $Y_p$) and calculating a Y value at a peak point $X_p$ value on the line Yline as a $Y_l$ value;
- calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;
- calculating a Y value at a peak point $X_p$ value on the approximate line $f_b(x)$ as a $Y_b$ value; and
- calculating a difference between a peak point $Y_p$ value and the $Y_1$ value as an increased intensity (l) of the fluorescence signal or calculating a difference between the peak point $Y_p$ value and the $Y_b$ value as an increased intensity (b) of the fluorescence signal, and
wherein the increased intensity (l) of the fluorescence signal or the increased intensity (b) of the fluorescence signal is set as the increased signal intensity.

(5) A calculation device for calculating an increased signal intensity from a fluorescence signal measured using a biological sample, the calculation device comprising:
- in addition to the calculation device according to (2), a third calculation unit configured to calculate an increased intensity of the fluorescence signal by processing data of the starting point ($X_s$, $Y_s$) of the signal rise calculated by the second calculation unit and time-series data acquired by the data acquisition unit,
wherein the third calculation unit executes a process including:
- calculating an average value Y of a fluorescence intensity from consecutive datasets of at least two points retroactively from an $X_s$ value of the starting point and calculating a horizontal line of the average value Y as a line Yline;
- setting a point at which a fluorescence intensity of the fluorescence signal is highest as a peak point ($X_p$, $Y_p$) and calculating a Y value at a peak point $X_p$ value on the line Yline as a $Y_l$ value;
- calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;
- calculating a Y value at a peak point $X_p$ value on the approximate line $f_b(x)$ as a $Y_b$ value; and
- calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and
- setting the increased intensity (l) of the fluorescence signal or the increased intensity (b) of the fluorescence signal as the increased signal intensity.

(6) A calculation program for calculating an increased signal intensity from a fluorescence signal measured using a biological sample, the calculation program causing a computer to function as:
- in addition to the calculation program according to (3), a third calculation unit configured to calculate an increased intensity of the fluorescence signal by processing data of the starting point ($X_s$, $Y_s$) of the signal rise calculated by the second calculation unit and the time-series data acquired by the data acquisition unit,
wherein the third calculation unit executes a process including:
- calculating an average value Y of a fluorescence intensity from consecutive datasets of at least two points retroactively from an $X_s$ value of the starting point and calculating a horizontal line of the average value Y as a line Yline;
- setting a point at which a fluorescence intensity of the fluorescence signal is highest as a peak point ($X_p$, $Y_p$) and calculating a Y value at a peak point $X_p$ value on the line Yline as a $Y_l$ value;
- calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;
- calculating a Y value at a peak point $X_p$ value on the approximate line $f_b(x)$ as a $Y_b$ value;
- calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and
- setting the increased intensity (l) of the fluorescence signal or the increased intensity (b) of the fluorescence signal as the increased signal intensity.

(7) A calculation method of calculating a starting point ($X_s$, $Y_s$) of signal rise from a chemiluminescence signal measured using a biological sample,
wherein the chemiluminescence signal is time-series data including a dataset (measurement time, chemiluminescence intensity) of the chemiluminescence intensity for the measurement time,
wherein the calculation method includes:
- a process of calculating a temporary starting point ($X_{s'}$, $Y_{s'}$);
- a process of calculating an initial starting point ($X_s$, $Y_s$) on the basis of the temporary starting point ($X_{s'}$, $Y_{s'}$);
- a process of calculating a criterion point ($X_c$, $Y_c$); and a process of calculating the starting point ($X_s$, $Y_s$) from the initial starting point and the criterion point ($X_c$, $Y_c$),
wherein the process of calculating the temporary starting point ($X_{s'}$, $Y_{s'}$) includes steps of:
- calculating a peak point ($X_p$, $Y_p$) at which a chemiluminescence intensity is highest in a range after a timepoint when a reagent is added after the addition of the reagent, which causes a biological reaction, to the biological sample;
- calculating a bottom point ($X_b$, $Y_b$) at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the process of calculating the initial starting point $(X_s, Y_s)$ includes steps of:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point $(X_s, Y_s)$, wherein the process of calculating the criterion point $(X_c, Y_c)$ includes steps of:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{min}(x)$ and the line Yline as the criterion point $(X_c, Y_e)$, wherein the process of calculating the starting point $(X_s, Y_s)$ is a process of:

calculating the initial starting point as the starting point $(X_s, Y_s)$ when a difference ($X_c$ value–$X_s$ value) between the $X_c$ value of the criterion point and the $X_s$ value of the initial starting point is less than a recalculated reference value; and calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value–$X_s$ value) between the $X_c$ value of the criterion point and the $X_s$ value of the initial starting point is greater than or equal to the recalculated reference value, and wherein the starting point $(X_s, Y_s)$ is set as a starting point of signal rise.

(8) A calculation device for calculating a starting point $(X_s, Y_s)$ of signal rise from a chemiluminescence signal measured using a biological sample, the calculation device comprising:

a data acquisition unit configured to acquire the chemiluminescence signal as time-series data including a dataset (measurement time, chemiluminescence intensity) of the chemiluminescence intensity for the measurement time;

a first calculation unit configured to calculate a temporary starting point $(X_{s'}, Y_{s'})$ by processing time-series data acquired by the data acquisition unit;

a second calculation unit configured to calculate an initial starting point $(X_s, Y_s)$ by processing data of the temporary starting point $(X_{s'}, Y_{s'})$ calculated by the first calculation unit and the time-series data acquired by the data acquisition unit;

a third calculation unit configured to calculate a criterion point $(X_c, Y_c)$ by processing the time-series data acquired by the data acquisition unit; and a fourth calculation unit configured to calculate the starting point $(X_s, Y_s)$ by processing initial starting point data calculated by the second calculation unit, criterion point $(X_c, Y_c)$ data calculated by the third calculation unit, and the time-series data acquired by the data acquisition unit, wherein the first calculation unit executes a process including:

calculating a peak point $(X_p, Y_p)$ at which a chemiluminescence intensity is highest in a range after a timepoint when a reagent is added after the addition of the reagent, which causes a biological reaction, to the biological sample;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the second calculation unit executes a process including:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point $(X_s, Y_s)$, wherein the third calculation unit executes a process including:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_e)$, and wherein the fourth calculation unit executes a process including:

calculating the initial starting point as the starting point $(X_s, Y_s)$ when a difference ($X_c$ value–$X_s$ value) between the $X_c$ value of the criterion point and the $X_s$ value of the initial starting point is less than a recalculated reference value;

calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value–$X_s$ value) between the $X_c$ value of the criterion point and the $X_s$ value of the initial starting point is greater than or equal to the recalculated reference value; and setting the starting point $(X_s, Y_s)$ as a starting point of signal rise.

(9) A calculation program for calculating a starting point $(X_s, Y_s)$ of signal rise from a chemiluminescence signal measured using a biological sample, the calculation program causing a computer to function as:

a data acquisition unit configured to acquire the chemiluminescence signal as time-series data including a dataset (measurement time, chemiluminescence intensity) of the chemiluminescence intensity for the measurement time;

a first calculation unit configured to calculate a temporary starting point $(X_{s'}, Y_{s'})$ by processing time-series data acquired by the data acquisition unit;

a second calculation unit configured to calculate an initial starting point $(X_s, Y_s)$ by processing data of the temporary starting point $(X_{s'}, Y_{s'})$ calculated by the first calculation unit and the time-series data acquired by the data acquisition unit;

a third calculation unit configured to calculate a criterion point $(X_c, Y_c)$ by processing the time-series data acquired by the data acquisition unit; and a fourth calculation unit configured to calculate the starting point $(X_s, Y_s)$ by processing initial starting point data calculated by the second calculation unit, criterion point $(X_c, Y_c)$ data calculated by the third calculation unit, and the time-series data acquired by the data acquisition unit, wherein the first calculation unit executes a process including:

calculating a peak point $(X_p, Y_p)$ at which a chemiluminescence intensity is highest in a range after a timepoint when a reagent is added after the addition of the reagent, which causes a biological reaction, to the biological sample;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$, wherein the second calculation unit executes a process including:

calculating an average value Y of the chemiluminescence intensity from consecutive datasets of at least two points retroactively from an $X_{s'}$ value of the temporary starting point and calculating a horizontal line of the average value Y as a line Yline; and calculating an initial point included in a range including a value obtained through addition between the average value Y and standard deviation or less retroactively from the $X_p$ value of the peak point as the initial starting point $(X_s, Y_s)$, wherein the third calculation unit executes a process including:

calculating a left end $X_1$ value at which an approximate line of the chemiluminescence signal having the $X_p$ value of the peak point at a right end has a highest inclination;

calculating a right end $X_2$ value at which an approximate line of the chemiluminescence signal having the $X_1$ value at a left end has a highest inclination within a range up to the $X_p$ value of the peak point;

calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_c)$, and wherein the fourth calculation unit executes a process including:

calculating the initial starting point as the starting point $(X_s, Y_s)$ when a difference ($X_c$ value–$X_s$ value) between the $X_c$ value of the criterion point and the $X_s$ value of the initial starting point is less than a recalculated reference value;

calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value–$X_s$ value) between the $X_c$ value of the criterion point and the $X_s$ value of the initial starting point is greater than or equal to the recalculated reference value; and setting the starting point $(X_s, Y_s)$ as a starting point of signal rise.

(10) A calculation method of calculating an increased signal intensity from a chemiluminescence signal measured using a biological sample, the calculation method comprising:

a process of calculating a starting point $(X_s, Y_s)$ of signal rise in the calculation method according to (7);

a process of calculating an end point $(X_e, Y_e)$; and a process of calculating an increased intensity of the chemiluminescence signal, wherein the process of calculating the end point $(X_e, Y_e)$ is a process of calculating an initial point included in a range in which a moving average calculated from consecutive datasets of at least two points is less than or equal to the line Yline consecutively at least twice after the $X_p$ value of the peak point as the end point $(X_e, Y_e)$, wherein the process of calculating the increased intensity of the chemiluminescence signal is a process of setting the line Yline as a baseline and calculating an integral value of a chemiluminescence intensity from an $X_s$ value of the starting point to an $X_e$ value of the end point, and wherein the integral value is set as the increased signal intensity.

(11) A calculation device for calculating an increased signal intensity from a chemiluminescence signal measured using a biological sample, the calculation device comprising:
in addition to the calculation device according to (8),
a fifth calculation unit configured to calculate an end point $(X_e, Y_e)$ by processing the time-series data acquired by the data acquisition unit; and
a sixth calculation unit configured to calculate an increased intensity of the chemiluminescence signal by processing data of the starting point $(X_s, Y_s)$ of the signal rise calculated by the fourth calculation unit, data of the end point $(X_e, Y_e)$ calculated by the fifth calculation unit, and the time-series data acquired by the data acquisition unit,
wherein the fifth calculation unit executes a process including calculating an initial point included in a range in which a moving average calculated from consecutive datasets of at least two points is less than or equal to the line Yline consecutively at least twice after the $X_p$ value of the peak point as the end point $(X_e, Y_e)$, and
wherein the sixth calculation unit executes a process including setting the line Yline as a baseline, calculating an integral value of a chemiluminescence intensity from an $X_s$ value of the starting point to an $X_e$ value of the end point, and setting the integral value as the increased signal intensity.

(12) A calculation program for calculating an increased signal intensity from a chemiluminescence signal measured using a biological sample, the calculation program causing a computer to function as:
in addition to the calculation program according to (9),
a fifth calculation unit configured to calculate an end point $(X_e, Y_e)$ by processing the time-series data acquired by the data acquisition unit; and
a sixth calculation unit configured to calculate an increased intensity of the chemiluminescence signal by processing data of the starting point $(X_s, Y_s)$ of the signal rise calculated by the fourth calculation unit, data of the end point $(X_e, Y_e)$ calculated by the fifth calculation unit, and the time-series data acquired by the data acquisition unit,
wherein the fifth calculation unit executes a process including calculating an initial point included in a range in which a moving average calculated from consecutive datasets of at least two points is less than or equal to the line Yline consecutively at least twice after the $X_p$ value of the peak point as the end point $(X_e, Y_e)$, and
wherein the sixth calculation unit executes a process including setting the line Yline as a baseline, calculating an integral value of a chemiluminescence intensity from an $X_s$ value of the starting point to an $X_e$ value of the end point, and setting the integral value as the increased signal intensity.

According to the present invention, it is possible to provide a calculation method of accurately calculating a starting point of signal rise and an increased signal intensity from a fluorescence or chemiluminescence signal acquired from a biological sample. Also, according to the present invention, it is possible to provide a calculation device and a calculation program for performing the calculation method.

BRIEF DESCRIPTION OF THE DRAWINGS

FIG. 21-1 is a graph showing an example of fluorescence and chemiluminescence signals measured using a sample containing whole blood.

FIG. 21-2 is a graph showing an example of fluorescence and chemiluminescence signals measured using a sample containing whole blood.

FIG. 22-1 is a graph showing an example of fluorescence and chemiluminescence signals measured using a sample containing whole blood.

FIG. 22-2 is a graph showing an example of fluorescence and chemiluminescence signals measured using a sample containing whole blood.

DETAILED DESCRIPTION

Embodiments for carrying out the present invention will be described in detail below. However, the present invention is not limited to the following embodiments.

[Method of Calculating Starting Point of Signal Rise and Increased Signal Intensity from Fluorescence Signal]

A method of calculating a starting point of signal rise and an increased signal intensity from a fluorescence signal according to the present embodiment includes calculating the starting point of the signal rise from the fluorescence signal measured using a biological sample and calculating the increased signal intensity on the basis of the calculated starting point of the signal rise. The former can be ascertained independently as a calculation method of calculating a starting point of signal rise from a fluorescence signal measured using a biological sample.

Figure 3:
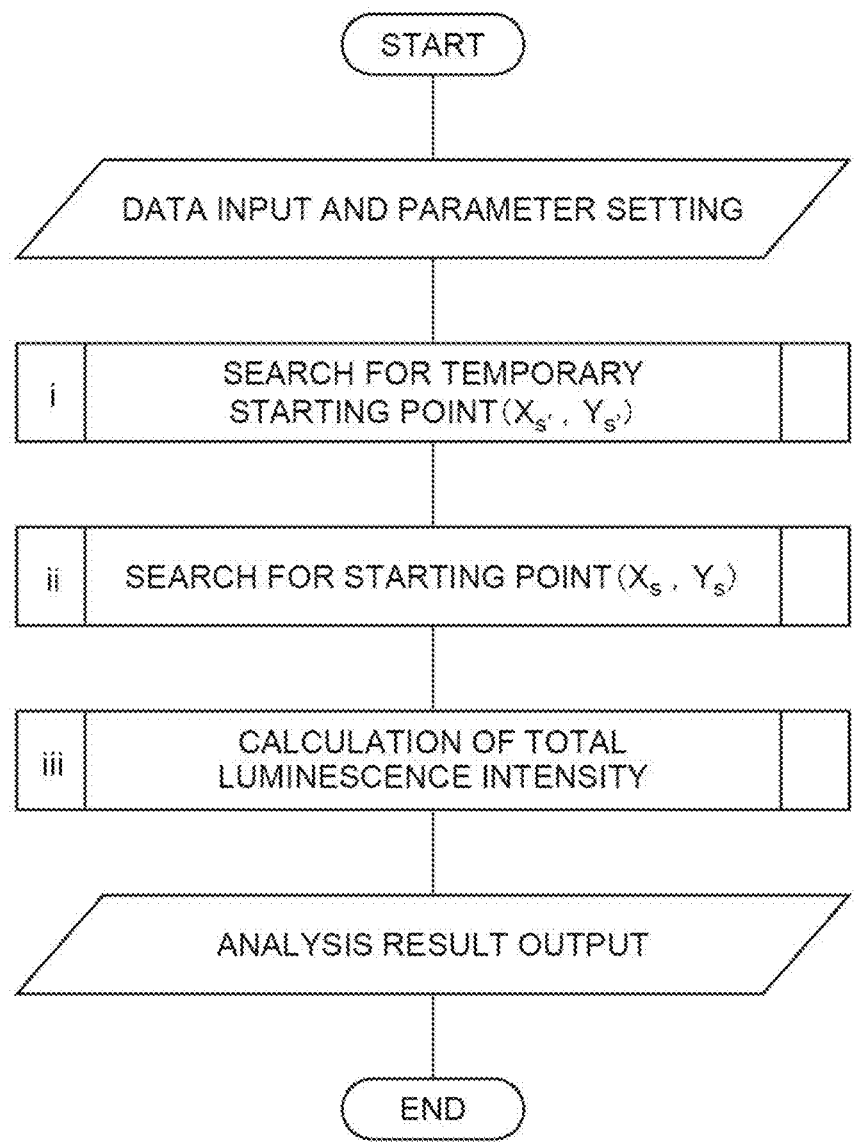
FIG. 3 is a flowchart showing a method of calculating a starting point of signal rise and an increased signal intensity from a fluorescence signal according to the embodiment.

FIG. 3 is a flowchart showing the method of calculating the starting point of the signal rise and the increased signal intensity from the fluorescence signal according to the embodiment. The method of calculating the starting point of the signal rise and the increased signal intensity from the fluorescence signal according to the embodiment includes a process of searching for (calculating) a temporary starting point $(X_{s'}, Y_{s'})$, a process of searching for (calculating) a starting point $(X_s, Y_s)$ of the signal rise, and a process of calculating an increased intensity (a total luminescence intensity) of the fluorescence signal.

The fluorescence signal that is the target of the calculation method according to the present embodiment is time-series data including a dataset (X, Y) (=(measurement time, fluorescence intensity)) of the fluorescence intensity for the measurement time.

The present invention is not particularly limited as long as the fluorescence signal serving as the target of the calculation method according to the present embodiment is a fluorescence signal measured by adding a reagent, which causes a biological reaction, to a biological sample and detecting a change associated with the biological reaction with a fluorescent reagent or the like. Specific examples of the fluorescence signal include, for example, a fluorescence signal measured by adding a neutrophil stimulant (for example, formyl-methionyl-leucyl-phenylalanine, phorbol 12-myristate 13-acetate, or opsonized zymosan) to a biological sample containing neutrophil cells (for example, a sample containing whole blood) and detecting an increase in production of hypochlorous acid (or its halogen equivalent) associated with the activation of myeloperoxidase with a fluorescent reagent (for example, aminophenyl fluorescein).

For the fluorescence signal, for example, a fluorescence signal measured using a known fluorescence measurement device such as a fluorescence photometer, a fluorescence lifespan photometer, or a device for simultaneously measuring fluorescence and luminescence can be used without any limitation. A fluorescence excitation wavelength and observation wavelength may be appropriately set in accordance with fluorescence serving as a measurement target and the calculation method according to the present embodiment can be applied to any excitation wavelength and any observation wavelength.

It is possible to apply the calculation method according to the present invention suitably, for example, if the fluorescence signal contains measurement data of a fluorescence intensity at one point every 0.1 to 100 seconds. The fluorescence signal may include, for example, measurement data of fluorescence intensities at 0.01 to 10 points per second.

It is only necessary for the fluorescence signal to be time-series data. The fluorescence signal may be, for example, measurement data of a fluorescence intensity before the addition of a reagent, which causes a biological reaction, to the biological sample, measurement data of a fluorescence intensity at the timepoint of the addition of the reagent, which causes the biological reaction, to the biological sample, and time-series data including measurement data of a fluorescence intensity at the timepoint of a peak (serving as a maximum value) of a change associated with the biological reaction. As the fluorescence intensity data of the fluorescence signal, for example, the measured fluorescence intensity data itself may be used, or fluorescence intensity data subjected to a smoothing process (for example, smoothed data based on a moving average) may be used.

According to the present embodiment, a calculation method of calculating a starting point of signal rise from a fluorescence signal measured using a biological sample (hereinafter simply referred to as a "starting point calculation method") includes a process of calculating a temporary starting point $(X_{s'}, Y_{s'})$ (a temporary starting point calculation process); and a process of calculating the starting point $(X_s, Y_s)$ of the signal rise on the basis of the temporary starting point $(X_{s'}, Y_{s'})$ (a starting point calculation process).

The temporary starting point calculation process includes:

a step of calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$ (a step of calculating the $X_1$ value and $f_{min}(x)$);

a step of calculating a right end $X_2$ value for which an approximate line of the fluorescence signal having the $X_1$ value at the left end has a highest inclination (an $X_2$ value calculation step);

a step of calculating an approximate line $f_{max}(x)$ having a highest inclination among approximate lines of fluorescence signal data having the $X_2$ value at a right end (an $f_{max}(x)$ calculation step);

a step of calculating an intersection between the approximate line $f_{min}(x)$ and the approximate line $f_{max}(x)$ as a temporary criterion point $(X_{c'}, Y_{c'})$ (a temporary criterion point calculation step); and a step of calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$ (a temporary starting point calculation step).

In the step of calculating the $X_1$ value and the approximate line $f_{min}(x)$ having the lowest inclination among the approximate lines of the fluorescence signal having the timepoint when the disturbance of the fluorescence signal due to the addition of the reagent after the addition of the reagent, which causes the biological reaction, to the biological sample has settled at the left end is calculated and the right end $X_1$ value of the approximate line $f_{min}(x)$ is calculated.

In the present specification, an "approximate line" is a straight line derived by performing linear approximation using a dataset of the left end and the right end and all datasets between the left end and the right end. The "left end" corresponds to a dataset with early measurement time (a small absolute value of measurement time) and the "right end" corresponds to a dataset with late measurement time (a large absolute value of measurement time). The linear approximation can be performed in, for example, a least squares method, principal component analysis, or the like.

The addition of the reagent, which causes the biological reaction, to the biological sample causes disturbance in the fluorescence signal due to a physical impact, but this disturbance in the fluorescence signal disappears after the elapse of a predetermined period of time (or the influence on data analysis becomes negligible). "The timepoint when the disturbance of the fluorescence signal due to addition of the reagent has settled" may be visually decided from a graph obtained by plotting a dataset (X, Y) (=(measurement time, fluorescence intensity)) of the fluorescence intensity for the measurement time. Also, from the timepoint when the reagent is added (referred to as "Injection"), average values and standard deviations of fluorescence intensity data are calculated for datasets of 20 to 40 consecutive points with the elapse of time and a left end of an initial dataset in which a variation coefficient (standard deviation/average value) is less than 0.03% consecutively five times or more may be decided on as the timepoint.

Also, if fluorescence signal measurement conditions (including the composition of a reagent and the like; the same is true hereinafter) are the same, because the elapse of time until the disturbance of the fluorescence signal due to addition of the reagent disappears (or the influence on the data analysis becomes negligible) is substantially uniform, it is also possible to preset "the timepoint when the disturbance of the fluorescence signal due to the addition of the reagent has settled." That is, for example, using the parameter [F1], Injection+[F1] can be set as "the timepoint when the disturbance of the fluorescence signal due to the addition of the reagent has settled." Here, Injection+[F1] indicates a dataset after [F1] (points) from the timepoint when the reagent has been added.

It is preferable to search for a right end $X_1$ value from datasets after a minimum width from "the timepoint when the disturbance of the fluorescence signal due to the addition of the reagent has settled" using a width sufficient to obtain a straight line along the signal before the rise as the minimum width. Thereby, it is possible to exclude that a point extremely close to "the timepoint when the disturbance of the fluorescence signal due to the addition of the reagent has settled" has the right end $X_1$ value. Also, the right end $X_1$ value is preferably searched for from the datasets before the timepoint when the fluorescence signal starts to rise. Because the width sufficient to obtain a straight line along the signal before the rise and the timepoint when the fluorescence signal starts to rise from "the timepoint when the disturbance of the fluorescence signal due to the addition of the reagent has settled" can be preset because they are substantially uniform as long as the fluorescence signal measurement conditions are the same. That is, for example, it is also possible to search for the right end $X_1$ value within a range after Injection+[F1]+[F3] and within a range before Injection+[F1]+[F2] using a parameter [F2] (the number of dataset points corresponding to the timepoint when the fluorescence signal starts to rise from the timepoint when the disturbance of the fluorescence signal due to the addition of the reagent has settled) and a parameter [F3] (the number of dataset points corresponding to a width at which a straight line along the signal before rise is obtained).

In the $X_2$ value calculation step, the right end $X_2$ value at which the approximate line of the fluorescence signal having the $X_1$ value at the left end has a highest inclination is calculated.

It is preferable to search for the right end $X_2$ value from datasets after a minimum width from the $X_1$ value using a width sufficient to obtain a straight line along the rising signal as the minimum width. Thereby, it is possible to exclude that a point extremely close to the $X_1$ value has the right end $X_2$ value. The width sufficient to obtain the straight line along the rising signal can be preset because it is substantially uniform as long as the fluorescence signal measurement conditions are the same. That is, for example, it is possible to search for the right end $X_2$ value in a range after ($X_1$ value+[F5]) using the parameter [F5] (the number of dataset points corresponding to the width sufficient to obtain the straight line along the rising signal).

It is preferable to do a search within the range using the right end $X_2$ value or a maximum value taken by the right end $X_2$ value as the final point of the fluorescence signal data (a dataset associated with a slowest measurement time). The maximum value taken by the right end $X_2$ value may be set before the final point of the fluorescence signal data, if necessary. For example, in the case of fluorescence signal data including fluorescence intensity measurement data at two points per second, the maximum value taken by the right end $X_2$ value may be set to Injection+[F1]+[F3]+[F4] using the parameter [F4] (the number of dataset points for designating a timepoint before the final point of the fluorescence signal data). By setting the maximum value taken by the right end $X_2$ value in this way, for example, even if two or more peaks of the fluorescence signal appear uncommonly, an influence thereof can be excluded.

In the $f_{max}(x)$ calculation step, the approximate line $f_{max}(x)$ having a highest inclination among the approximate lines of the fluorescence signal data having the $X_2$ value at the right end is calculated.

A range for searching for the left end of the approximate line is not particularly limited, but the range may be limited for the search. Specifically, for example, when the fluorescence signal includes measurement data of fluorescence intensities at two points per second, it is possible to do a search within the following ranges.

(i) Between the timepoint when the disturbance of the fluorescence signal due to the addition of the reagent has settled and the timepoint of the $X_1$ value (when $X_2$ value–$X_1$ value<1000)

(ii) Between the timepoint when the disturbance of the fluorescence signal due to the addition of the reagent has settled and the timepoint when a width sufficient to obtain a straight line along the rising signal has been subtracted from the $X_2$ value (when $X_2$ value–$X_1$ value≥1000)

Because the width sufficient to obtain the straight line along the rising signal in (ii) can be preset because it is substantially uniform as long as the fluorescence signal measurement conditions are the same. That is, for example, using the parameter [F6] (the number of dataset points corresponding to the width sufficient to obtain the straight line along the rising signal), the range can also be (ii)' between the timepoint when the disturbance of the fluorescence signal due to the addition of the reagent has settled and the timepoint of ($X_2$ value –[F6]) (when $X_2$ value–$X_1$ value>1000).

In the temporary criterion point calculation step, an intersection between the approximate line $f_{min}(x)$ and the approximate line $f_{max}(x)$ is calculated as a temporary criterion point ($X_{c'}$, $Y_{c'}$).

In the temporary starting point calculation step, an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal is calculated as the temporary starting point $(X_{s'}, Y_{s'})$.

The term "retroactively from the $X_{c'}$ value of the temporary criterion point" indicates a direction from the temporary criterion point to the earlier measurement time in the time-series data. In the present specification, the "moving average" indicates an average value calculated from consecutive datasets of at least two points. Preferably, the number of dataset points for use in calculating the moving average is the number of points at which spike noise can be canceled. The number of points at which spike noise can be canceled can be confirmed by actually calculating the moving average for a target fluorescence signal. The number of points at which spike noise can be canceled can be preset because it is substantially uniform as long as the fluorescence signal measurement conditions are the same. That is, for example, using the parameter [F8] (the number of dataset points corresponding to the number of points at which spike noise can be canceled), the number of dataset points for use in calculating the moving average can be set to the number of consecutive [F8] points.

A point at which the moving average is sufficiently close to the approximate line $f_{min}(x)$ can be calculated as a temporary starting point. Whether or not the moving average is sufficiently close to the approximate line $f_{min}(x)$ can be determined by, for example, whether or not the moving average is included within a range including values obtained through addition and subtraction between the approximate line $f_{min}(x)$ and the noise width of the fluorescence signal. Also, because the temporary starting point is used to calculate the criterion point, a looser reference may be adopted. For example, it may be determined whether or not the moving average is included within a range including values obtained through addition and subtraction between the approximate line $f_{min}(x)$ and a width wider than the noise width of the fluorescence signal.

The noise width of the fluorescence signal can be set, for example, as the standard deviation in the variation of the baseline of the fluorescence signal. For example, the baseline may be designated as a fluorescence signal of a range in which fluorescence associated with a biological reaction is not included among fluorescence signals observed in the biological sample before the addition of the reagent and fluorescence signals observed after the addition of the reagent. The width wider than the noise width of the fluorescence signal may be set, for example, within a range from (noise width of fluorescence signal×1.1) to (noise width of fluorescence signal ×6.0). The width wider than the noise width of the fluorescence signal can also be preset. That is, for example, using the parameter [F7] (the width wider than the noise width of the fluorescence signal), it may be determined whether or not the moving average is included within a range of (approximate line $f_{min}(x) \pm [F7]$).

Also, it is preferable to calculate an initial point at which a moving average is consecutively included at least twice within a range including values obtained through addition and subtraction between the approximate line $f_{min}(x)$ and a width wider than a noise width of the fluorescence signal as a temporary starting point $(X_{s'}, Y_{s'})$ such that it is ensured that the moving average is sufficiently close to the approximate line $f_{min}(x)$. Preferably, the number of times the moving average is consecutively included within the range is the number of times the variation in data can be canceled. The number of times the variation in data can be canceled can be confirmed by actually calculating the temporary starting point for the target fluorescence signal. The number of times the variation in data can be canceled can be preset because it is substantially uniform as long as the fluorescence signal measurement conditions are the same. That is, for example, using the parameter [F9] (the number of times the variation in data can be canceled), an initial point at which a moving average is consecutively included [F9] times within a range including values obtained through addition and subtraction between the approximate line $f_{min}(x)$ and a width wider than a noise width of the fluorescence signal may be calculated as the temporary starting point $(X_{s'}, Y_{s'})$.

Figure 6:
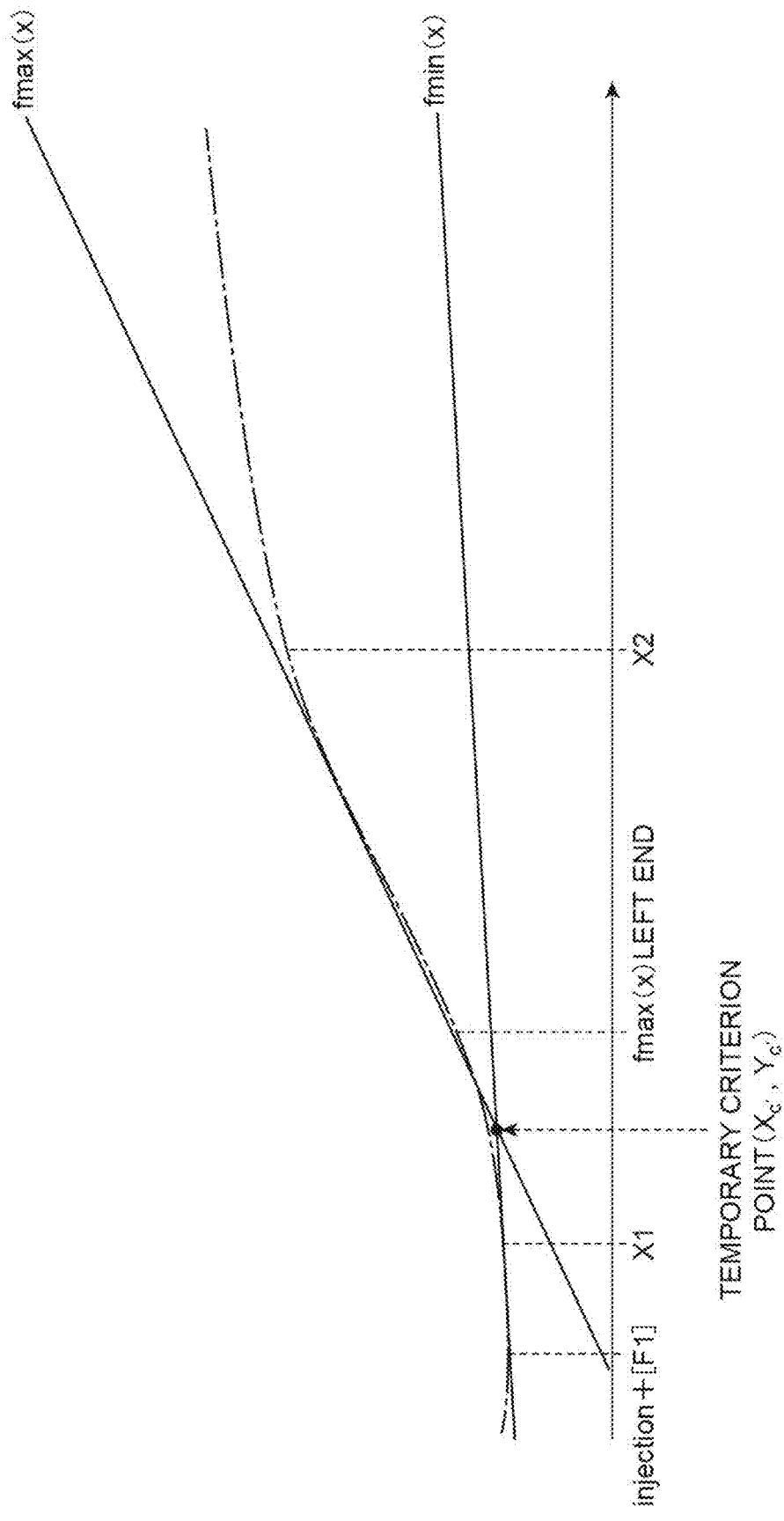
FIG. 6 is a diagram schematically showing a process of calculating a temporary criterion point $(X_{c'}, Y_{c'})$.
Figure 7:
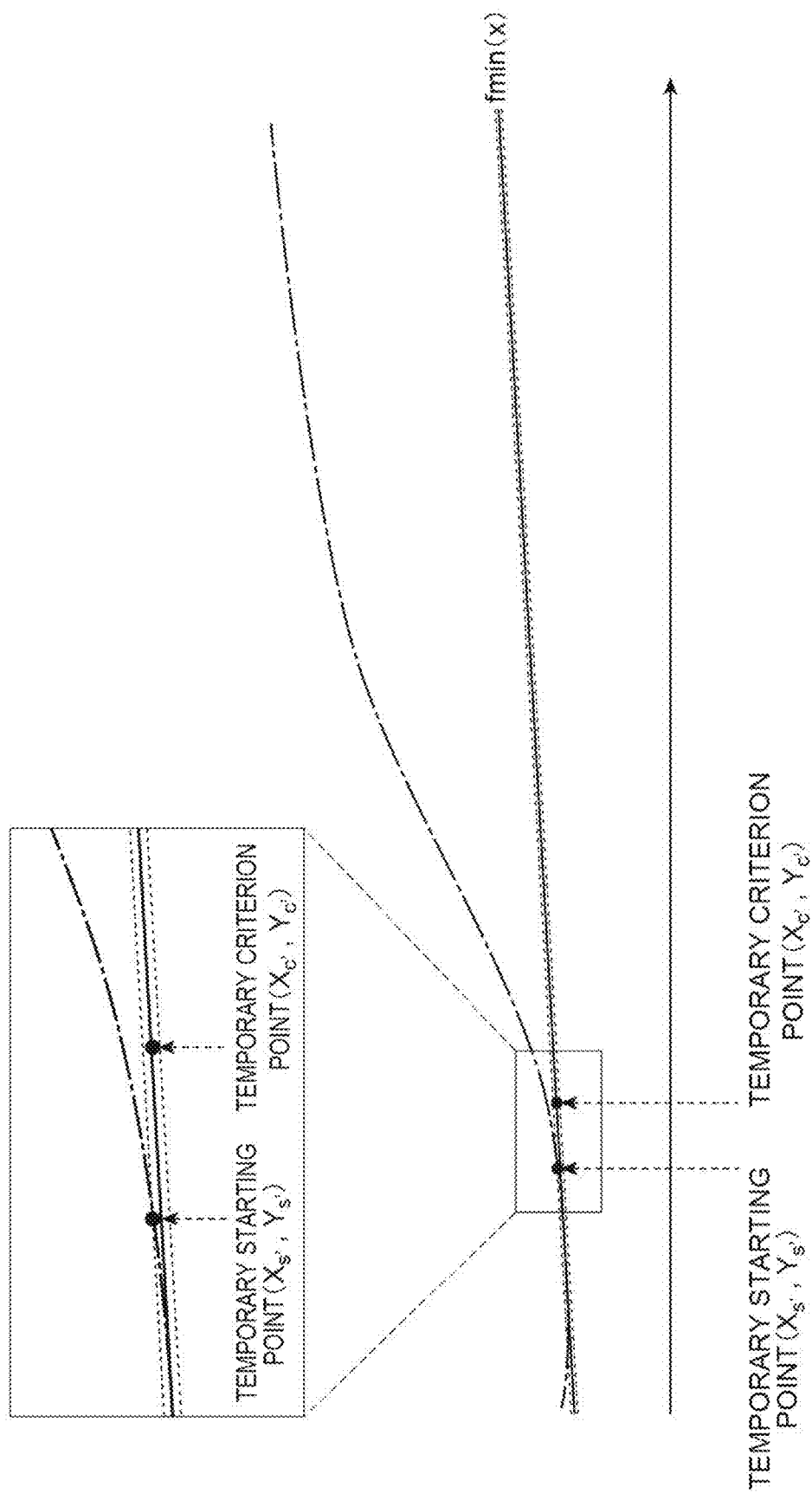
FIG. 7 is a diagram schematically showing a process of calculating a temporary starting point $(X_{s'}, Y_{s'})$.

FIG. 6 is a diagram schematically showing a process of calculating a temporary criterion point $(X_{c'}, Y_{c'})$. FIG. 6 shows results of performing the step of calculating the $X_1$ value and $f_{min}(x)$, the $X_2$ value calculation step, the $f_{max}(x)$ calculation step, and the temporary criterion point calculation step in the temporary starting point calculation process. FIG. 7 is a diagram schematically showing a process of calculating a temporary starting point $(X_{s'}, Y_{s'})$. FIG. 7 shows a result of performing the temporary starting point calculation step in the temporary starting point calculation process.

The starting point calculation process includes:
a step of calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled (an $f_b(X)'$ calculation step);
a step of calculating an intersection between the approximate line $f_b(X)'$ and the approximate line $f_{max}(x)$ as a criterion point $(X_c, Y_c)$ (a criterion point calculation step); and
a step of calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$ (a starting point calculation step).

In the $f_b(X)'$ calculation step, the approximate line $f_b(X)'$ having the lowest inclination among the approximate lines of the fluorescence signal when the $X_{s'}$ value of the temporary starting point is at the right end and the left end is within the range after the timepoint when disturbance of the fluorescence signal due to the addition of the reagent has settled is calculated.

The range for searching for the left end of the approximate line is not particularly limited as long as it is a range after the disturbance of the fluorescence signal due to addition of the reagent settled, but the range may be limited for searching. Specifically, for example, when the fluorescence signal includes measurement data of fluorescence intensities at two points per second, it is possible to do a search within the following ranges.

(i) Between the timepoint when the disturbance of the fluorescence signal due to the addition of the reagent has settled and the timepoint of ($X_{s'}$ value−500) (when $X_{s'}$ value≥timepoint of reagent addition+700)

(ii) Between the timepoint when the disturbance of the fluorescence signal due to the addition of the reagent has settled and the timepoint of ($X_{s'}$ value−400) (when timepoint of reagent addition+700>$X_{s'}$ value≥timepoint of reagent addition+600)

(iii) Between the timepoint when the disturbance of the fluorescence signal due to the addition of the reagent has settled and the timepoint of ($X_{s'}$ value−300) (when timepoint of reagent addition+600>$X_{s'}$ value≥timepoint of reagent addition+500)

(iv) Between the timepoint when the disturbance of the fluorescence signal due to addition of the reagent has settled and the timepoint of ($X_{s'}$ value−200) (when timepoint of reagent addition+500)>$X_{s'}$ value)

However, if ($X_{s'}$ value−200)<timepoint when the disturbance of the fluorescence signal due to the addition of the reagent has settled, the range is between the timepoint when the disturbance of the fluorescence signal due to the addition of the reagent has settled and the timepoint of the $X_{s'}$ value.

Also, as described above, it is possible to preset "the timepoint when the disturbance of the fluorescence signal due to addition of the reagent has settled." That is, for example, using the parameter [F11], Injection+[F11] can be set as "the timepoint when the disturbance of the fluorescence signal due to the addition of the reagent has settled." Here, Injection+[F11] indicates a dataset after [F11] (points) from the timepoint when the reagent was added.

The approximate line $f_b(X)'$ is preferably calculated as an approximate line whose inclination is higher than or equal to the inclination of the fluorescence signal obtained when no reagent is added and which has a lowest inclination. The inclination of the fluorescence signal obtained when no reagent is added can be decided, for example, by calculating an approximate line of the fluorescence signal observed in the biological sample before addition of the reagent. The inclination of the fluorescence signal obtained when no reagent is added can be preset because it is substantially uniform as long as the fluorescence signal measurement conditions are the same. That is, for example, using the parameter [F10] (the inclination of the fluorescence signal obtained when no reagent is added), the approximate line $f_b(X)'$ can be calculated as an approximate line whose inclination is greater than or equal to [F10] and becomes lowest.

In the criterion point calculation step, an intersection between the approximate line $f_b(X)'$ and the approximate line $f_{max}(x)$ is calculated as a criterion point ($X_c$, $Y_c$).

In the starting point calculation step, an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal is calculated as a starting point ($X_s$, $Y_s$).

The term "retroactively from the $X_{c'}$ value of the temporary criterion point" indicates a direction from the criterion point to the earlier measurement time in the time-series data. As described above, the "moving average" indicates an average value calculated from consecutive datasets of at least two points. Preferably, the number of dataset points for use in calculating the moving average is the number of points at which spike noise can be canceled. The number of points at which spike noise can be canceled can be confirmed by actually calculating the moving average for a target fluorescence signal. The number of points at which spike noise can be canceled can be preset because it is substantially uniform as long as the fluorescence signal measurement conditions are the same. That is, for example, using the parameter [F8] (the number of dataset points corresponding to the number of points at which spike noise can be canceled), the number of dataset points for use in calculating the moving average can be set to the number of consecutive [F8] points.

A point at which the moving average is sufficiently close to the approximate line $f_b(X)'$ can be calculated as a starting point. Whether or not the moving average is sufficiently close to the approximate line $f_b(X)'$ can be determined by, for example, whether or not the moving average is included within a range including values obtained through addition and subtraction between the approximate line $f_b(X)'$ and the noise width of the fluorescence signal. The noise width of the fluorescence signal can be preset because it is substantially uniform as long as the fluorescence signal measurement conditions are the same. That is, for example, the parameter [F12] (the noise width of the fluorescence signal) may be used to determine whether or not the moving average is included within a range of (approximate line $f_b(X)'±$ [F12]).

Also, it is preferable to calculate an initial point at which a moving average is consecutively included at least twice within a range including values obtained through addition and subtraction between the approximate line $f_b(X)'$ and a width wider than a noise width of the fluorescence signal as a starting point ($X_s$, $Y_s$) such that it is ensured that the moving average is sufficiently close to the approximate line $f_b(X)'$. Preferably, the number of times the moving average is consecutively included within the range is the number of times the variation in data can be canceled. The number of times the variation in data can be canceled can be confirmed by actually calculating the temporary starting point for the target fluorescence signal. The number of times the variation in data can be canceled can be preset because it is substantially uniform as long as the fluorescence signal measurement conditions are the same. That is, for example, using the parameter [F9] (the number of times the variation in data can be canceled), an initial point at which a moving average is consecutively included [F9] times within a range including values obtained through addition and subtraction between the approximate line $f_b(X)'$ and a noise width of the fluorescence signal may be calculated as the starting point ($X_s$, $Y_s$).

Figure 8:
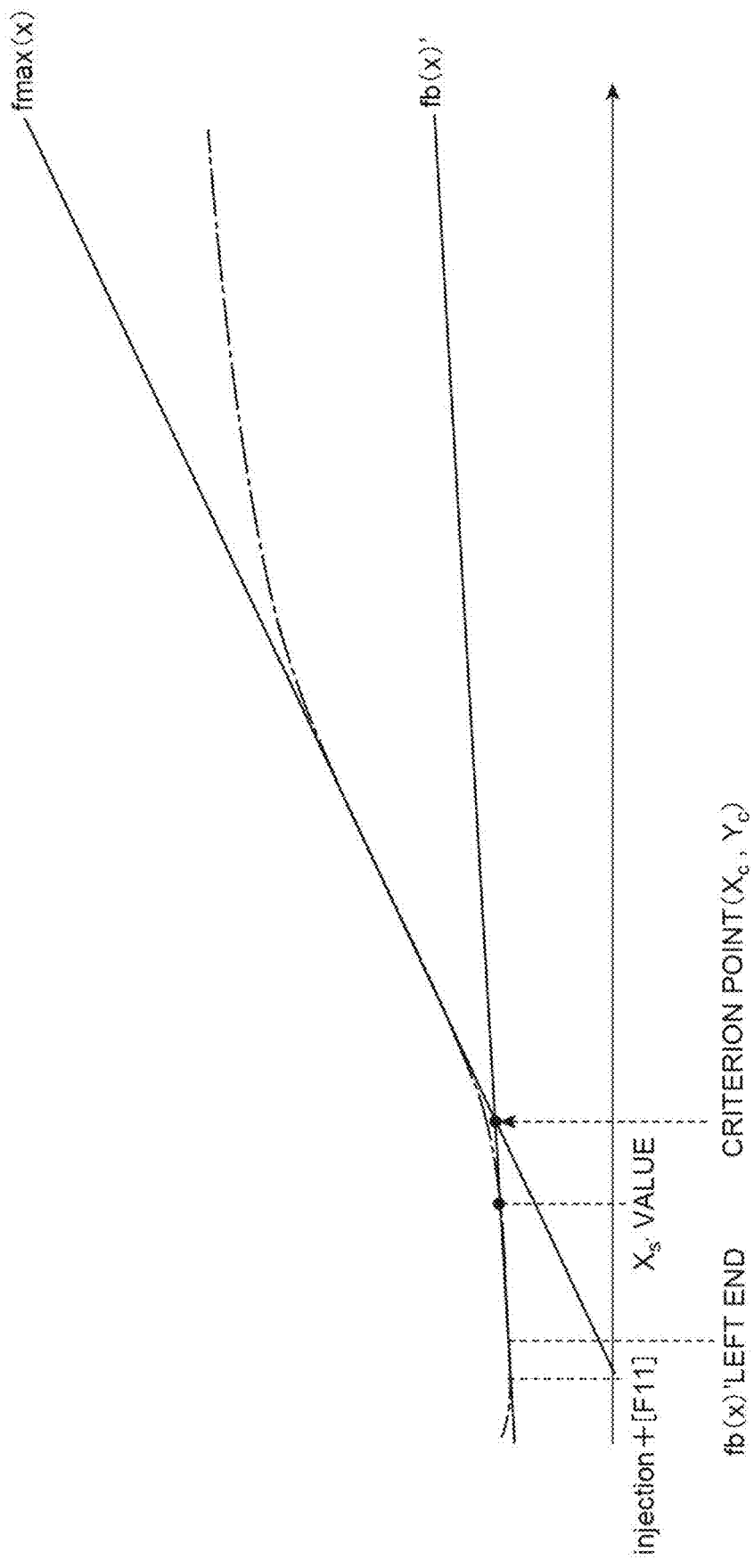
FIG. 8 is a diagram schematically showing a process of calculating a criterion point $(X_c, Y_c)$.
Figure 9:
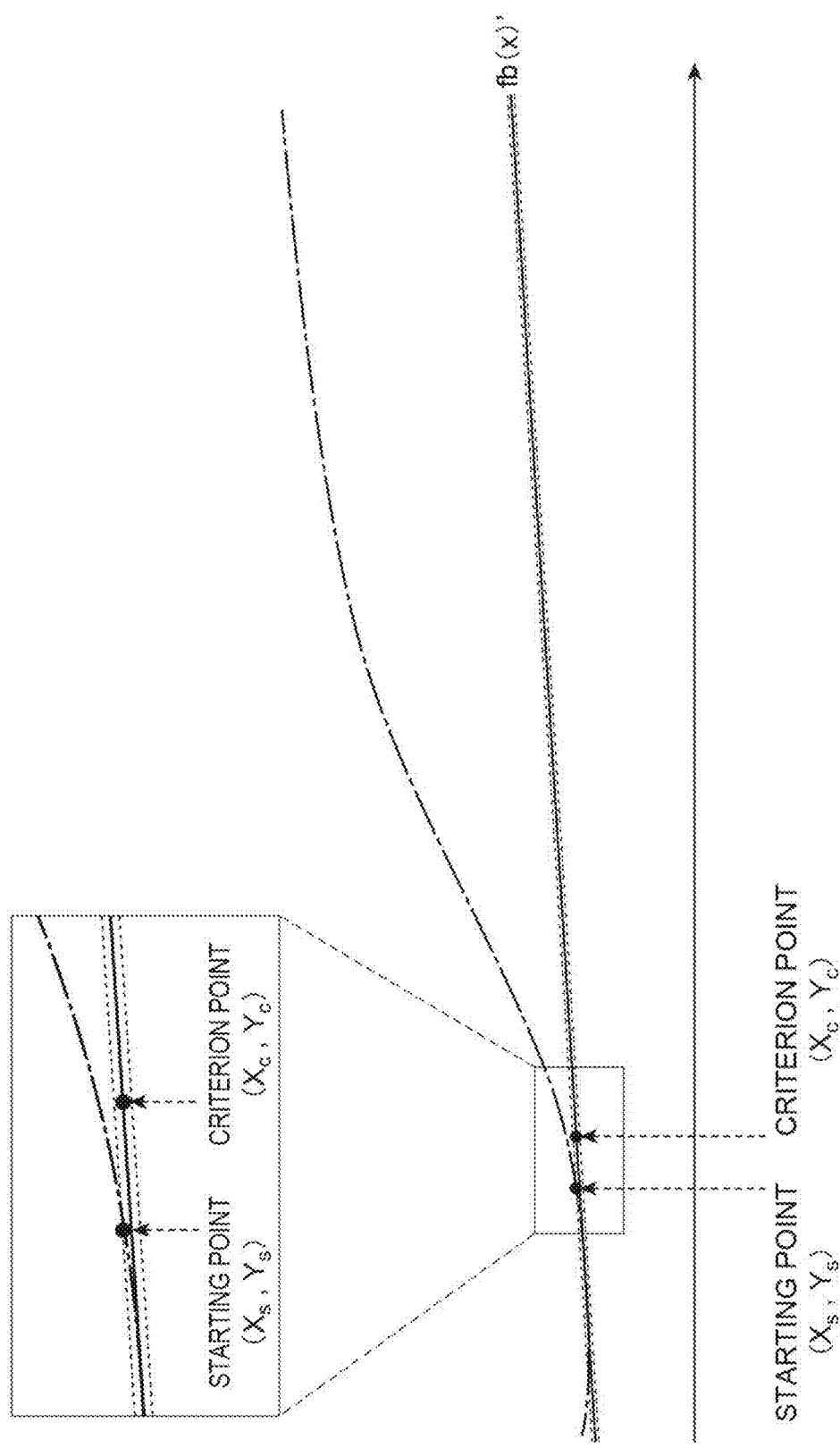
FIG. 9 is a diagram schematically showing a process of calculating a starting point $(X_s, Y_s)$.

FIG. 8 is a diagram schematically showing a process of calculating the criterion point ($X_c$, $Y_c$). FIG. 8 shows results of performing the $f_b(X)'$ calculation step and the criterion point calculation step in the starting point calculation process. FIG. 9 is a diagram schematically showing a process of calculating the starting point ($X_s$, $Y_s$). FIG. 9 shows a result of performing the starting point calculation step in the starting point calculation process.

The starting point ($X_s$, $Y_s$) calculated in the above-described starting point calculation method can be suitably ascertained as the starting point of the signal rise of the fluorescence signal measured using the biological sample and the starting point ($X_s$, $Y_s$) can be set as the starting point of the signal rise.

According to the present embodiment, a calculation method of calculating an increased signal intensity from a fluorescence signal measured using a biological sample (hereinafter simply referred to as an "increased intensity calculation method") includes a process of calculating a starting point ($X_s$, $Y_s$) of signal rise in the above-described starting point calculation method; and a process of calculating an increased intensity of the fluorescence signal on the basis of the starting point ($X_s$, $Y_s$) (an increased intensity calculation process).

The increased intensity calculation process includes:

a step of calculating an average value Y of a fluorescence intensity from consecutive datasets of at least two points retroactively from an $X_s$ value of the starting point and calculating a horizontal line of the average value Y as a line Yline (a Yline calculation step);

a step of setting a point at which a fluorescence intensity of the fluorescence signal is highest as a peak point ($X_p$, $Y_p$) and calculating a Y value at a peak point $X_p$ value on the line Yline as a $Y_l$ value (a $Y_l$ value calculation step);

a step of calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled (a $f_b(x)$ calculation step);

a step of calculating a Y value at a peak point $X_p$ value on the approximate line $f_b(x)$ as a $Y_b$ value (a $Y_b$ value calculation step); and a step of calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal (an increased intensity calculation step).

In the Yline calculation step, the average value Y of the fluorescence intensity is calculated from the consecutive datasets of at least two points retroactively from the $X_s$ value of the starting point and a horizontal line of the average value Y is calculated as the line Yline.

The term "retroactively from the $X_s$ value of the starting point" indicates a direction from the starting point to the earlier measurement time in the time-series data. Preferably, the number of dataset points for use in calculating the average value is the number of points sufficient to reflect an average signal intensity immediately before the starting point. The number of points sufficient to reflect the average signal intensity immediately before the starting point can be confirmed by actually calculating and comparing the average values with respect to the target fluorescence signal. The number of points sufficient to reflect the average signal intensity immediately before the starting point can be preset because it is substantially uniform as long as the fluorescence signal measurement conditions are the same. That is, the number of dataset points used to calculate the average value can be set as the number of consecutive [F13] points, for example, using the parameter [F13] (the number of dataset points corresponding to the number of points sufficient to reflect the average signal intensity immediately before the starting point).

In the $Y_l$ value calculation step, the peak point ($X_p$, $Y_p$) is the point at which the fluorescence intensity of the fluorescence signal is highest and the Y value at the peak point $X_p$ value on the line Yline is calculated as the $Y_l$ value. That is, the $Y_l$ value is the Y value at the intersection between the straight line represented by $X=X_p$ and the line Yline.

In the $f_b(x)$ calculation step, the approximate line $f_b(x)$ having the lowest inclination among approximate lines of the fluorescence signal when the $X_s$ value of the starting point is at the right end and the left end is within the range after the timepoint when the disturbance of the fluorescence signal due to the addition of the reagent has settled is calculated.

The range for searching for the left end of the approximate line is not particularly limited as long as it is a range after the disturbance of the fluorescence signal due to addition of the reagent settled, but the range may be limited for searching. Specifically, for example, when the fluorescence signal includes measurement data of fluorescence intensities at two points per second, it is possible to do a search within the following ranges.

(i) Between the timepoint when the disturbance of the fluorescence signal due to the addition of the reagent has settled and the timepoint of ($X_s$ value−500) (when $X_s$ value≥timepoint of reagent addition+700)

(ii) Between the timepoint when the disturbance of the fluorescence signal due to the addition of the reagent has settled and the timepoint of ($X_s$ value−400) (when timepoint of reagent addition+700>$X_s$ value≥timepoint of reagent addition+600)

(iii) Between the timepoint when the disturbance of the fluorescence signal due to the addition of the reagent has settled and the timepoint of ($X_s$ value−300) (when timepoint of reagent addition+600>$X_s$ value≥timepoint of reagent addition+500)

(iv) Between the timepoint when the disturbance of the fluorescence signal due to the addition of the reagent has settled and the timepoint of ($X_s$ value−200) (when timepoint of reagent addition+500>$X_s$ value)

However, if ($X_{s'}$ value−200)<timepoint when the disturbance of the fluorescence signal due to the addition of the reagent has settled, the range is between the timepoint when the disturbance of the fluorescence signal due to the addition of the reagent has settled and the timepoint of the $X_s$ value.

Also, as described above, it is possible to preset "the timepoint when the disturbance of the fluorescence signal due to the addition of the reagent has settled." That is, for example, using the parameter [F11], Injection+[F11] can be set as "the timepoint when the disturbance of the fluorescence signal due to the addition of the reagent has settled." Here, Injection+[F11] indicates a dataset after [F11] (points) from the timepoint when the reagent has been added.

It is preferable to calculate the approximate line $f_b(x)$ as an approximate line whose inclination is higher than or equal to the inclination of the fluorescence signal obtained when no reagent is added and which has a lowest inclination. The inclination of the fluorescence signal obtained when no reagent is added can be decided, for example, by calculating the approximate line of the fluorescence signal observed in the biological sample before the addition of the reagent. The inclination of the fluorescence signal obtained when no reagent is added can be preset because it is substantially uniform as long as the fluorescence signal measurement conditions are the same. That is, for example, using the parameter [F10] (the inclination of the fluorescence signal obtained when no reagent is added), the approximate line $f_b(x)$ can be calculated as an approximate line whose inclination is greater than or equal to [F10] and becomes lowest.

In the $Y_b$ value calculation step, the Y value at the peak point $X_p$ value on the approximate line $f_b(x)$ is calculated as the $Y_b$ value. That is, the $Y_b$ value is the Y value at the intersection between the straight line represented by $X=X_p$ and the approximate line $f_b(x)$.

In the increased intensity calculation step, a difference between the peak point $Y_p$ value and the $Y_l$ value is calculated as the increased intensity (l) of the fluorescence signal or a difference between the peak point $Y_p$ value and the $Y_b$ value is calculated as the increased intensity (b).

The calculated increased intensity (l) of the fluorescence signal (a total luminescence intensity (l)) reflects the increased intensity of the fluorescence signal obtained from the entire reaction system subjected to measurement. On the other hand, because the calculated increased intensity (b) (a total luminescence intensity (b)) of the fluorescence signal is considered to be an increased intensity obtained by excluding the fluorescence signal not derived from the biological reaction from among fluorescence signals obtained from the reaction system subjected to the measurement, it may be possible to evaluate a biological reaction more accurately. The increased intensity (I) or (b) of the fluorescence signal may be appropriately selected according to the purpose of measurement or the like.

Figure 10:
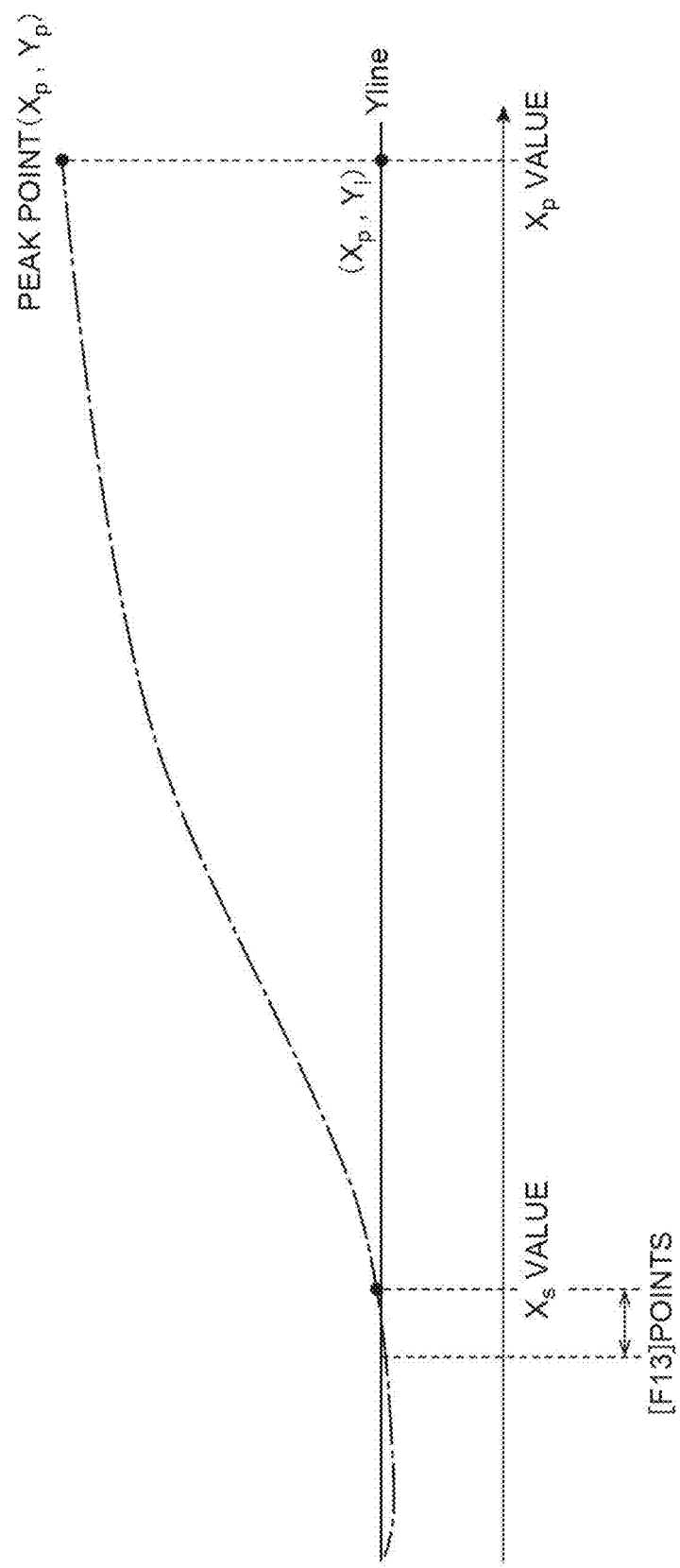
FIG. 10 is a diagram schematically showing a process of calculating a $Y_l$ value.
Figure 11:
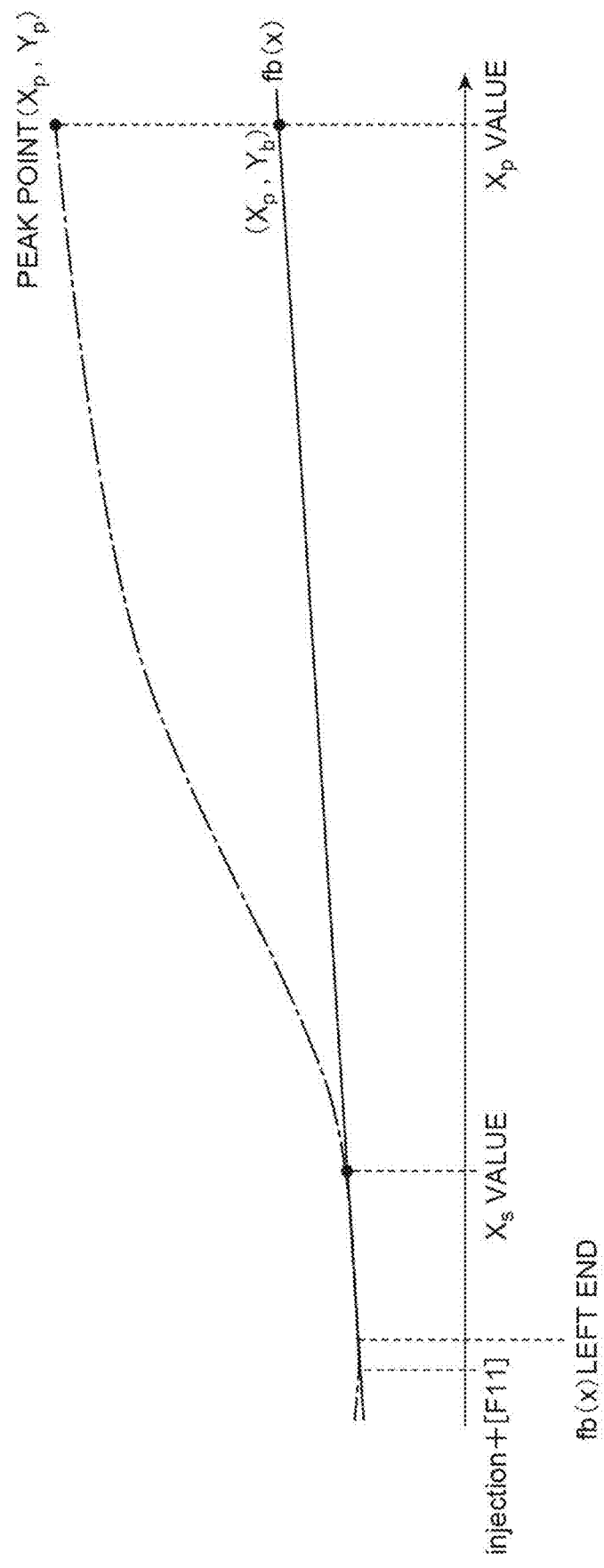
FIG. 11 is a diagram schematically showing a process of calculating a $Y_b$ value.
Figure 12:
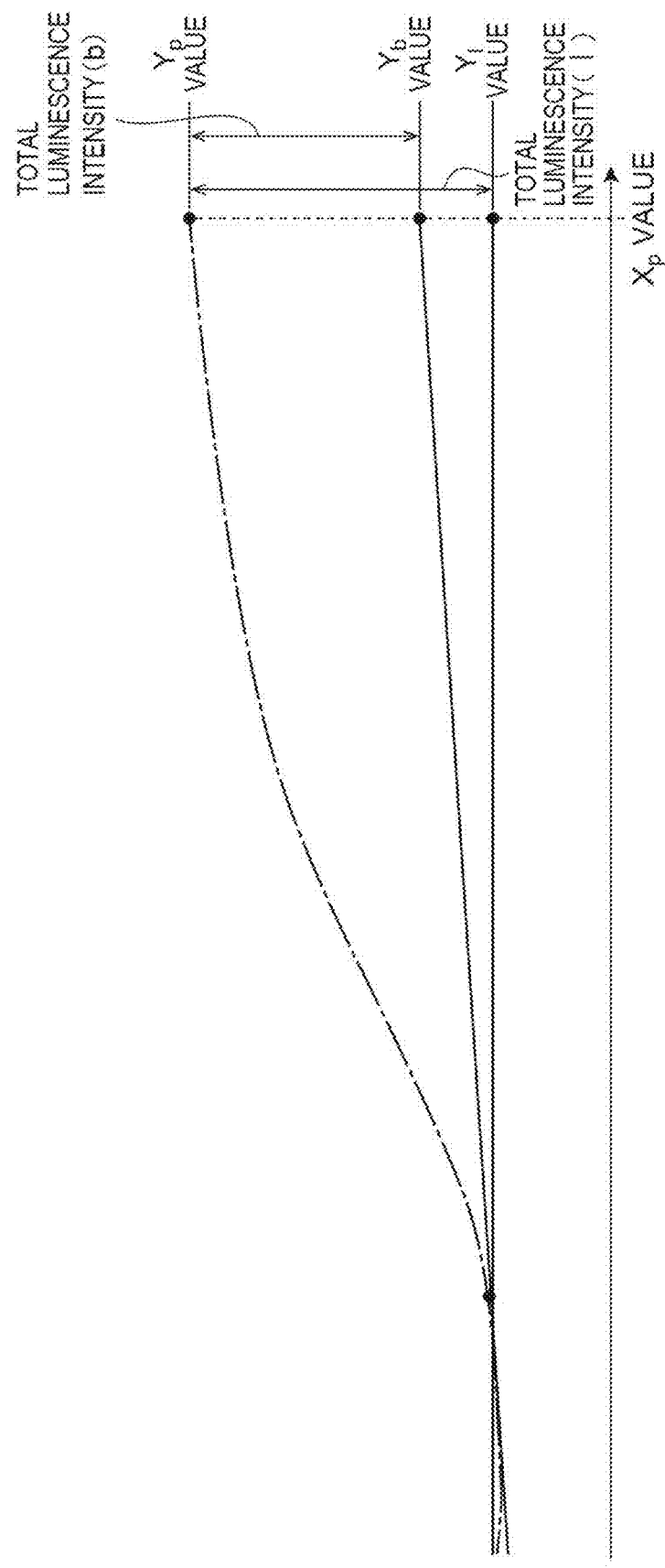
FIG. 12 is a diagram schematically showing a process of calculating an increased intensity (l) or (b) of a fluorescence signal.

FIG. 10 is a diagram schematically showing a $Y_l$ value calculation process. FIG. 10 shows results of the Yline calculation step and the $Y_l$ value calculation step in the increased intensity calculation process. FIG. 11 is a diagram schematically showing a $Y_b$ value calculation process. FIG. 11 shows results of performing the $f_b(x)$ calculation step and the $Y_b$ value calculation step in the increased intensity calculation process. FIG. 12 is a diagram schematically showing a process of calculating the increased intensity (I) or (b) of the fluorescence signal. FIG. 12 shows a result of performing the increased intensity calculation step in the increased intensity calculation process.

The increased intensity (I) or (b) calculated in the above-described increased intensity calculation method can be suitably ascertained as the increased signal intensity of the fluorescence signal measured using the biological sample and the increased intensity (I) or (b) can be set as the increased signal intensity.

Parameters indicated by [F1] to [F13] described above can be appropriately set in accordance with a specific state of the fluorescence signal that is the target of the calculation method according to the present embodiment. Elements that affect the setting of the parameters indicated by [F1] to [F13] can include, for example, a type of biological sample, a type of reagent to be added, a type of biological reaction to be detected, a type of fluorescent reagent, the number of pieces of measurement data of the fluorescence intensity per unit time, the presence or absence of a smoothing process for the measurement data, and the like.

For example, the following specific numerical values can be exemplified as the parameters indicated by [F1] to [F13] in the case of the fluorescence signal (including measurement data of fluorescence intensities at two points per second) measured by adding a neutrophil stimulant (formyl-methionyl-leucyl-phenylalanine) to a biological sample containing neutrophil cells (a sample containing whole blood) and detecting increased production of hypochlorous acid according to the activation of myeloperoxidase with a fluorescent reagent (aminophenyl fluorescein).

[F1] 100 to 200 points, preferably 150 points
[F2] 2000 to 3100 points, preferably 2550 points
[F3] 200 to 400 points, preferably 300 points
[F4] 2000 to 2500 points, preferably 2250 points
[F5] 600 to 1000 points, preferably 800 points
[F6] 800 to 1200 points, preferably 1000 points
[F7] 200 to 240, preferably 220
[F8] 4 to 6 points, preferably 5 points
[F9] 3 to 5 times, preferably 4 times
[F10] 0.070 to 0.090, preferably 0.080
[F11] 80 to 120 points, preferably 100 points
[F12] 30 to 50, preferably 40
[F13] 15 to 25 points, preferably 20 points

[Method of Calculating Starting Point of Signal Rise and Increased Signal Intensity from Chemiluminescence Signal]

A method of calculating a starting point of signal rise and an increased signal intensity from a chemiluminescence signal according to the present embodiment includes calculating the starting point of the signal rise from the chemiluminescence signal measured using a biological sample and calculating the increased signal intensity on the basis of the calculated starting point of the signal rise. The former can be ascertained independently as a calculation method of calculating a starting point of signal rise from a chemiluminescence signal measured using a biological sample.

Figure 5:
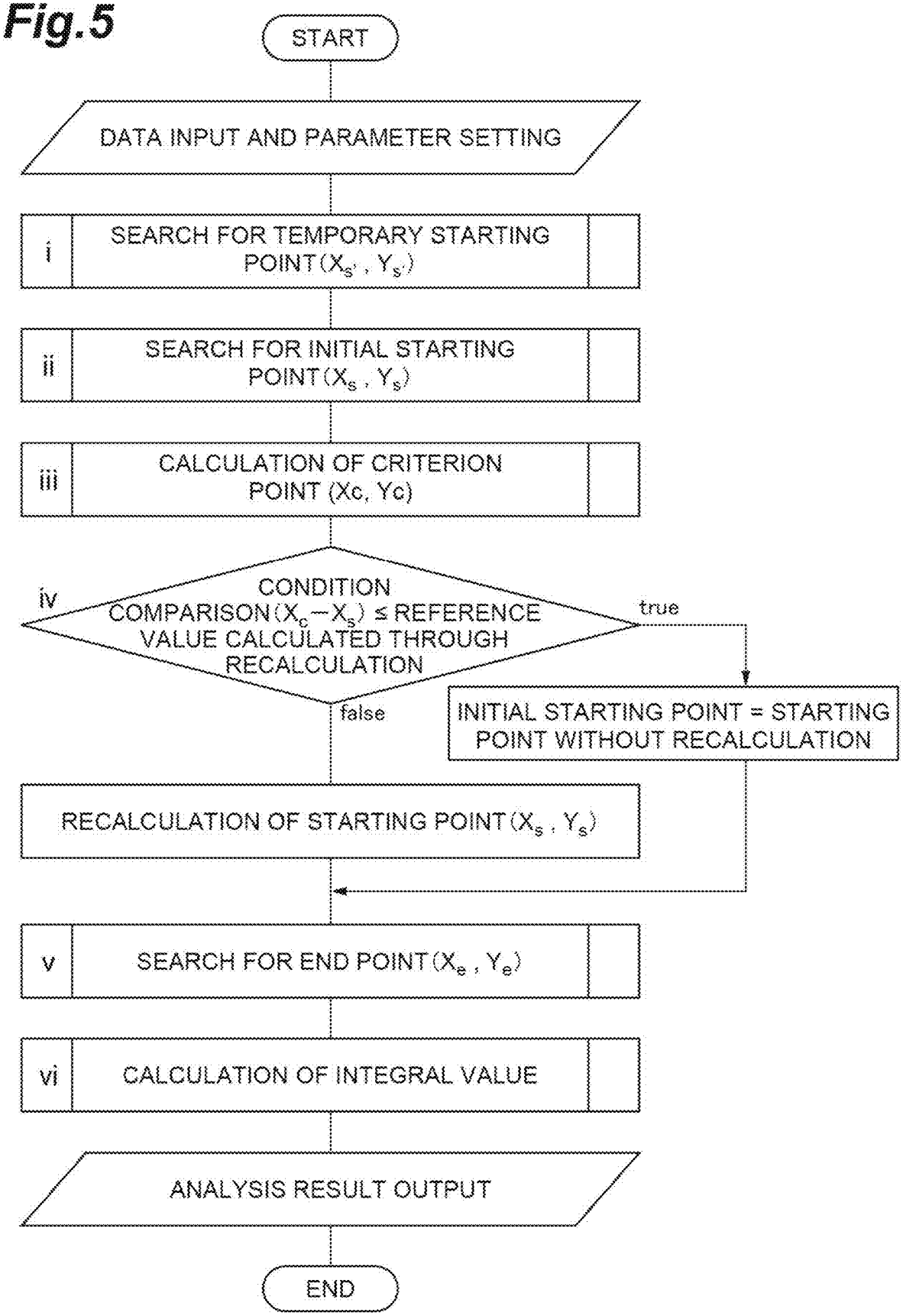
FIG. 5 is a flowchart showing a method of calculating a starting point of signal rise and an increased signal intensity from a chemiluminescence signal according to the embodiment.

FIG. 5 is a flowchart showing the method of calculating the starting point of the signal rise and the increased signal intensity from the chemiluminescence signal according to the embodiment. The method of calculating the starting point of the signal rise and the increased signal intensity from the chemiluminescence signal according to the embodiment includes a process of searching for (calculating) a temporary starting point $(X_{s'}, Y_{s'})$, a process of searching for (calculating) an initial starting point $(X_s, Y_s)$, a process of calculating a criterion point $(X_c, Y_c)$, a process of comparing the initial starting point $(X_s, Y_s)$ with the criterion point $(X_c, Y_c)$, performing recalculation as necessary, and calculating the starting point $(X_s, Y_s)$, a process of searching for (calculating) an end point $(X_e, Y_e)$, and a process of calculating an increased intensity (an integral value) of the chemiluminescence signal.

The chemiluminescence signal that is the target of the calculation method according to the present embodiment is time-series data including a dataset (X, Y) (=(measurement time, chemiluminescence intensity)) of the chemiluminescence intensity for the measurement time.

Also, the chemiluminescence signal that is the target of the calculation method according to the present embodiment is not particularly limited as long as it is a chemiluminescence signal measured by adding a reagent, which causes a biological reaction, to the biological sample and detecting a change associated with the biological reaction with a chemiluminescence reagent or the like. Specific examples of the chemiluminescence signal include, for example, a chemiluminescence signal measured by adding a neutrophil stimulant (for example, formyl-methionyl-leucyl-phenylalanine, phorbol 12-myristate 13-acetate, or opsonized zymosan) to a biological sample containing neutrophil cells (a sample containing whole blood) and detecting increased production of superoxide according to activation of superoxide production activity with a chemiluminescence reagent (for example, 2-methyl-6-phenyl-3,7-dihydroimidazo[1,2-a]pyrazin-3-one, 2-methyl-6-(4-methoxyphenyl)-3,7-dihydroimidazo [1,2-a]pyrazin-3-one, 2-methyl-6-p-methoxyphenylethynylimidazopyrazinone, or an indocyanine-type imidazopyrazinone compound).

For the chemiluminescence signal, for example, a chemiluminescence signal measured using a known luminescence measurement device such as a chemiluminescence measurement device, a bioluminescence measurement device, and a fluorescence/luminescence simultaneous measurement device can be used without any limitation. It is only necessary for the chemiluminescence observation wavelength to be appropriately set in accordance with the chemiluminescence serving as a measurement target and the calculation method according to the present embodiment can be applied to any observation wavelength.

It is possible to apply the calculation method according to the present invention suitably, for example, if the chemiluminescence signal includes measurement data of a chemiluminescence intensity at one point every 0.1 to 25 seconds. The chemiluminescence signal may include, for example, measurement data of a chemiluminescence intensity at 0.04 to 10 points per second.

It is only necessary for the chemiluminescence signal to be time-series data. The chemiluminescence signal may be, for example, measurement data of a chemiluminescence intensity before the addition of a reagent, which causes a biological reaction, to the biological sample, measurement data of a chemiluminescence intensity at the timepoint of the addition of the reagent, which causes the biological reaction, to the biological sample, and time-series data including measurement data of a chemiluminescence intensity at the timepoint of a peak (serving as a maximum value) of a change associated with the biological reaction. As the chemiluminescence intensity data of the chemiluminescence signal, for example, the measured chemiluminescence intensity data itself may be used, or chemiluminescence intensity data subjected to a smoothing process (for example, smoothed data based on a moving average) may be used.

Also, according to the present embodiment, a calculation method of calculating a starting point of signal rise from a chemiluminescence signal measured using a biological sample (hereinafter simply referred to as a "method of calculating the starting point of" the chemiluminescence signal) includes a process of calculating a temporary starting point $(X_{s'}, Y_{s'})$ (a temporary starting point calculation process); a process of calculating an initial starting point $(X_s, Y_s)$ on the basis of the temporary starting point $(X_{s'}, Y_{s'})$ (an initial starting point calculation process); a process of calculating a criterion point $(X_c, Y_c)$ (a criterion point calculation process); and a process of calculating the starting point $(X_s, Y_s)$ from the initial starting point and the criterion point $(X_c, Y_c)$ (a starting point calculation process).

The temporary starting point calculation process includes:
a step of calculating a peak point $(X_p, Y_p)$ at which a chemiluminescence intensity is highest in a range after a timepoint when a reagent is added after the addition of the reagent, which causes a biological reaction, to the biological sample (a peak point calculation step);
a step of calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled (a bottom point calculation step); and
a step of calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$ (a temporary starting point calculation step).

In the peak point calculation step, after a reagent causing a biological reaction is applied to the biological sample, the peak point $(X_p, Y_p)$ at which the chemiluminescence intensity becomes highest in the range after the addition of the reagent is calculated.

Although the range after the timepoint of the reagent addition is not particularly limited as long as the range is after the timepoint of the reagent addition (injection), the range may be a range from which a predetermined number of datasets immediately after injection are excluded. Thereby, it is possible to eliminate the influence of disturbance of the chemiluminescence signal due to the addition of the reagent. Specifically, for example, when the chemiluminescence signal includes measurement data of chemiluminescence intensities at two points per second, the range after (Injection+10 (the number of dataset points)) may be set as the range after the timepoint of the reagent addition.

In the bottom point calculation step, the bottom point $(X_b, Y_b)$ at which the chemiluminescence intensity is lowest within the range up to the $X_p$ value of the peak point from the timepoint when the disturbance of the chemiluminescence signal due to the addition of the reagent has settled is calculated.

The addition of the reagent, which causes the biological reaction, to the biological sample causes disturbance in the chemiluminescence signal due to a physical impact, but this disturbance in the chemiluminescence signal disappears after the elapse of a predetermined period of time (or the influence on data analysis becomes negligible). "The timepoint when the disturbance of the chemiluminescence signal due to addition of the reagent has settled" may be visually decided from a graph obtained by plotting a dataset (X, Y) (=(measurement time, chemiluminescence intensity)) of the chemiluminescence intensity for the measurement time. Also, from the timepoint when the reagent is added (referred to as "Injection"), average values and standard deviations of chemiluminescence intensity data are calculated for datasets of 10 to 20 consecutive points with the elapse of time and a left end of an initial dataset in which a variation coefficient (standard deviation/average value) is less than 0.2% consecutively five times or more may be decided on as the timepoint.

Also, if chemiluminescence signal measurement conditions (including the composition of a reagent and the like; the same is true hereinafter) are the same, because the elapse of time until the disturbance of the chemiluminescence signal due to addition of the reagent disappears (or the influence on the data analysis becomes negligible) is substantially uniform, it is also possible to preset "the timepoint when the disturbance of the chemiluminescence signal due to the addition of the reagent has settled." That is, for example, using the parameter [C1], Injection+[C1] can be set as "the timepoint when the disturbance of the chemiluminescence signal due to the addition of the reagent has settled." Here, Injection+[C1] indicates a dataset after [C1] (points) from the timepoint when the reagent has been added.

In the temporary starting point calculation step, an initial point at which a moving average calculated from consecutive datasets of at least two points retroactively from an $X_p$ value of the peak point is consecutively included at least twice within a range including values obtained through addition between the $Y_b$ value of the bottom point and a width wider than a noise width of the chemiluminescence signal is calculated as a temporary starting point $(X_{s'}, Y_{s'})$.

The term "retroactively from the $X_p$ value of the peak point" indicates a direction from the $X_p$ value of the peak point to the earlier measurement time in the time-series data. In the present specification, the "moving average" indicates an average value calculated from consecutive datasets of at least two points. Preferably, the number of dataset points for use in calculating the moving average is the number of points at which spike noise can be canceled. The number of points at which spike noise can be canceled can be confirmed by actually calculating the moving average for a target chemiluminescence signal. The number of points at which spike noise can be canceled can be preset because it is substantially uniform as long as the chemiluminescence signal measurement conditions are the same. That is, for example, using the parameter [F3] (the number of dataset points corresponding to the number of points at which spike noise can be canceled), the number of dataset points for use in calculating the moving average can be set to the number of consecutive [F3] points.

A point at which the moving average is sufficiently close to the $Y_b$ value of the bottom point can be calculated as a temporary starting point. Whether or not the moving average is sufficiently close to the $Y_b$ value of the bottom point can be determined, for example, by determining whether or not the moving average is included within a range including a value obtained through addition between the $Y_b$ value of the bottom point and the noise width of the chemiluminescence signal or less.

The noise width of the chemiluminescence signal can be set, for example, as the standard deviation in the variation of the baseline of the chemiluminescence signal. For example, the baseline may be designated as a chemiluminescence signal of a range in which chemiluminescence associated with a biological reaction is not included among chemiluminescence signals observed in the biological sample before the addition of the reagent and chemiluminescence signals observed after the addition of the reagent. The noise width of the chemiluminescence signal can be preset because it is substantially uniform as long as the chemiluminescence signal measurement conditions are the same. That is, for example, using the parameter [C2] (the noise width of the chemiluminescence signal), it may be determined whether or not the moving average is included within a range including a value obtained through addition between the $Y_b$ value of the bottom point of the approximate line and [C2] or less.

Also, it is preferable to calculate an initial point at which a moving average is consecutively included at least twice within a range including a value obtained through addition between the $Y_b$ value of the bottom point and a width wider than a noise width of the chemiluminescence signal or less as a temporary starting point $(X_{s'}, Y_{s'})$ such that it is ensured that the moving average is sufficiently close to the $Y_b$ value of the bottom point. Preferably, the number of times the moving average is consecutively included within the range is the number of times the variation in data can be canceled. The number of times the variation in data can be canceled can be confirmed by actually calculating the temporary starting point for the target chemiluminescence signal. The number of times the variation in data can be canceled can be preset because it is substantially uniform as long as the chemiluminescence signal measurement conditions are the same. That is, for example, using the parameter [C4] (the number of times the variation in data can be canceled), an initial point at which a moving average is consecutively included [C4] times within a range including a value obtained through addition between the $Y_b$ value of the bottom point and a width wider than a noise width of the chemiluminescence signal or less may be calculated as the temporary starting point $(X_{s'}, Y_{s'})$.

Figure 13:
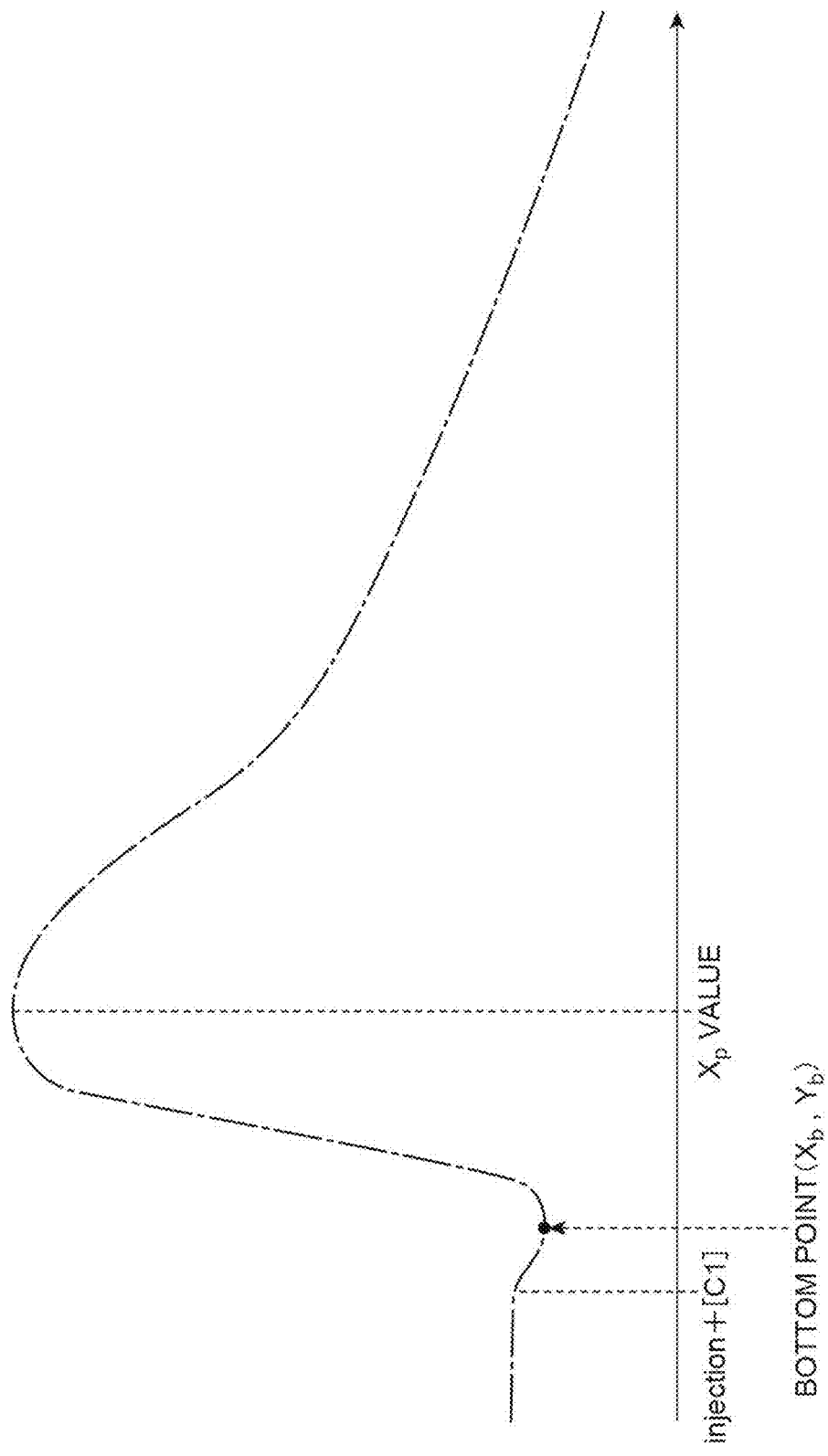
FIG. 13 is a diagram schematically showing a process of calculating a peak point $(X_p, Y_p)$ and a bottom point $(X_b, Y_b)$.
Figure 14:
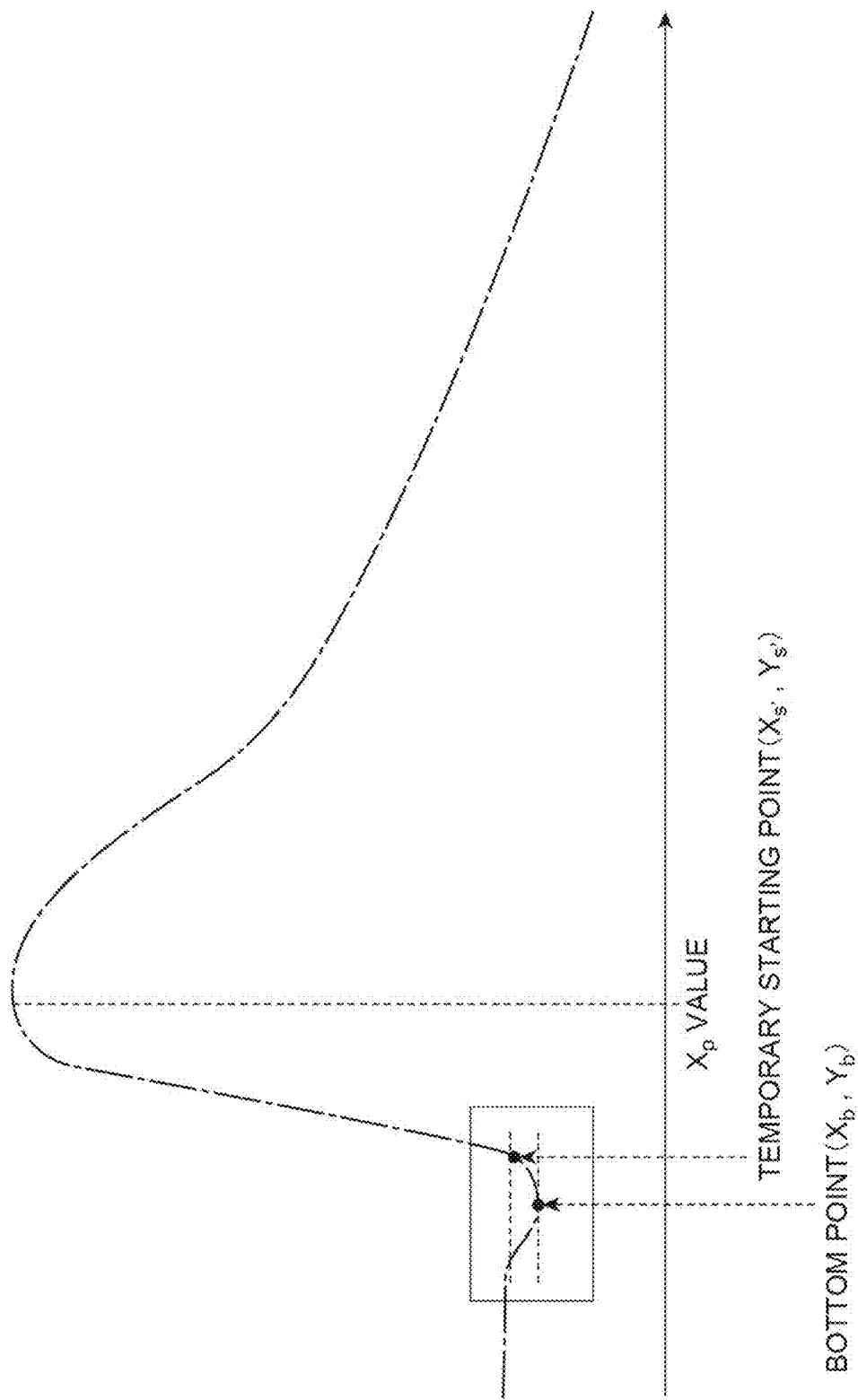
FIG. 14 is a diagram schematically showing a process of calculating a temporary starting point $(X_{s'}, Y_{s'})$.

FIG. 13 is a diagram schematically showing a process of calculating a peak point $(X_p, Y_p)$ and a bottom point $(X_b, Y_b)$. FIG. 13 shows results of performing a peak point calculation step and a bottom point calculation step in the temporary starting point calculation process. FIG. 14 is a diagram schematically showing a process of calculating the temporary starting point $(X_{s'}, Y_{s'})$. FIG. 14 shows a result of performing the temporary starting point calculation step in the temporary starting point calculation process.

The initial starting point calculation process includes:
a step of calculating an average value Y of the chemiluminescence intensity from consecutive datasets of at least two points retroactively from an $X_{s'}$ value of the temporary starting point and calculating a horizontal line of the average value Y as a line Yline (a Yline calculation step); and
a step of calculating an initial point included in a range including a value obtained through addition between the average value Y and standard deviation or less retroactively from an $X_p$ value of the peak point as the initial starting point $(X_s, Y_s)$ (an initial starting point calculation step).

In the Yline calculation step, the average value Y of the chemiluminescence intensity from the consecutive datasets of at least two points retroactively from the $X_{s'}$ value of the temporary starting point is calculated and the horizontal line of the average value Y is calculated as the line Yline.

The term "retroactively from the $X_{s'}$ value of the temporary starting point" indicates a direction from the $X_{s'}$ value of the temporary starting point to the earlier measurement time in the time-series data. Preferably, the number of dataset points for use in calculating the average value is the number of points sufficient to reflect an average signal intensity before the rise. The number of points sufficient to reflect the average signal intensity before the rise can be confirmed by actually calculating and comparing the average values with respect to the target chemiluminescence signal. The number of points sufficient to reflect the average signal intensity before the rise can be preset because it is substantially uniform as long as the chemiluminescence signal measurement conditions are the same. That is, the number of dataset points used to calculate the average value Y can be set as the number of consecutive [C5] points, for example, using the parameter [C5] (the number of dataset points corresponding to the number of points sufficient to reflect the average signal intensity before the rise).

In the Yline calculation step, it is preferable to exclude datasets from the timepoint of the reagent addition to the timepoint when the disturbance of the chemiluminescence signal due to the addition of the reagent has settled from datasets for use in calculation of the average value Y. Thereby, it is possible to eliminate an influence of disturbance of the chemiluminescence signal due to addition of the reagent. Specifically, for example, the average value Y may be calculated by excluding datasets within a range of Injection to Injection+[C6] using the parameter [C6]. Here, Injection+[C6] indicates a dataset after [C6] (points) from the timepoint of the reagent addition.

In the initial starting point calculation step, the initial point included within a range including a value obtained through addition between the average value Y and standard deviation or less retroactively from the $X_p$ value of the peak point is calculated as the initial starting point $(X_s, Y_s)$.

The term "retroactively from the $X_p$ value of the peak point" indicates a direction from the $X_p$ value of the peak point to the earlier measurement time in the time-series data. The standard deviation is a value calculated from the chemiluminescence intensity data of the dataset used to calculate the average value Y. The standard deviation can be preset because it is substantially uniform as long as the chemiluminescence signal measurement conditions are the same. That is, for example, using the parameter [C7] (standard deviation), the initial point at which the chemiluminescence intensity is included within a range of (average value Y+[C7]) or less may be calculated as the initial starting point $(X_s, Y_s)$.

Figure 15:
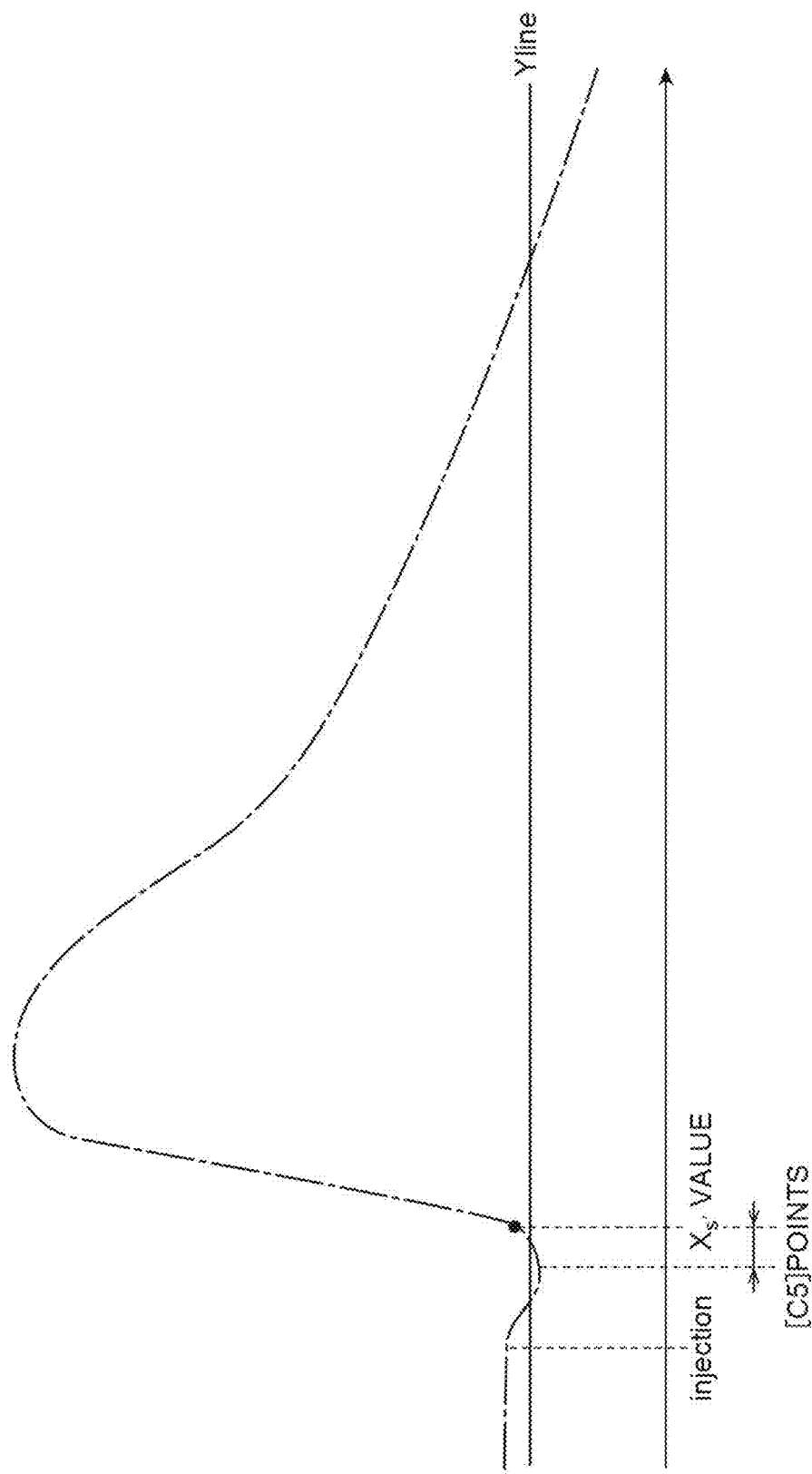
FIG. 15 is a diagram schematically showing a process of calculating a line Yline.
Figure 16:
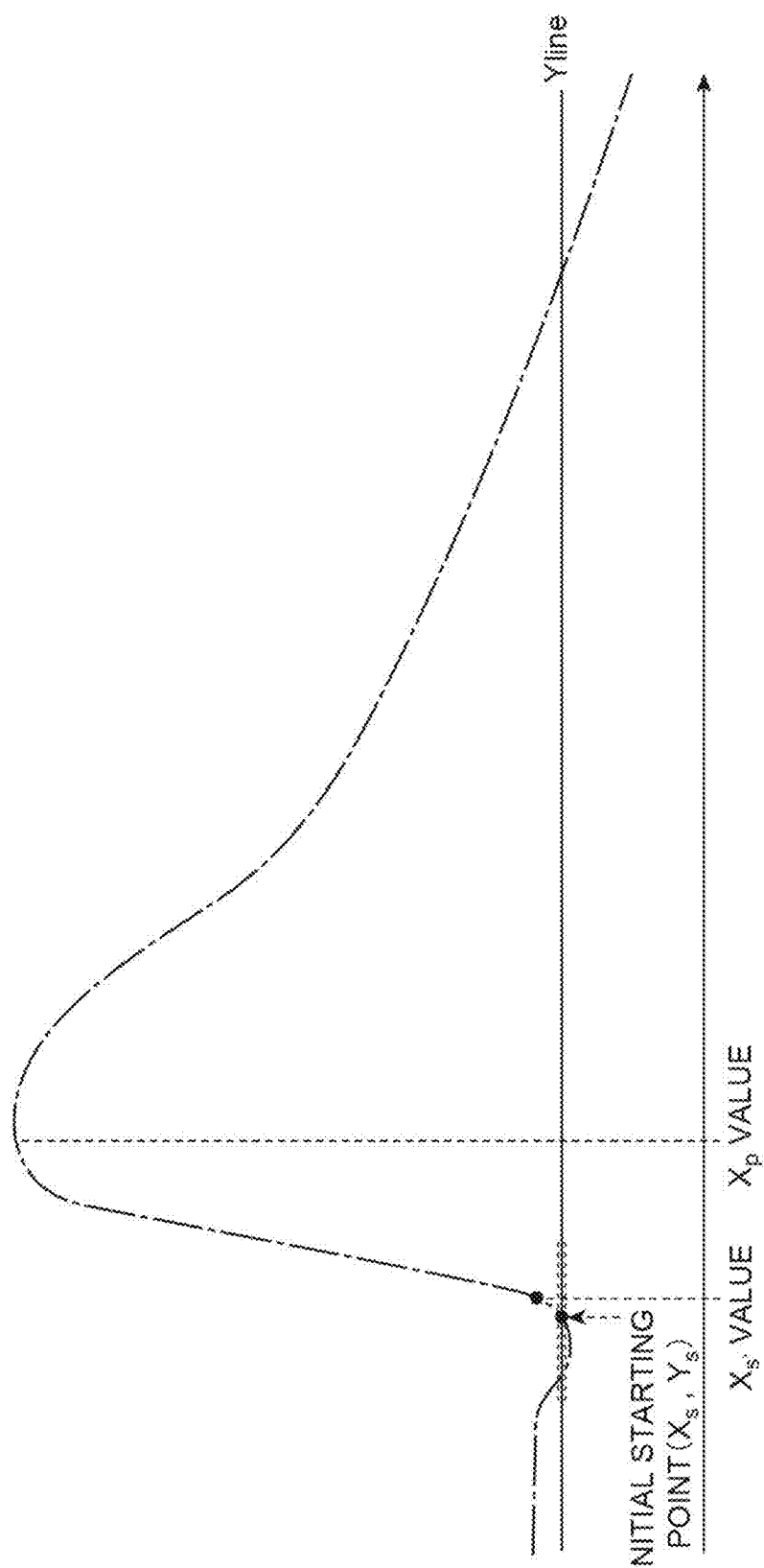
FIG. 16 is a diagram schematically showing a process of calculating an initial starting point $(X_s, Y_s)$.

FIG. 15 is a diagram schematically showing a Yline calculation process. FIG. 15 shows a result of performing a Yline calculation step in the initial starting point calculation process. FIG. 16 is a diagram schematically showing a process of calculating the initial starting point $(X_s, Y_s)$. FIG. 16 shows a result of performing an initial starting point calculation step in the initial starting point calculation process.

The criterion point calculation process includes:
 a step of calculating a left end $X_1$ value at which an approximate line of the chemiluminescence signal having the $X_p$ value of the peak point at a right end has a highest inclination (an $X_1$ value calculation step);
 a step of calculating a right end $X_2$ value at which an approximate line of the chemiluminescence signal having the $X_1$ value at a left end has a highest inclination within a range up to the $X_p$ value of the peak point (an $X_2$ value calculation step);
 a step of calculating an approximate line $f_{max}(x)$ having a highest inclination among approximate lines of the chemiluminescence signal when the $X_2$ value is at a right end and a left end is within a range up to the $X_1$ value (an $f_{max}(x)$ calculation step); and
 a step of calculating an intersection between the approximate line $f_{max}(x)$ and the line Yline as the criterion point $(X_c, Y_c)$ (a criterion point calculation step).

In the $X_1$ value calculation step, the left end $X_1$ value in which the approximate line of the chemiluminescence signal having the $X_p$ value of the peak point at the right end has the highest inclination is calculated.

The range for searching for the left end $X_1$ value is not particularly limited, but the range may be limited for searching. Specifically, for example, when the chemiluminescence signal includes measurement data of chemiluminescence intensities at two points per second, it is possible to do a search within the following ranges.
 (i) Between the timepoint when the disturbance of the chemiluminescence signal due to the addition of the reagent has settled and the timepoint of ($X_p$ value− (width sufficient to obtain the straight line along the signal after the rise)) (when $X_p$ value≥point at which a peak is assumed to be obtained)
 (ii) Between the timepoint when the disturbance of the chemiluminescence signal due to the addition of the reagent has settled and the timepoint of ($X_p$ value− (width sufficient to obtain the straight line along the signal after the rise)) (when $X_p$ value <point at which a peak is assumed to be obtained)

A point at which a peak is assumed to be obtained can be confirmed by actually measuring the target chemiluminescence signal. The point at which a peak is assumed to be obtained can be preset because it is substantially uniform as long as the chemiluminescence signal measurement conditions are the same. That is, for example, using the parameter [C8] (the average number of dataset points from the timepoint of the reagent addition to the point at which the peak is assumed to be obtained), it is also possible to select (i) or (ii) by comparing the $X_p$ value with a magnitude of Injection+[C8].

It is also possible to preset "the timepoint at which the disturbance of the chemiluminescence signal due to the addition of the reagent has settled." That is, for example, using the parameter [C9], Injection+[C9] can be set as "the timepoint when the disturbance of the chemiluminescence signal due to the addition of the reagent has settled." Here, Injection+[C9] indicates a dataset after [C9] (points) from the timepoint of the reagent addition.

The width sufficient to obtain the straight line along the rising signal in (i) and (ii) can be preset because it is substantially uniform as long as the chemiluminescence signal measurement conditions are the same. That is, for example, using the parameters [C10] and [C11] (the number of dataset points corresponding to the width sufficient to obtain the straight line along the rising signal), the width can be set (i)' between (Injection+[C9]) and ($X_p$ value−[C10]) (when $X_p$ value≥(Injection+[C8])); and (ii)' between (Injection+[C9]) and ($X_p$ value−[C11]) (when $X_p$ value <(Injection+[C8])).

In the $X_2$ value calculation step, the right end $X_2$ value in which the approximate line of the chemiluminescence signal having the $X_1$ value at the left end has the highest inclination is calculated within the range up to the $X_p$ value of the peak point.

The right end $X_2$ value is preferably searched for from datasets after a minimum width from the $X_1$ value using a width sufficient to obtain a straight line along the signal after the rise as the minimum width. Thereby, it is possible to exclude that the point extremely close to the $X_1$ value has the right end $X_2$ value. Because the width sufficient to obtain the straight line along the signal after the rise can be preset because it is substantially uniform as long as the chemiluminescence signal measurement conditions are the same. That is, for example, using the parameter [C12] (the number of dataset points corresponding to the width sufficient to obtain the straight line along the signal after the rise), it is also possible to search for the right end $X_2$ value in a range after ($X_1$ value+[C12]).

In the $f_{max}(x)$ calculation step, the approximate line $f_{max}(x)$ having the highest inclination among the approximate lines of the chemiluminescence signal when the $X_2$ value is at the right end and the left end is within the range up to the $X_1$ value is calculated.

It is preferable to search for the left end within a range retroactive from a timepoint when a minimum width has been subtracted from the $X_2$ value using a width sufficient to obtain a straight line along the signal after the rise as the minimum width. Thereby, it is possible to prevent the point extremely close to the $X_2$ value from being the left end. The width sufficient to obtain a straight line along the signal after rise is as described in the $X_2$ value calculation step.

In the criterion point calculation step, the intersection between the approximate line $f_{max}(x)$ and the line Yline is calculated as the criterion point $(X_c, Y_c)$.

Figure 17:
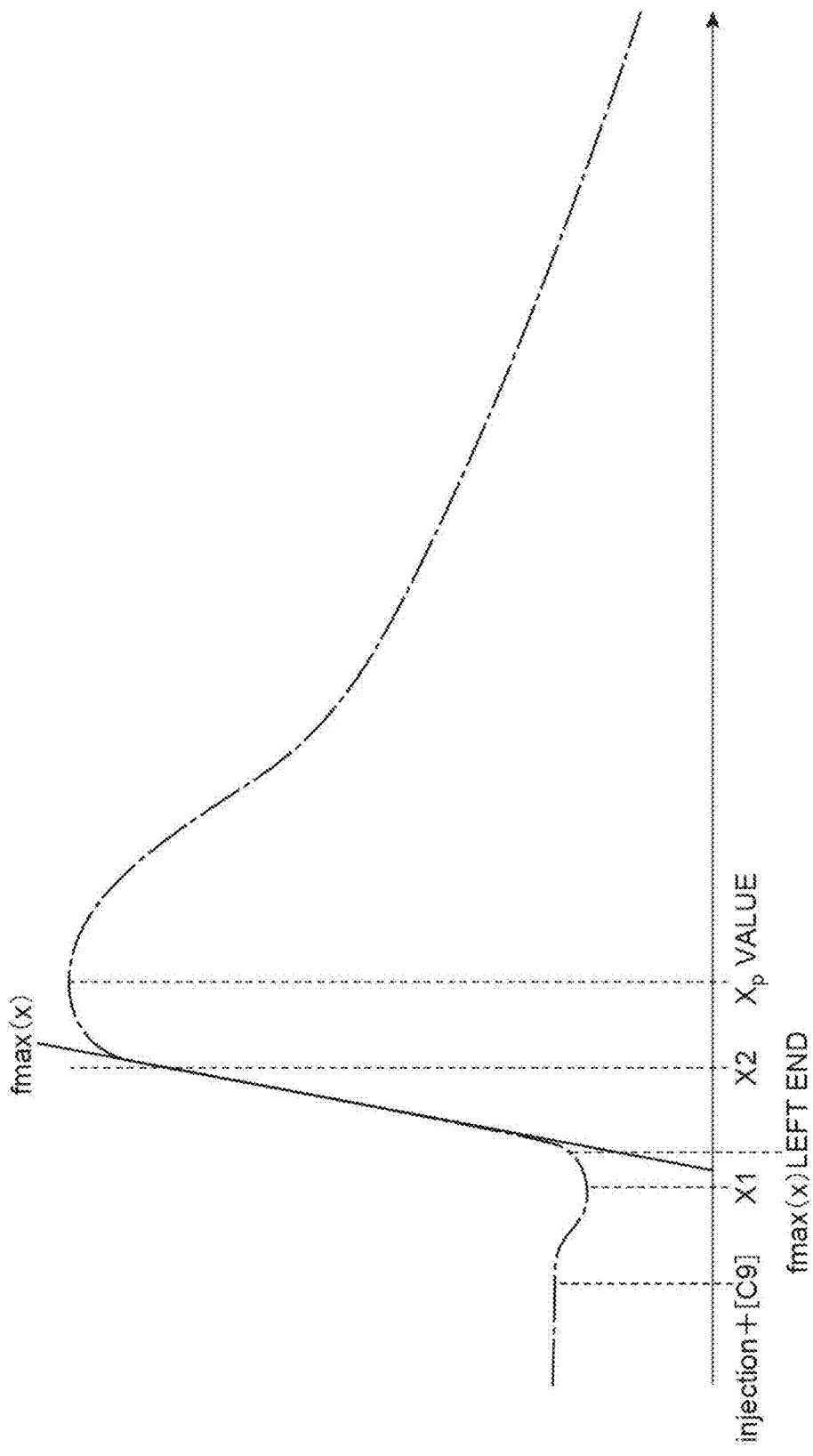
FIG. 17 is a diagram schematically showing a process of calculating an approximate line $f_{max}(x)$.
Figure 18:
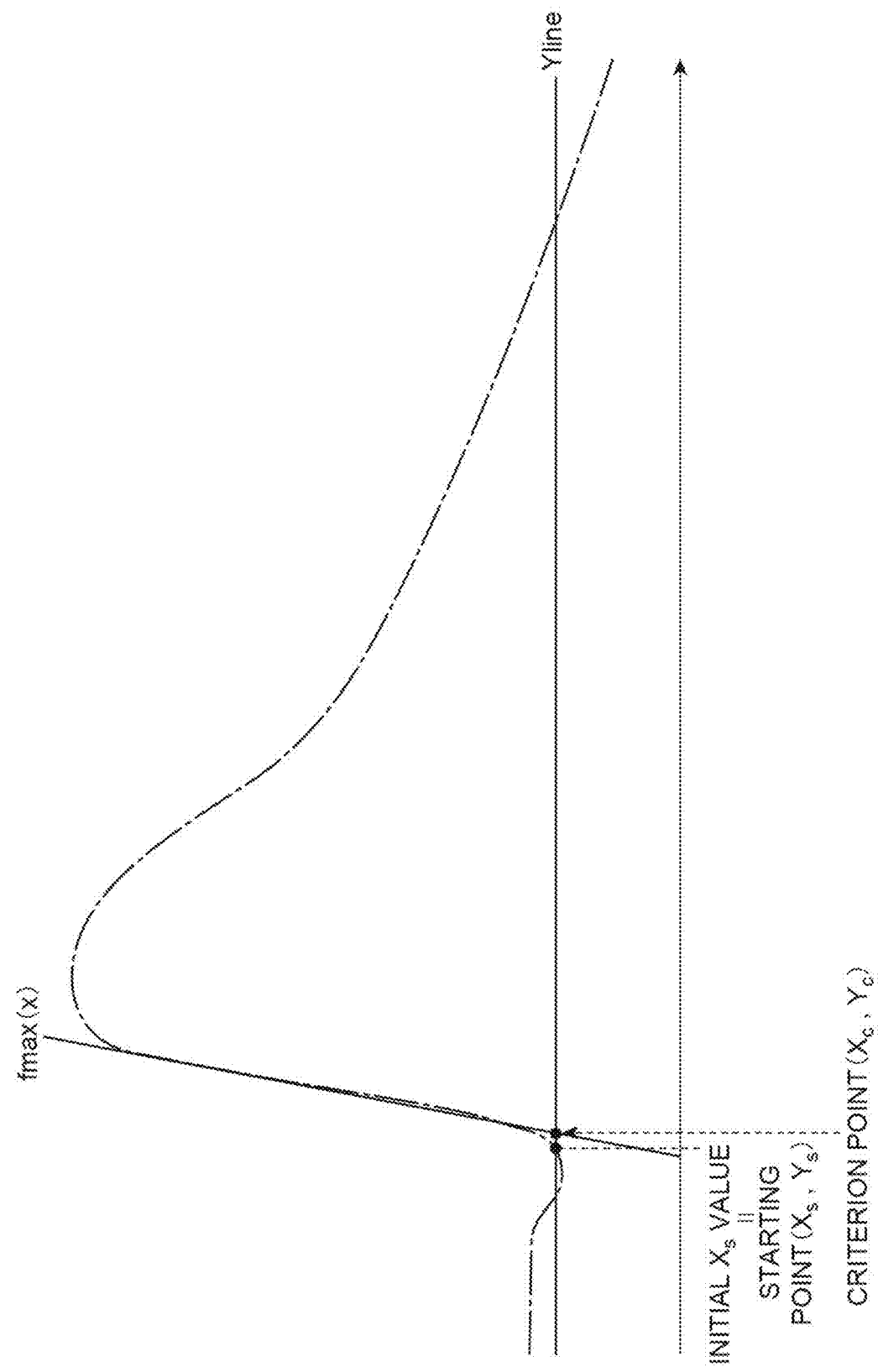
FIG. 18 is a diagram schematically showing a process of calculating a criterion point $(X_c, Y_c)$ and a process of calculating a starting point $(X_s, Y_s)$.
Figure 19:
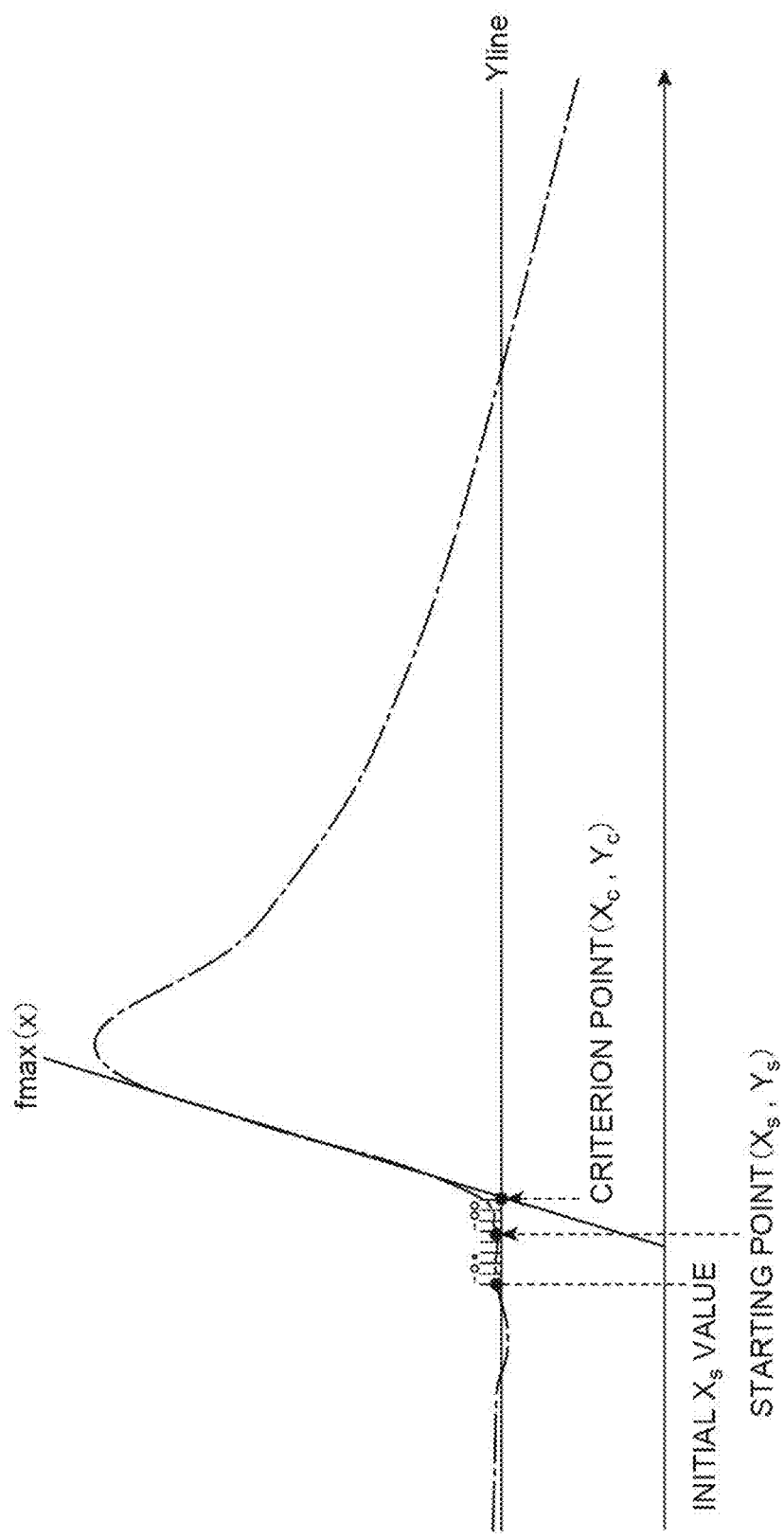
FIG. 19 is a diagram schematically showing a process of calculating a criterion point $(X_c, Y_c)$ and a process of calculating a starting point $(X_s, Y_s)$.

FIG. 17 is a diagram schematically showing a process of calculating the approximate line $f_{max}(x)$. FIG. 17 shows results of performing the $X_1$ value calculation step, the $X_2$ value calculation step, and the $f_{max}(x)$ calculation step in the criterion point calculation process. FIGS. 18 and 19 are diagrams schematically showing a process of calculating the criterion point $(X_c, Y_c)$ and a process of calculating the starting point $(X_s, Y_s)$. FIGS. 18 and 19 show results of performing the criterion point calculation step and the starting point calculation step in the criterion point calculation process.

The starting point calculation process includes:
 (a) calculating the initial starting point as the starting point $(X_s, Y_s)$ when a difference ($X_c$ value−$X_s$ value) between the $X_c$ value of the criterion point and the $X_s$ value of the initial starting point is less than a recalculated reference value; and
 (b) calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value−$X_s$ value) between the $X_c$ value of the criterion point and the $X_s$ value of the initial starting point is greater than or equal to the recalculated reference value.

In the starting point calculation process, it is first determined whether or not a difference ($X_c$ value−$X_s$ value)

between the $X_c$ value and the $X_s$ value is greater than or equal to the recalculated reference value.

When the difference ($X_c$ value–$X_s$ value) is less than the recalculated reference value, the initial starting point is set as the starting point ($X_s$, $Y_s$) (in the case of the above-described (a)).

When the difference ($X_c$ value–$X_s$ value) is greater than or equal to the recalculated reference value, the starting point ($X_s$, $Y_s$) is recalculated (in the case of the above-described (b)) on the basis of the initial starting point. The recalculation is performed by calculating an initial point at which the average value calculated for each of the consecutive datasets of at least two points is greater than or equal to a previous average value consecutively at least twice after an $X_s$ value of the initial starting point as the starting point ($X_s$, $Y_s$).

Preferably, the number of dataset points for use in calculating the average value is the number of points at which spike noise can be canceled. The number of points at which spike noise can be canceled can be confirmed by actually calculating the moving average for a target chemiluminescence signal. The number of points at which spike noise can be canceled can be preset because it is substantially uniform as long as the chemiluminescence signal measurement conditions are the same. That is, for example, using the parameter [C3] (the number of dataset points corresponding to the number of points at which spike noise can be canceled), the number of dataset points for use in calculating the average value can be set to the number of consecutive [C3] points.

The initial point at which the average value is greater than or equal to the previous average value consecutively at least twice is calculated as the starting point ($X_s$, $Y_s$) such that it is ensured that the starting point is sufficiently close to the rising point of the data. Preferably, the number of times the average value is greater than or equal to the previous average value consecutively is the number of times the variation in data can be canceled. The number of times the variation in data can be canceled can be confirmed by actually calculating the average value a plurality of times for the target chemiluminescence signal. The number of times the variation in data can be canceled can be preset because it is substantially uniform as long as the chemiluminescence signal measurement conditions are the same. That is, for example, using the parameter [C14] (the number of times data variation can be canceled), the initial point at which the average value is greater than or equal to the previous average value consecutively [C14] times may be calculated as the starting point ($X_s$, $Y_s$).

The recalculated reference value can be, for example, a width required until the inclination of the signal reaches its maximum from the start of the signal rise. The width required until the inclination of the signal reaches its maximum from the start of the signal rise can be preset because it is substantially uniform as long as the chemiluminescence signal measurement conditions are the same. That is, for example, using the parameter [C13] (the number of dataset points corresponding to the width required until the inclination of the signal reaches its maximum from the start of the signal rise), the comparison may be performed with the difference ($X_c$ value–$X_s$ value) between the $X_c$ value and the $X_s$ value.

The process of calculating the starting point ($X_s$, $Y_s$) shown in FIG. 18 is for the case where ($X_c$ value–$X_s$ value) is smaller than the recalculated reference value (when recalculation is unnecessary). The process of calculating the starting point ($X_s$, $Y_s$) shown in FIG. 19 is for the case where ($X_c$ value–$X_s$ value) is greater than or equal to the recalculated reference value (when recalculation is necessary).

The starting point ($X_s$, $Y_s$) calculated in the above-described method of calculating the starting point of the chemiluminescence signal can be suitably ascertained as the starting point of the signal rise of the chemiluminescence signal measured using the biological sample and the starting point ($X_s$, $Y_s$) can be set as the starting point of the signal rise.

According to the present embodiment, a calculation method of calculating an increased signal intensity from a chemiluminescence signal measured using a biological sample (hereinafter simply referred to as a "method of calculating an increased intensity of" a chemiluminescence signal) includes a process of calculating a starting point ($X_s$, $Y_s$) of signal rise in the above-described method of calculating the starting point of the chemiluminescence signal; a process of calculating an end point ($X_e$, $Y_e$) (an end point calculation process); and a process of calculating an increased intensity of the chemiluminescence signal (an increased intensity calculation process).

The end point calculation process is a process of calculating an initial point included in a range in which a moving average calculated from consecutive datasets of at least two points is less than or equal to the line Yline consecutively at least twice after the $X_p$ value of the peak point as the end point ($X_e$, $Y_e$).

Preferably, the number of dataset points for use in calculating the moving average is the number of points at which spike noise can be canceled. The number of points at which spike noise can be canceled can be confirmed by actually calculating the moving average for a target chemiluminescence signal. The number of points at which spike noise can be canceled can be preset because it is substantially uniform as long as the chemiluminescence signal measurement conditions are the same. That is, for example, using the parameter [C15] (the number of dataset points corresponding to the number of points at which spike noise can be canceled), the number of dataset points for use in calculating the moving average can be set to the number of consecutive [C15] points.

Preferably, the initial point at which the moving average is included within the range of the line Yline or less consecutively at least twice is calculated as the end point ($X_e$, $Y_e$) such that it is ensured that the moving average is sufficiently close to the baseline. Preferably, the number of times the moving average is consecutively included within the range is the number of times the variation in data can be canceled. The number of times the variation in data can be canceled can be confirmed by actually calculating the moving average for the target chemiluminescence signal. The number of times the variation in data can be canceled can be preset because it is substantially uniform as long as the chemiluminescence signal measurement conditions are the same. That is, for example, using the parameter [C16] (the number of times the variation in data can be canceled), the initial point at which the moving average is consecutively included [C16] times within a range of the line Yline or less may be calculated as the end point ($X_e$, $Y_e$).

The increased intensity calculation process is a process of setting the line Yline as a baseline and calculating an integral value of a chemiluminescence intensity from an $X_s$ value of the starting point to an $X_e$ value of the end point.

Figure 20:
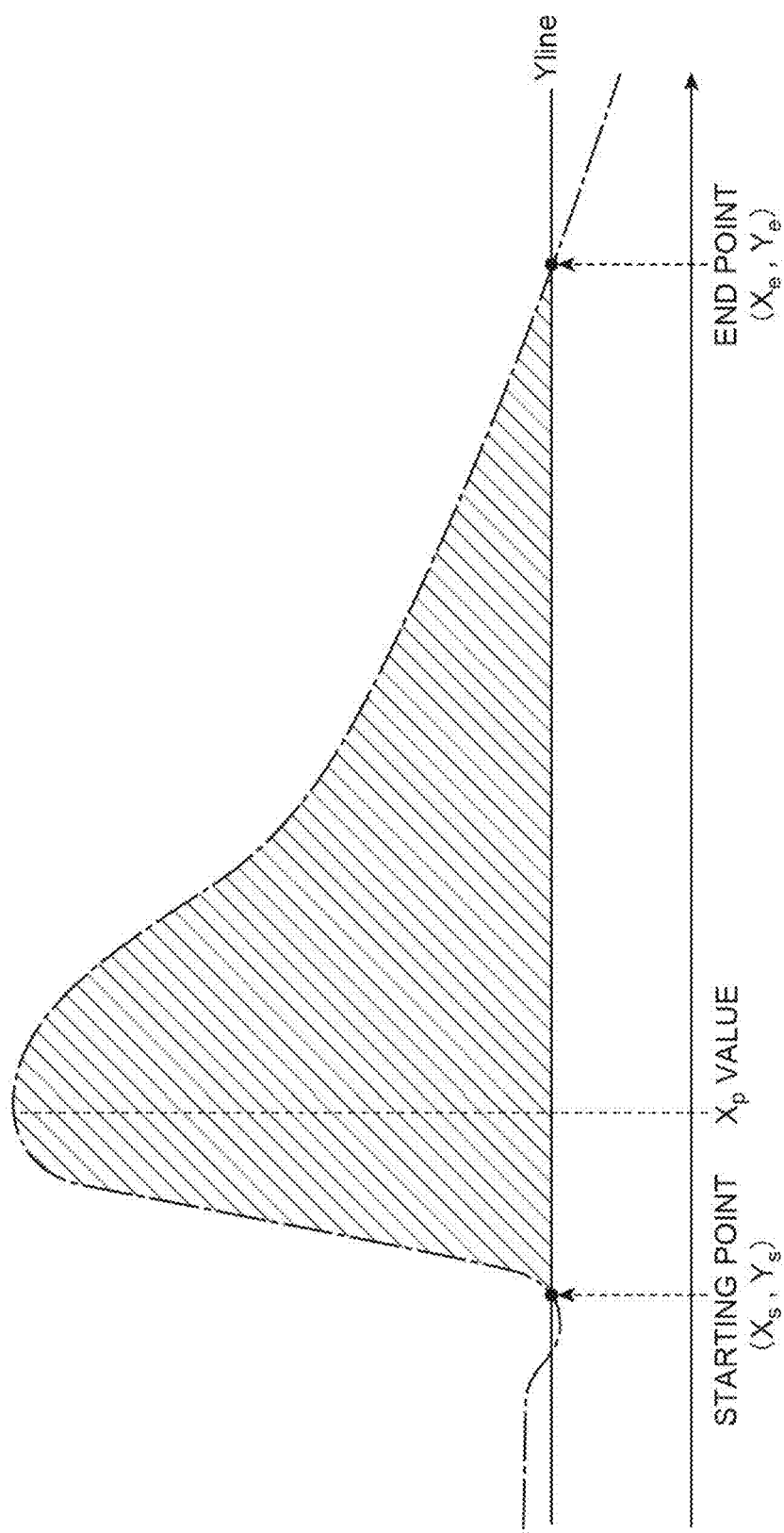
FIG. 20 is a diagram schematically showing a process of calculating an integral value of a chemiluminescence intensity.

FIG. 20 is a diagram schematically showing a process of calculating an integral value of a chemiluminescence intensity. FIG. 20 shows results of performing the end point calculation process and the increased intensity calculation process.

The integral value of the chemiluminescence intensity calculated in the above-described method of calculating the increased intensity in the chemiluminescence signal can be suitably ascertained as the increased signal intensity of the chemiluminescence signal measured using the biological sample and the integral value of the chemiluminescence intensity can be used as the increased signal intensity.

Parameters indicated by [C1] to [C16] described above can be appropriately set in accordance with a specific state of the chemiluminescence signal that is the target of the calculation method according to the present embodiment. Elements that affect the setting of the parameters indicated by [C1] to [C16] can include, for example, a type of biological sample, a type of reagent to be added, a type of biological reaction to be detected, a type of chemiluminescent reagent, the number of pieces of measurement data of the chemiluminescence intensity per unit time, the presence or absence of a smoothing process for the measurement data, and the like.

For example, the following specific numerical values can be exemplified as the parameters indicated by [C1] to [C16] in the case of the chemiluminescence signal (including measurement data of chemiluminescence intensities at two points per second) measured by adding a neutrophil stimulant (formyl-methionyl-leucyl-phenylalanine) to a biological sample containing neutrophil cells (a sample containing whole blood) and detecting increased production of superoxide according to activation of superoxide production activity with a chemiluminescence reagent (2-methyl-6-(4-methoxyphenyl)-3,7-dihydroimidazo[1,2-a]pyrazin-3-one).

[C1] 80 to 120 points, preferably 100 points
[C2] 8 to 12, preferably 10
[C3] 4 to 6 points, preferably 5 points
[C4] 2 to 4 times, preferably 3 times
[C5] 80 to 120 points, preferably 100 points
[C6] 60 to 100 points, preferably 80 points
[C7] standard deviation (SD) of average value Y
[C8] 600 to 900 points, preferably 750 points
[C9] 40 to 60 points, preferably 50 points
[C10] 600 to 800 points, preferably 700 points
[C11] 200 to 300 points, preferably 250 points
[C12] 180 to 220 points, preferably 200 points
[C13] 120 to 180 points. preferably 150 points
[C14] 2 to 4 times, preferably 3 times
[C15] 4 to 6 points, preferably 5 points
[C16] 2 to 4 times, preferably 3 times FIG. 21-1, FIG. 21-2, FIG. 22-1 and FIG. 22-2 are graphs showing examples of fluorescence and chemiluminescence signals measured using a sample containing whole blood. As can be seen from FIG. 21-1, FIG. 21-2, FIG. 22-1 and FIG. 22-2, due to an influence of impurities contained in whole blood (for example, erythrocytes and other impurities), signal intensities of the fluorescence signal and the chemiluminescence signal are low, the baseline is not stable, and signals tend to have disturbance such as blurring in measurement data. This tendency is particularly conspicuous in fluorescence signals that are susceptible to scattering.

Figure 1:
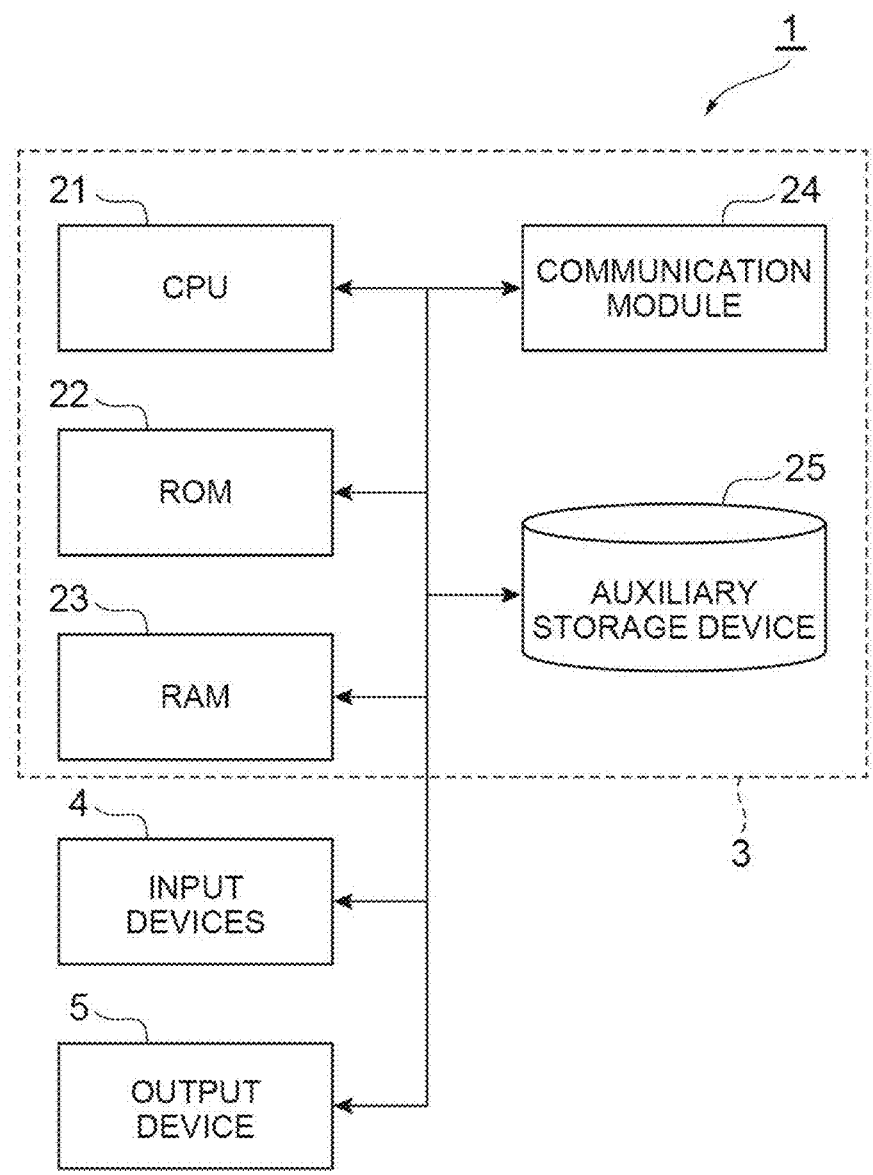
FIG. 1 is a schematic diagram showing a hardware configuration of a calculation device according to an embodiment.
Figure 2:
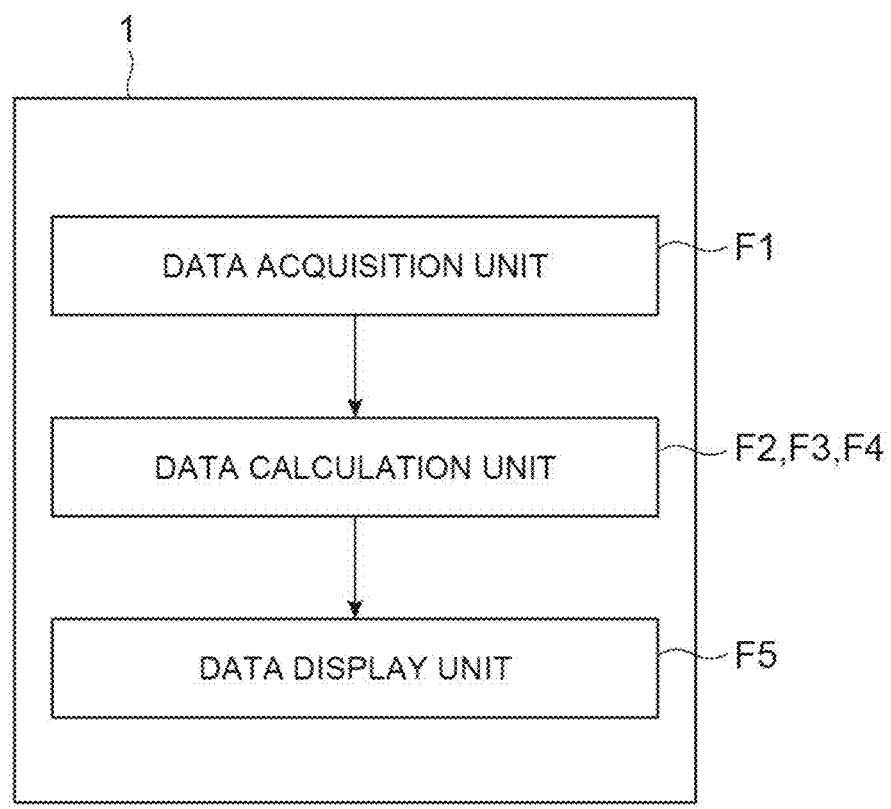
FIG. 2 is a schematic diagram showing a functional configuration of the calculation device according to the embodiment.
Figures 1, 21:
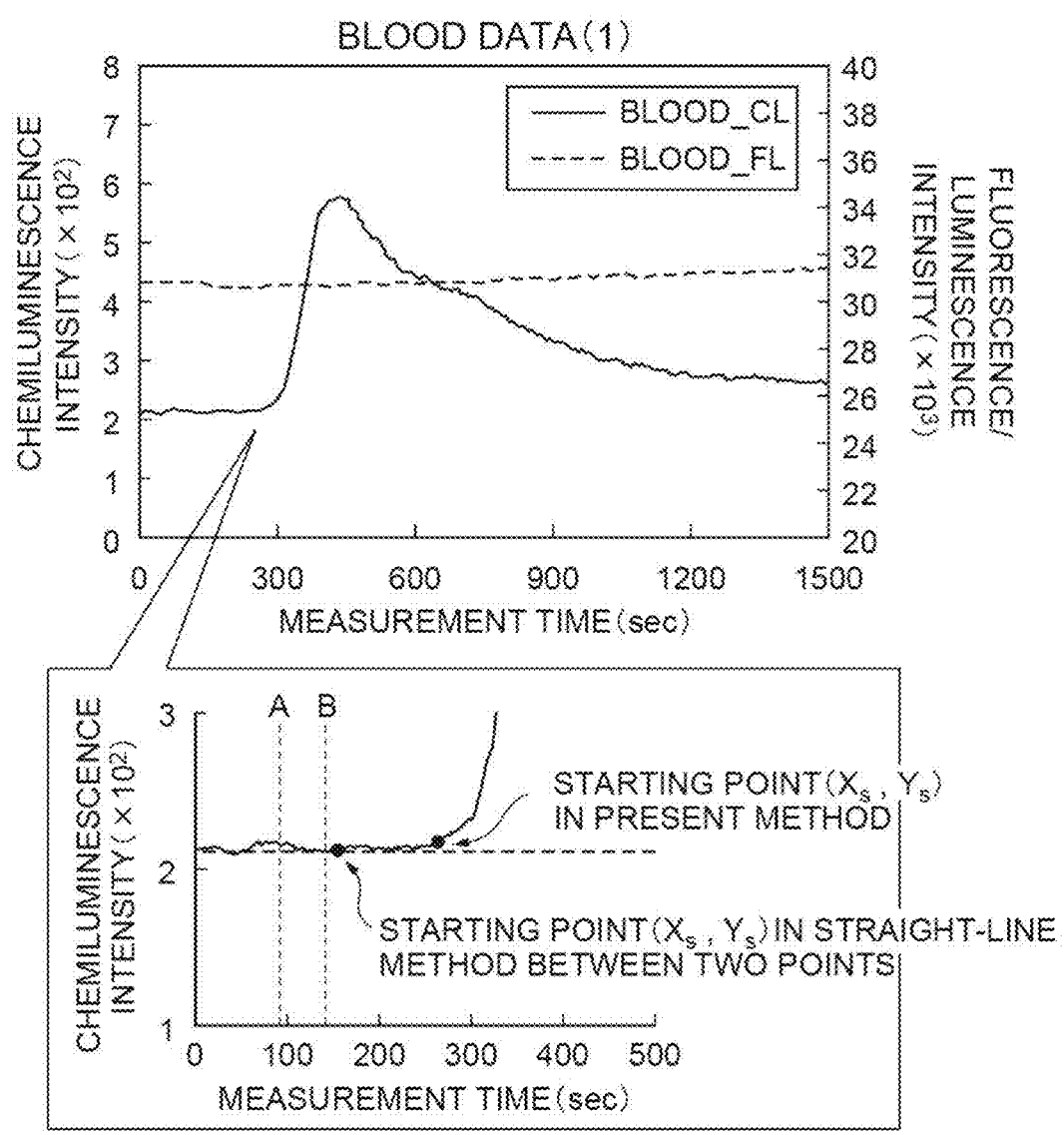
Figures 2, 21:
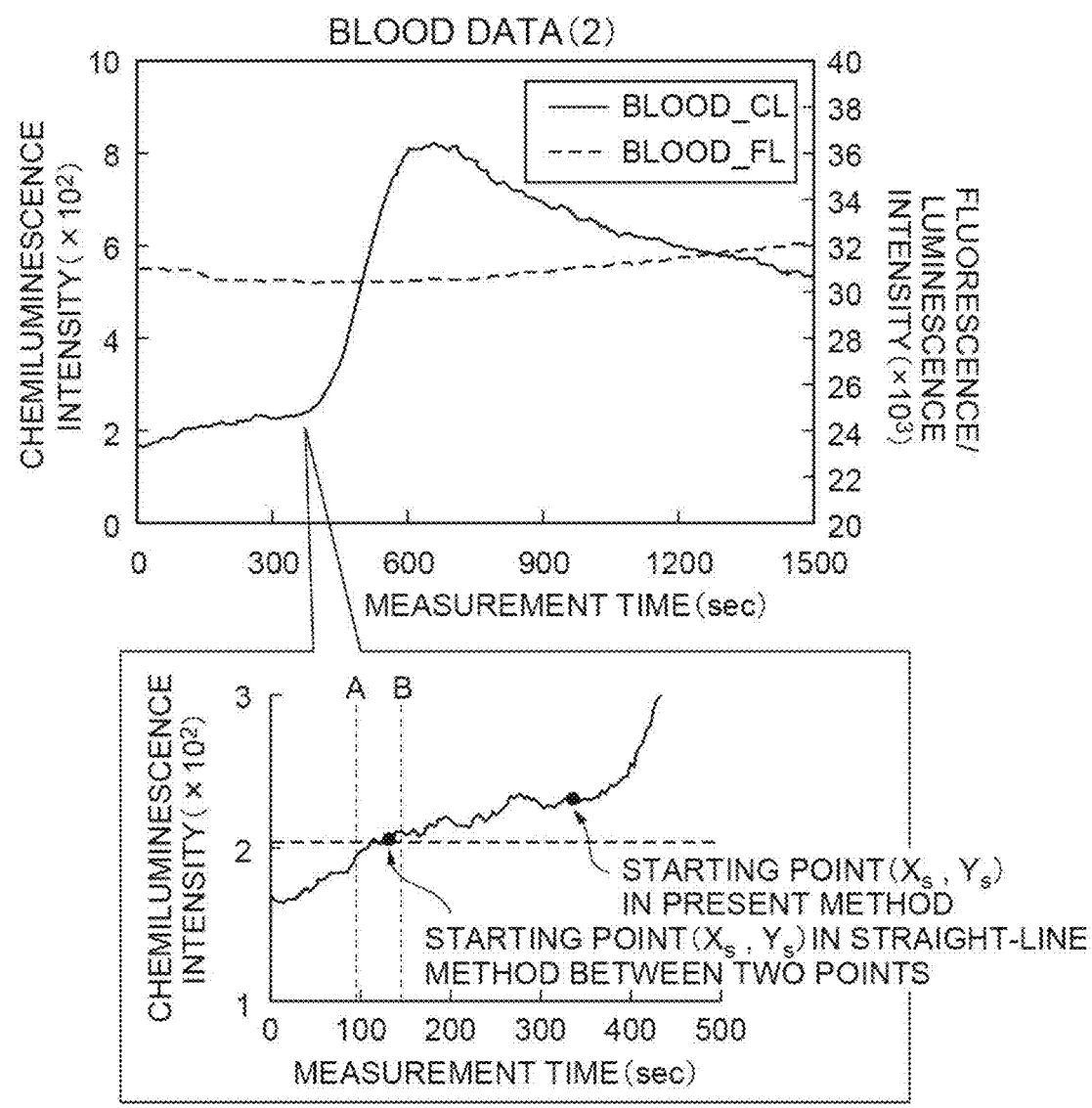

In FIG. 21-1 and FIG. 21-2, the starting point $(X_s, Y_s)$ calculated in the calculation method according to the present embodiment and the starting point $(X_s, Y_s)$ calculated in the conventional method (a straight-line method between two points) are shown for the chemiluminescence signal. It can be understood that the starting point $(X_s, Y_s)$ calculated in the calculation method according to the present embodiment is ascertained as the starting point of the signal rise more accurately as compared with the starting point in the conventional method.

Also, the calculation of the starting point $(X_s, Y_s)$ in the conventional method (the straight-line method between two points) was performed as follows. (A) A peak point $(X_p, Y_p)$ at which the chemiluminescence intensity becomes highest was calculated. (B) An average value Y of chemiluminescence intensities between any two points (A and B) before the addition of the reagent was obtained and a horizontal line of the average value Y was calculated as the line Yline. (C) An initial point included within a range in which an average value for each of five consecutive points is less than or equal to the line Yline consecutively three times retroactively from the $X_p$ value of the peak point was calculated as the starting point $(X_s, Y_s)$.

Figures 1, 22:
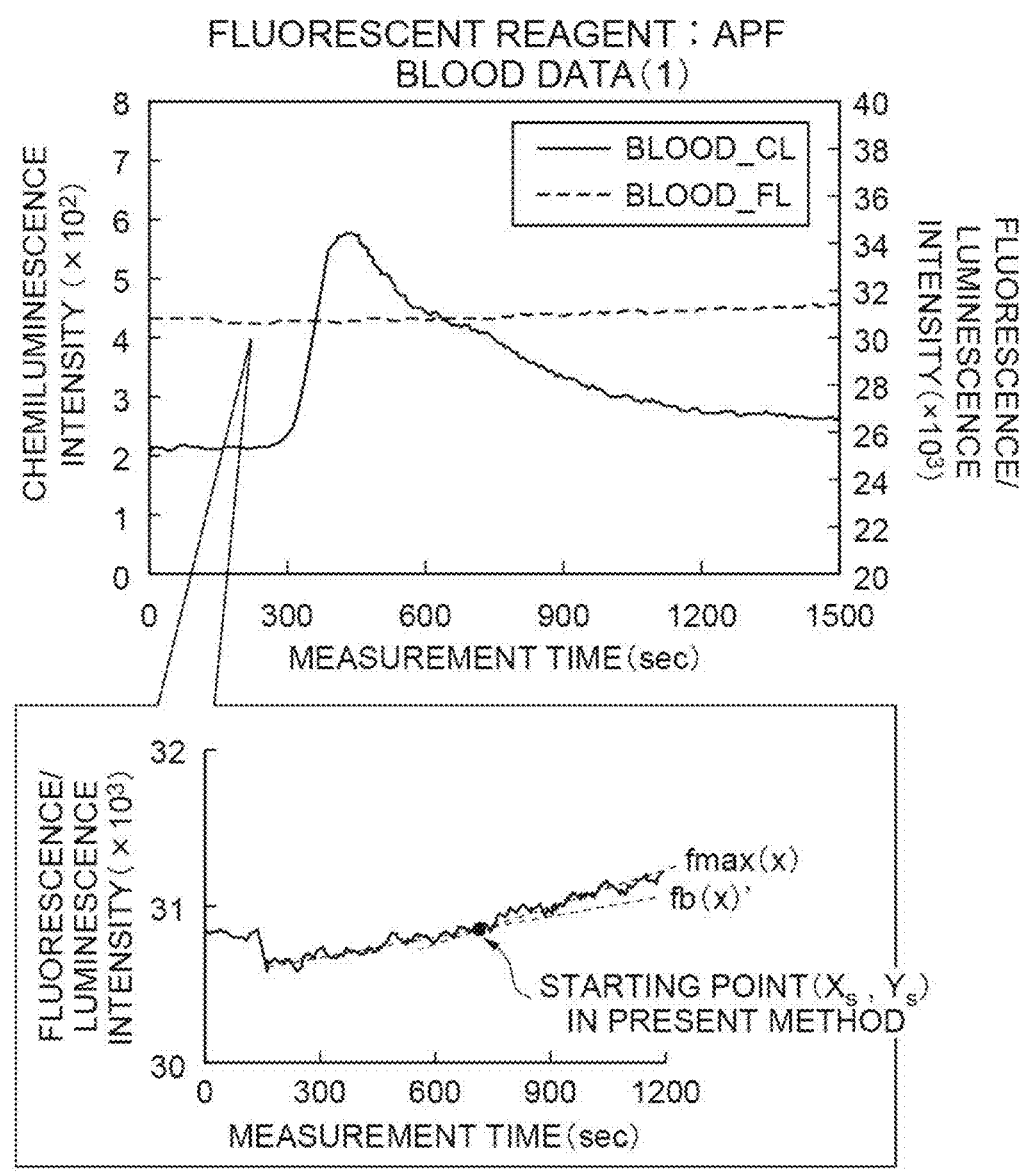
Figures 2, 22:
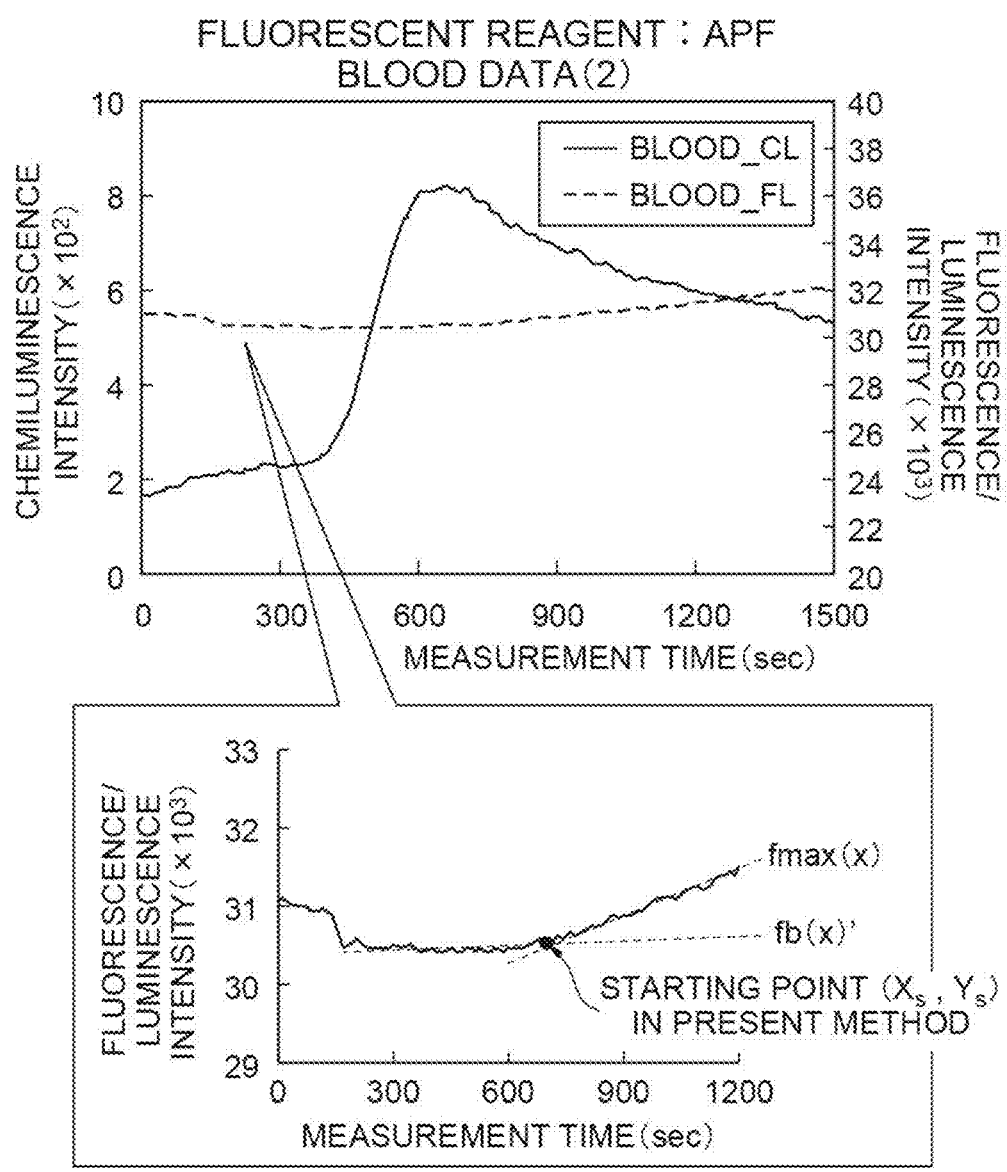

In FIG. 22-1 and FIG. 22-2, the starting point $(X_s, Y_s)$, the approximate line $f_{ibax}(x)$, and the approximate line $f_b(X)'$ calculated in the calculation method according to the present embodiment are shown with respect to the fluorescence signal. The approximate line $f_{max}(x)$ is a straight line that approximates the fluorescence signal that rises near the starting point. The approximate line $f_b(X)'$ is a straight line that approximates the baseline near the starting point. It can be understood that the starting point $(X_s, Y_s)$, the approximate line $f_{max}(x)$, and the approximate line $f_b(X)'$ calculated in the calculation method according to the present embodiment are ascertained more accurately with respect to the starting point of the signal rise and the increased signal intensity.

[Calculation Device and Calculation Program for Calculating Starting Point of Signal Rise and Increased Signal Intensity from Fluorescence Signal]

FIG. 1 is a schematic diagram showing a hardware configuration of a calculation device according to an embodiment and FIG. 2 is a schematic diagram showing a functional configuration of the calculation device according to the embodiment. The calculation device according to the embodiment can be used in combination with a fluorescence measurement device (not shown).

As shown in FIG. 1, the calculation device 1 is configured as a computer physically including a CPU 21, main storage devices such as a ROM 22 and a RAM 23, a communication module 24 such as a network card for transmitting and receiving data to and from other devices, an arithmetic storage device 3 including an auxiliary storage device 25 such as a hard disk, input devices 4 such as a keyboard and a mouse, and a display device 5 such as a display. Each function of the calculation device to be described below is implemented by loading predetermined computer software into hardware such as the CPU 21, the ROM 22, or the RAM 23 and operating the input devices 4, the display device 5, and the communication module 24 and reading and writing data from and to the main storage devices 22 and 23 and the auxiliary storage device 25 under control of the CPU 21.

The arithmetic storage device 3 is communicatively connected to a fluorescence measurement device or is electrically connected to the fluorescence measurement device. The arithmetic storage device 3 controls an output of measurement light from the light source of the fluorescence measurement device and acquires a detection signal from a fluorescence detector of the fluorescence measurement device. Also, the arithmetic storage device 3 acquires a fluorescence signal output from the fluorescence detector that detects fluorescence from the biological sample and acquires time-series data including a dataset (measurement time, fluorescence intensity) of the fluorescence intensity for the measurement time. Furthermore, the arithmetic storage device 3 calculates a temporary starting point $(X_{s'}, Y_{s'})$ from the time-series data and calculates a starting point $(X_s, Y_s)$ of signal rise from the temporary starting point $(X_{s'}, Y_{s'})$ data and the time-series data. Also, when the arithmetic storage device 3 is allowed to function as a calculation device for calculating the increased signal intensity, the arithmetic storage device 3 calculates the increased intensity of the fluorescence signal from the starting point $(X_s, Y_s)$ of the signal rise and the time-series data. The input devices 4 such as a keyboard and a mouse and the display device 5 such as a display are connected to the arithmetic storage device 3. The arithmetic storage device 3 is a personal computer; a smart device such as a smartphone or a tablet terminal; or a computer such as a cloud server to which the smart device is connected via a network. If the arithmetic storage device 3 is a smart device, the input devices 4 and the display device 5 are built into the smart device. Also, when the arithmetic storage device 3 is a cloud server, the input devices 4 and the display device 5 may be built into the smart device or may be electrically connected to a personal computer.

As shown in FIG. 2, the calculation device 1 includes a data acquisition unit F1, a first data calculation unit F2, a second data calculation unit F3, a third data calculation unit F4, and a data display unit F5 as functional components. The first data calculation unit F2, the second data calculation unit F3, and the third data calculation unit F4 may be combined. The data display unit F5 may be omitted if the display of data is unnecessary. Also, the calculation device 1 may further include a control unit when connected to a fluorescence measurement device.

The data acquisition unit F1 acquires a fluorescence signal output from a fluorescence detector having detected fluorescence from a biological sample and acquires time-series data including a dataset (measurement time, fluorescence intensity) of the fluorescence intensity for the measurement time. The data acquisition unit F1 may be a device that acquires time-series data from the fluorescence detector or may be a device that acquires time-series data directly input from an input device. The time-series data acquired by the data acquisition unit F1 may be stored in a data storage unit such as the auxiliary storage device 25.

The first data calculation unit F2 calculates a temporary starting point $(X_{s'}, Y_{s'})$ from the time-series data. The temporary starting point $(X_{s'}, Y_{s'})$ can be calculated by executing a process including: calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$ with respect to the time-series data; calculating a right end $X_2$ value for which an approximate line of the fluorescence signal having the $X_1$ value at the left end has a highest inclination; calculating an approximate line $f_{max}(x)$ having a highest inclination among approximate lines of fluorescence signal data having the $X_2$ value at a right end; calculating an intersection between the approximate line $f_{min}(x)$ and the approximate line $f_{max}(x)$ as a temporary criterion point $(X_{c'}, Y_{c'})$; and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$. In the first data calculation unit F2, the time-series data stored in the data storage unit such as the auxiliary storage device 25 may be read and used. Also, in the first data calculation unit F2, data of the calculated temporary starting point $(X_{s'}, Y_{s'})$ may be stored in the data storage unit such as the auxiliary storage device 25.

The second data calculation unit F3 calculates the starting point $(X_s, Y_s)$ of the signal rise from the data of the temporary starting point $(X_{s'}, Y_{s'})$ calculated by the first calculation unit and the time-series data. The starting point $(X_s, Y_s)$ of the signal rise can be calculated by executing a process including: calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled with respect to data of the temporary starting point $(X_{s'}, Y_{s'})$ and the time-series data; calculating an intersection between the approximate line $f_b(X)'$ and the approximate line $f_{max}(x)$ as a criterion point $(X_c, Y_c)$; calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$; and setting the starting point $(X_s, Y_s)$ as a starting point of signal rise. In the second data calculation unit F3, the data of the temporary starting point $(X_{s'}, Y_{s'})$ and/or the time-series data stored in the data storage unit such as the auxiliary storage device 25 may be read and used. Also, in the second data calculation unit F3, the data of the calculated starting point $(X_s, Y_s)$ may be stored in the data storage unit such as the auxiliary storage device 25.

The first data calculation unit F2 and the second data calculation unit F3 may be the same data calculation unit.

When the calculation device 1 is allowed to function as a calculation device that calculates the increased signal intensity, the third data calculation unit F4 calculates the increased intensity of the fluorescence signal from the data of the starting point $(X_s, Y_s)$ calculated by the second data calculation unit F3 and the time-series data. Also, when the calculation device 1 is allowed to function as a calculation device that calculates the starting point $(X_s, Y_s)$ of the signal rise, the third data calculation unit F4 is unnecessary. The increased intensity of the fluorescence signal can be calculated by executing a process including: calculating an average value Y of a fluorescence intensity from consecutive datasets of at least two points retroactively from an $X_s$ value of the starting point and calculating a horizontal line of the average value Y as a line Yline; setting a point at which a fluorescence intensity of the fluorescence signal is highest as a peak point $(X_p, Y_p)$ and calculating a Y value at a peak point $X_p$ value on the line Yline as a $Y_i$ value; calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled; calculating a Y value at a peak point $X_p$ value on the approximate line $f_b(x)$ as a $Y_b$ value; calculating a difference between a peak point $Y_p$ value and the $Y_1$ value as an increased intensity (l) of the fluorescence signal or calculating a difference between the peak point $Y_p$ value and the $Y_b$ value as an increased intensity (b) of the fluorescence signal; and setting the increased intensity (l) of the fluorescence signal or the increased intensity (b) of the fluorescence signal as the increased signal intensity. In the third data calculation unit F4, the data of the starting point ($X_s$, $Y_s$) and/or the time-series data stored in the data storage unit such as the auxiliary storage device 25 may be read and used. Also, in the third data calculation unit F4, the data of the calculated increased intensity of the fluorescence signal may be stored in the data storage unit such as the auxiliary storage device 25.

The first data calculation unit F2, the second data calculation unit F3, and the third data calculation unit F4 may be the same data calculation unit.

The data display unit F5 displays the data of the calculated starting point ($X_s$, $Y_s$) of the signal rise and/or the data of the increased intensity of the fluorescence signal.

The calculation device 1 may further include a control unit when connected to the fluorescence measurement device. The control unit, for example, controls the output of measurement light from the light source of the fluorescence measurement device and acquires a detection signal from the fluorescence detector of the fluorescence measurement device.

The calculation program according to the present embodiment allows a computer to function as the data acquisition unit F1, the first data calculation unit F2, the second data calculation unit F3, and the third data calculation unit F4 described above. The calculation program according to the present embodiment may allow the computer to further function as the data display unit F5 and the control unit described above. By loading the calculation program into the computer, the computer operates as a calculation device for calculating the starting point ($X_s$, $Y_s$) of the signal rise from the fluorescence signal measured using the biological sample or a calculation device for calculating the increased signal intensity from the fluorescence signal measured using the biological sample. A calculation program according to the present embodiment is recorded and provided in, for example, a computer-readable recording medium. The recording medium may be a non-transitory recording medium. Examples of recording media include recording media such as flexible discs, CDs, and DVDs, a recording medium such as a ROM, and semiconductor memories.

FIG. 3 is a flowchart showing a method of calculating the starting point of the signal rise and the increased signal intensity from the fluorescence signal according to the embodiment. In the method of calculating the starting point of the signal rise and the increased signal intensity from the fluorescence signal performed by the calculation device 1, the starting point of the signal rise and the increased signal intensity can be automatically calculated with high accuracy. Also, as a specific aspect of the method of calculating the starting point of signal rise and the increased signal intensity from the fluorescence signal, which is performed by the calculation device 1 to be described below, a specific aspect of the above-described [Method of calculating starting point of signal rise and increased signal intensity from fluorescence signal] can be applied.

First, the data acquisition unit F1 acquires the fluorescence signal output from the fluorescence detector having detected fluorescence from the biological sample and acquires the fluorescence signal as time-series data including a dataset (measurement time, fluorescence intensity) of the fluorescence intensity for the measurement time. The data acquisition unit F1 acquires the above-described parameters [F1] to [F13] as necessary (a data input and parameter setting step). The data input and parameter setting step may include storing the acquired time-series data and data of the parameters [F1] to [F13] in the data storage unit such as the auxiliary storage device 25. Acquisition of the time-series data and acquisition of the data of the parameters [F1] to [F13] may be performed at the same time or at different timings.

The first data calculation unit F2 executes a process including: a step of calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$ with respect to time-series data; a step of calculating a right end $X_2$ value for which an approximate line of the fluorescence signal having the $X_1$ value at the left end has a highest inclination; a step of calculating an approximate line $f_{max}(x)$ having a highest inclination among approximate lines of fluorescence signal data having the $X_2$ value at a right end; a step of calculating an intersection between the approximate line $f_{min}(x)$ and the approximate line $f_{max}(x)$ as a temporary criterion point ($X_{c'}$, $Y_{c'}$); and a step of calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{mim}(x)$ and a width wider than a noise width of the fluorescence signal as a temporary starting point ($X_{s'}$, $Y_{s'}$) (step i: search for the temporary starting point ($X_{s'}$, $Y_{s'}$)). Step i may include reading necessary parameters from the time-series data and the parameters [F1] to [F13] stored in the data storage unit such as the auxiliary storage device 25. Also, step i may include storing data of the calculated temporary starting point ($X_{s'}$, $Y_{s'}$) in the data storage unit such as the auxiliary storage device 25.

Subsequently, the second data calculation unit F3 executes a process including: a step of calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled; a step of calculating an intersection between the approximate line $f_b(X)'$ and the approximate line $f_{max}(x)$ as a criterion point ($X_c$, $Y_c$); a step of calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point ($X_s$, $Y_s$); and a step of setting the starting point ($X_s$, $Y_s$) as a starting point of signal rise (step ii: search for the starting point ($X_s$, $Y_s$)). Step ii may include reading necessary parameters from the time-series data, the data of the temporary starting point ($X_{s'}$, $Y_{s'}$), and the parameters [F1] to [F13] stored in the data storage unit such as the auxiliary storage device 25. Also, step ii may include storing the data of the calculated starting point ($X_s$, $Y_s$) in the data storage unit such as the auxiliary storage device 25.

When the calculation device 1 is allowed to function as a calculation device that calculates the starting point ($X_s$, $Y_s$) of the signal rise from the fluorescence signal, a step (an analysis result output step) in which the data display unit F5 displays the starting point ($X_s$, $Y_s$) calculated in step ii may be included.

Subsequently, the third data calculation unit F4 executes a process including: a step of calculating an average value Y of a fluorescence intensity from consecutive datasets of at least two points retroactively from an $X_s$ value of the starting point and calculating a horizontal line of the average value Y as a line Yline; a step of setting a point at which a fluorescence intensity of the fluorescence signal is highest as a peak point $(X_p, Y_p)$ and calculating a Y value at a peak point $X_p$ value on the line Yline as a $Y_l$ value; a step of calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled; a step of calculating a Y value at a peak point $X_p$ value on the approximate line $f_b(x)$ as a $Y_b$ value; a step of calculating a difference between the peak point $Y_p$ value and the $Y_l$ value as an increased intensity (l) of the fluorescence signal or calculating a difference between the peak point $Y_p$ value and the $Y_b$ value as an increased intensity (b) of the fluorescence signal, and a step of setting the increased intensity (l) of the fluorescence signal or the increased intensity (b) of the fluorescence signal as the increased signal intensity (step iii: total luminescence intensity calculation). Step iii may include reading the necessary parameters from the time-series data, the data of the starting point $(X_s, Y_s)$, and the parameters [F1] to [F13] stored in the data storage unit such as the auxiliary storage device 25. Also, step iii may include storing data of the calculated increased intensity of the fluorescence signal in the data storage unit such as the auxiliary storage device 25.

When the calculation device 1 is allowed to function as a calculation device that calculates the increased signal intensity from the fluorescence signal, a step (an analysis result output step) in which the data display unit F5 displays the increased intensity (l) of the fluorescence signal and/or the increased intensity (b) of the fluorescence signal calculated in step iii may be included.

[Calculation Device and Calculation Program for Calculating Starting Point of Signal Rise and Increased Signal Intensity from Chemiluminescence Signal]

Figure 4:
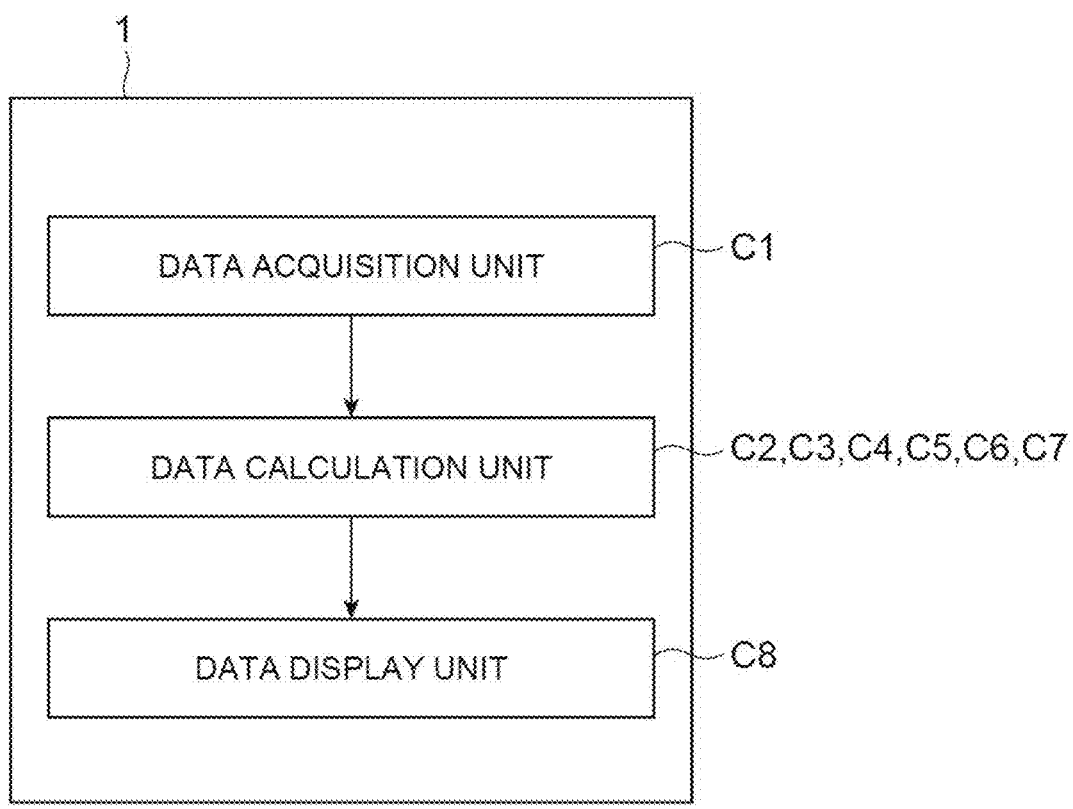
FIG. 4 is a schematic diagram showing a functional configuration of the calculation device according to the embodiment.

FIG. 1 is a schematic diagram showing the hardware configuration of the calculation device according to the embodiment and FIG. 4 is a schematic diagram showing a functional configuration of the calculation device according to the embodiment. The calculation device according to the embodiment can be used in combination with a luminescence measurement device (not shown).

As shown in FIG. 1, the calculation device 1 is configured as a computer physically including the CPU 21, the main storage devices such as the ROM 22 and the RAM 23, the communication module 24 such as a network card for transmitting and receiving data to and from other devices, the arithmetic storage device 3 including the auxiliary storage device 25 such as a hard disk, the input devices 4 such as a keyboard and a mouse, and the display device 5 such as a display. Each function of the calculation device to be described below is implemented by loading predetermined computer software into hardware such as the CPU 21, the ROM 22, or the RAM 23 and operating the input devices 4, the display device 5, and the communication module 24 and reading and writing data from and to the main storage devices 22 and 23 and the auxiliary storage device 25 under control of the CPU 21.

The arithmetic storage device 3 is communicatively connected to the luminescence measurement device or electrically connected to the luminescence measurement device. Also, the arithmetic storage device 3 controls the photodetection of the luminescence measurement device and/or acquires a detection signal from the photodetector of the luminescence measurement device. Also, the arithmetic storage device 3 acquires a chemiluminescence signal output from the photodetector that detects chemiluminescence from a biological sample and acquires time-series data including a dataset (measurement time, chemiluminescence intensity) of the chemiluminescence intensity for the measurement time. Furthermore, the arithmetic storage device 3 calculates a temporary starting point $(X_{s'}, Y_{s'})$ from the time-series data, calculates an initial starting point $(X_s, Y_s)$ from the temporary starting point $(X_{s'}, Y_{s'})$ data and the time-series data, calculates a criterion point $(X_c, Y_e)$ from the time-series data, and calculates the starting point $(X_s, Y_s)$ from the initial starting point data, the criterion point $(X_c, Y_e)$ data, and the time-series data. Also, when the arithmetic storage device 3 is allowed to function as a calculation device for calculating the increased signal intensity, the arithmetic storage device 3 calculates the end point $(X_e, Y_e)$ from the time-series data and calculates the increased intensity of the chemiluminescence signal from the starting point $(X_s, Y_s)$ data of the signal rise, the end point $(X_e, Y_e)$ data, and the time-series data. The input devices 4 such as a keyboard and a mouse and the display device 5 such as a display are connected to the arithmetic storage device 3. The arithmetic storage device 3 is a personal computer; a smart device such as a smartphone or a tablet terminal; or a computer such as a cloud server to which the smart device is connected via a network. If the arithmetic storage device 3 is a smart device, the input devices 4 and the display device 5 are built into the smart device. Also, when the arithmetic storage device 3 is a cloud server, the input devices 4 and the display device 5 may be built into the smart device or may be electrically connected to a personal computer.

As shown in FIG. 4, the calculation device 1 includes a data acquisition unit C1, a first data calculation unit C2, a second data calculation unit C3, a third data calculation unit C4, a fourth data calculation unit C5, a fifth data calculation unit C6, a sixth data calculation unit C7, and a data display unit C8 as functional components. The first data calculation unit C2, the second data calculation unit C3, the third data calculation unit C4, the fourth data calculation unit C5, the fifth data calculation unit C6, and the sixth data calculation unit C7 may be combined. The data display unit C8 may be omitted if the display of data is unnecessary. Also, the calculation device 1 may further include a control unit when connected to the luminescence measurement device.

The data acquisition unit C1 acquires a chemiluminescence signal output from a photodetector that detects chemiluminescence from a biological sample and acquires time-series data including a dataset (measurement time, chemiluminescence intensity) of the chemiluminescence intensity for the measurement time. The data acquisition unit C1 may be a device that acquires time-series data from a photodetector or may be a device that acquires time-series data directly input from an input device. The time-series data acquired by the data acquisition unit C1 may be stored in the data storage unit such as the auxiliary storage device 25.

The first data calculation unit C2 calculates a temporary starting point $(X_{s'}, Y_{s'})$ from the time-series data. The temporary starting point $(X_{s'}, Y_{s'})$ can be calculated by executing a process including: calculating a peak point $(X_p, Y_p)$ at which a chemiluminescence intensity is highest in a range after a timepoint when a reagent is added after the addition of the reagent, which causes a biological reaction, to the biological sample with respect to the time-series data;

calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$. In the first data calculation unit C2, the time-series data stored in the data storage unit such as the auxiliary storage device 25 may be read and used. Also, in the first data calculation unit C2, data of the calculated temporary starting point $(X_{s'}, Y_{s'})$ may be stored in the data storage unit such as the auxiliary storage device 25.

The second data calculation unit C3 calculates the initial starting point $(X_s, Y_s)$ from data of the temporary starting point $(X_{s'}, Y_{s'})$ calculated by the first data calculation unit C2 and the time-series data. The initial starting point $(X_s, Y_s)$ can be calculated by executing a process including: calculating an average value Y of the chemiluminescence intensity from consecutive datasets of at least two points retroactively from an $X_{s'}$ value of the temporary starting point with respect to the data of the temporary starting point $(X_{s'}, Y_{s'})$ and the time-series data and calculating a horizontal line of the average value Y as a line Yline; and calculating an initial point included in a range including a value obtained through addition between the average value Y and standard deviation or less retroactively from an $X_p$ value of the peak point as the initial starting point $(X_s, Y_s)$. In the second data calculation unit C3, the data of the temporary starting point $(X_{s'}, Y_{s'})$ and/or the time-series data stored in the data storage unit such as the auxiliary storage device 25 may be read and used. Also, in the second data calculation unit C3, data of the calculated initial starting point $(X_s, Y_s)$ may be stored in the data storage unit such as the auxiliary storage device 25.

The third data calculation unit C4 calculates the criterion point $(X_c, Y_c)$ from the time-series data. The criterion point $(X_c, Y_c)$ can be calculated by executing a process including: calculating a left end $X_1$ value at which an approximate line of the chemiluminescence signal having the $X_p$ value of the peak point at a right end has a highest inclination with respect to the time-series data; calculating a right end $X_2$ value at which an approximate line of the chemiluminescence signal having the $X_1$ value at a left end has a highest inclination within a range up to the $X_p$ value of the peak point; calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_c)$. In the third data calculation unit C4, the time-series data stored in the data storage unit such as the auxiliary storage device 25 may be read and used. Also, in the third data calculation unit C4, data of the calculated criterion point $(X_c, Y_c)$ may be stored in the data storage unit such as the auxiliary storage device 25.

The fourth data calculation unit C5 calculates the starting point $(X_s, Y_s)$ from the initial starting point data calculated by the second data calculation unit C3, the criterion point $(X_c, Y_c)$ data calculated by the third data calculation unit C4, and the time-series data. The starting point $(X_s, Y_s)$ can be calculated by executing a process including calculating the initial starting point as the starting point $(X_s, Y_s)$ when a difference ($X_c$ value−$X_s$ value) between the $X_c$ value of the criterion point and the $X_s$ value of the initial starting point is less than a recalculated reference value with respect to the initial starting point data, the criterion point $(X_c, Y_c)$ data, and the time-series data; calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value−$X_s$ value) between the $X_c$ value of the criterion point and the $X_s$ value of the initial starting point is greater than or equal to the recalculated reference value; and setting the starting point $(X_s, Y_s)$ as a starting point of signal rise. In the fourth data calculation unit C5, the initial starting point data, the criterion point $(X_c, Y_c)$ data, and/or the time-series data stored in the data storage unit such as the auxiliary storage device 25 may be read and used. Also, in the fourth data calculation unit C5, data of the calculated starting point $(X_s, Y_s)$ may be stored in the data storage unit such as the auxiliary storage device 25.

The first data calculation unit C2, the second data calculation unit C3, the third data calculation unit C4, and the fourth data calculation unit C5 may be the same data calculation unit.

When the calculation device 1 is allowed to function as a calculation device that calculates the increased signal intensity, the calculation device 1 further includes a fifth data calculation unit C6 and a sixth data calculation unit C7. When the calculation device 1 is allowed to function as a calculation device for calculating the starting point $(X_s, Y_s)$ of the signal rise, the fifth data calculation unit C6 and the sixth data calculation unit C7 are unnecessary.

The fifth data calculation unit C6 calculates the end point $(X_e, Y_e)$ from the time-series data. The end point $(X_e, Y_e)$ can be calculated by executing a process including calculating an initial point included in a range in which a moving average calculated from consecutive datasets of at least two points is less than or equal to the line Yline consecutively at least twice after the $X_p$ value of the peak point as the end point $(X_e, Y_e)$ with respect to the time-series data. In the fifth data calculation unit C6, the time-series data stored in the data storage unit such as the auxiliary storage device 25 may be read and used. Also, in the fifth data calculation unit C6, data of the calculated end point $(X_e, Y_e)$ may be stored in the data storage unit such as the auxiliary storage device 25.

The sixth data calculation unit C7 calculates the increased intensity of the chemiluminescence signal from the starting point $(X_s, Y_s)$ data of signal rise calculated by the fourth data calculation unit C5, the end point $(X_e, Y_e)$ data calculated by the fifth data calculation unit C6, and the time-series data. The increased intensity of the chemiluminescence signal can be calculated by executing a process including setting the line Yline as a baseline with respect to the starting point $(X_s, Y_s)$ data, the end point $(X_e, Y_e)$ data, and the time-series data, calculating an integral value of a chemiluminescence intensity from an $X_s$ value of the starting point to an $X_e$ value of the end point, and setting the integral value as the increased signal intensity. In the sixth data calculation unit C7, the starting point $(X_s, Y_s)$ data, the end point $(X_e, Y_e)$ data, and/or the time-series data stored in the data storage unit such as the auxiliary storage device 25 may be read and used. Also, in the sixth data calculation unit C7, data of the calculated integral value of the chemiluminescence intensity may be stored in the data storage unit such as the auxiliary storage device 25.

The first data calculation unit C2, the second data calculation unit C3, the third data calculation unit C4, the fourth data calculation unit C5, the fifth data calculation unit C6, and the sixth data calculation unit C7 may be the same data calculation unit.

The data display unit C8 displays the data of the calculated starting point $(X_s, Y_s)$ of the signal rise and/or the data of the integral value of the chemiluminescence intensity.

The calculation device 1 may further include a control unit when connected to a luminescence measurement device. The control unit, for example, controls the photodetection of the luminescence measurement device and acquires a detection signal from the photodetector of the luminescence measurement device.

The calculation program according to the present embodiment allows a computer to function as the data acquisition unit C1, the first data calculation unit C2, the second data calculation unit C3, the third data calculation unit C4, the fourth data calculation unit C5, the fifth data calculation unit C6, and the sixth data calculation unit C7 described above. The calculation program according to the present embodiment may allow the computer to further function as the data display unit C8 and the control unit described above. By loading the calculation program into the computer, the computer operates as a calculation device for calculating the starting point $(X_s, Y_s)$ of the signal rise from the chemiluminescence signal measured using the biological sample or a calculation device for calculating the increased signal intensity from the chemiluminescence signal measured using the biological sample. A calculation program according to the present embodiment is recorded and provided in, for example, a computer-readable recording medium. The recording medium may be a non-transitory recording medium. Examples of recording media include recording media such as flexible discs, CDs, and DVDs, a recording medium such as a ROM, and semiconductor memories.

FIG. 5 is a flowchart showing a method of calculating the starting point of the signal rise and the increased signal intensity from the chemiluminescence signal according to the embodiment. In the method of calculating the starting point of the signal rise and the increased signal intensity from the chemiluminescence signal performed by the calculation device 1, the starting point of the signal rise and the increased signal intensity can be automatically calculated with high accuracy. Also, as a specific aspect of the method of calculating the starting point of signal rise and the increased signal intensity from the chemiluminescence signal, which is performed by the calculation device 1 to be described below, a specific aspect of the above-described [Method of calculating starting point of signal rise and increased signal intensity from chemiluminescence signal] can be applied.

First, the data acquisition unit C1 acquires the chemiluminescence signal output from the photodetector having detected chemiluminescence from the biological sample and acquires the chemiluminescence signal as time-series data including a dataset (measurement time, chemiluminescence intensity) of the fluorescence intensity for the measurement time. The data acquisition unit C1 acquires the above-described parameters [C1] to [C16] as necessary (a data input and parameter setting step). The data input and parameter setting step may include storing the acquired time-series data and data of the parameters [C1] to [C16] in the data storage unit such as the auxiliary storage device 25. Acquisition of the time-series data and acquisition of the data of the parameters [C1] to [C16] may be performed at the same time or at different timings.

Subsequently, the first data calculation unit C2 executes a process including: calculating a peak point $(X_p, Y_p)$ at which a chemiluminescence intensity is highest in a range after a timepoint when a reagent is added after the addition of the reagent, which causes a biological reaction, to the biological sample with respect to the time-series data; calculating a bottom point $(X_b, Y_b)$ at which a chemiluminescence intensity is lowest within a range up to an $X_p$ value of the peak point from a timepoint when disturbance of a chemiluminescence signal due to the addition of the reagent has settled; and calculating an initial point at which a moving average calculated from consecutive datasets of at least two points retroactively from the $X_p$ value of the peak point is consecutively included at least twice within a range including a value obtained through addition between a $Y_b$ value of the bottom point and a noise width of the chemiluminescence signal or less as the temporary starting point $(X_{s'}, Y_{s'})$ (step i: search for the temporary starting point $(X_{s'}, Y_{s'})$). Step i may include reading necessary parameters from the time-series data and the parameters [C1] to [C16] stored in the data storage unit such as the auxiliary storage device 25. Also, step i may include storing data of the calculated temporary starting point $(X_{s'}, Y_{s'})$ in the data storage unit such as the auxiliary storage device 25.

Subsequently, the second data calculation unit C3 executes a process including: calculating an average value Y of the chemiluminescence intensity from consecutive datasets of at least two points retroactively from an $X_{s'}$ value of the temporary starting point with respect to the data of the temporary starting point $(X_{s'}, Y_{s'})$ and the time-series data) and calculating a horizontal line of the average value Y as a line Yline; and calculating an initial point included in a range including a value obtained through addition between the average value Y and standard deviation or less retroactively from an $X_p$ value of the peak point as the initial starting point $(X_s, Y_s)$ (step ii: search for the initial starting point $(X_s, Y_s)$). Step ii may include reading necessary parameters from the time-series data, the data of the temporary starting point $(X_{s'}, Y_{s'})$, and the parameters [C1] to [C16] stored in the data storage unit such as the auxiliary storage device 25. Also, step ii may include storing the data of the calculated starting point $(X_s, Y_s)$ in the data storage unit such as the auxiliary storage device 25.

Subsequently, the third data calculation unit C4 executes a process including: calculating a left end $X_1$ value at which an approximate line of the chemiluminescence signal having the $X_p$ value of the peak point at a right end has a highest inclination with respect to the time-series data; calculating a right end $X_2$ value at which an approximate line of the chemiluminescence signal having the $X_1$ value at a left end has a highest inclination within a range up to the $X_p$ value of the peak point; calculating an approximate line $f_{max}(x)$ having a highest inclination among approximate lines of the chemiluminescence signal when the $X_2$ value is at a right end and a left end is within a range up to the $X_1$ value; and calculating an intersection between the approximate line $f_{max}(x)$ and the line Yline as the criterion point $(X_c, Y_c)$ (step iii: calculation of the criterion point $(X_c, Y_c)$). Step iii may include reading necessary parameters from the time-series data and the parameters [C1] to [C16] stored in the data storage unit such as the auxiliary storage device 25. Also, step iii may include storing data of the calculated criterion point $(X_c, Y_c)$ in the data storage unit such as the auxiliary storage device 25.

Subsequently, the fourth data calculation unit C5 executes a process including: calculating the initial starting point as the starting point $(X_s, Y_s)$ when a difference $(X_c$ value$-X_s$ value) between the $X_c$ value of the criterion point and the $X_s$ value of the initial starting point is less than a recalculated reference value with respect to the initial starting point data, the criterion point $(X_c, Y_c)$ data, and the time-series data; calculating an initial point at which an average value calculated for each of the consecutive datasets of at least two points is greater than or equal to a previous average value consecutively at least twice after an $X_s$ value of the initial starting point as the starting point $(X_s, Y_s)$ when the difference ($X_c$ value–$X_s$ value) between the $X_c$ value of the criterion point and the $X_s$ value of the initial starting point is greater than or equal to the recalculated reference value; and setting the starting point $(X_s, Y_s)$ as a starting point of signal rise (step iv: starting point calculation). Step iv may include reading necessary parameters from initial starting point data, criterion point $(X_c, Y_c)$ data, time-series data, and the parameters [C1] to [C16] stored in the data storage unit such as the auxiliary storage device 25. Also, step iv may include storing data of the calculated starting point $(X_s, Y_s)$ in the data storage unit such as the auxiliary storage device 25.

When the calculation device 1 is allowed to function as a calculation device that calculates the starting point $(X_s, Y_s)$ of the signal rise from the chemiluminescence signal, a step (an analysis result output step) in which the data display unit C8 displays the starting point $(X_s, Y_s)$ calculated in step iv may be included.

Subsequently, the fifth data calculation unit C6 executes a process including calculating an initial point included in a range in which a moving average calculated from consecutive datasets of at least two points is less than or equal to the line Yline consecutively at least twice after the $X_p$ value of the peak point as the end point $(X_e, Y_e)$ with respect to the time-series data (step v: search for the end point $(X_e, Y_e)$). Step v may include reading necessary parameters from the time-series data and the parameters [C1] to [C16] stored in the data storage unit such as the auxiliary storage device 25. Also, step v may include storing data of the calculated end point $(X_e, Y_e)$ in the data storage unit such as the auxiliary storage device 25.

Subsequently, the sixth data calculation unit C7 executes a process including setting the line Yline as a baseline with respect to the starting point $(X_s, Y_s)$ data of the signal rise, the end point $(X_e, Y_e)$ data, and the time-series data, calculating an integral value of a chemiluminescence intensity from an $X_s$ value of the starting point to an $X_e$ value of the end point, and setting the integral value as the increased signal intensity (step vi: integral value calculation). Step vi may include reading necessary parameters from the starting point $(X_s, Y_s)$ data, the end point $(X_e, Y_e)$ data, the time-series data, and the parameters [C1] to [C16] stored in the data storage unit such as the auxiliary storage device 25. Also, step vi may include storing data of the calculated integral value of the chemiluminescence intensity in the data storage unit such as the auxiliary storage device 25.

When the calculation device 1 is allowed to function as a calculation device that calculates the increased signal intensity from the chemiluminescence signal, a step (an analysis result output step) in which the data display unit C8 displays the integral value of the chemiluminescence intensity calculated in step vi may be included.

What is claimed is:

1. A calculation method of calculating a starting point $(X_s, Y_s)$ of signal rise from a fluorescence signal measured using a biological sample, wherein the fluorescence signal is time-series data including a dataset (measurement time, fluorescence intensity) of the fluorescence intensity for the measurement time, wherein the calculation method includes:

a process of calculating a temporary starting point $(X_{s'}, Y_{s'})$; and a process of calculating the starting point $(X_s, Y_s)$ of the signal rise on the basis of the temporary starting point $(X_{s'}, Y_{s'})$, wherein the process of calculating the temporary starting point $(X_{s'}, Y_{s'})$ includes steps of:

calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;

calculating a right end $X_2$ value for which an approximate line of the fluorescence signal having the $X_1$ value at the left end has a highest inclination;

calculating an approximate line $f_{max}(x)$ having a highest inclination among approximate lines of fluorescence signal data having the $X_2$ value at a right end;

calculating an intersection between the approximate line $f_{min}(x)$ and the approximate line $f_{max}(x)$ as a temporary criterion point $(X_{c'}, Y_{c'})$; and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, wherein the process of calculating the starting point $(X_s, Y_s)$ includes steps of:

calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;

calculating an intersection between the approximate line $f_b(X)'$ and the approximate line $f_{max}(x)$ as a criterion point $(X_c, Y_c)$; and calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$, and wherein the starting point $(X_s, Y_s)$ is set as a starting point of signal rise.

2. A calculation method of calculating an increased signal intensity from a fluorescence signal measured using a biological sample, the calculation method comprising:

a process of calculating a starting point $(X_s, Y_s)$ of signal rise in the calculation method according to claim 1; and a process of calculating an increased intensity of the fluorescence signal on the basis of the starting point $(X_s, Y_s)$, wherein the process of calculating the increased intensity of the fluorescence signal includes steps of:

calculating an average value Y of a fluorescence intensity from consecutive datasets of at least two points retroactively from an $X_s$ value of the starting point and calculating a horizontal line of the average value Y as a line Yline;

setting a point at which a fluorescence intensity of the fluorescence signal is highest as a peak point $(X_p, Y_p)$ and calculating a Y value at a peak point $X_p$ value on the line Yline as a $Y_l$ value;

calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;

calculating a Y value at a peak point $X_p$ value on the approximate line $f_b(x)$ as a $Y_b$ value; and calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal, and wherein the increased intensity (l) of the fluorescence signal or the increased intensity (b) of the fluorescence signal is set as the increased signal intensity.

3. A calculation device for calculating a starting point $(X_s, Y_s)$ of signal rise from a fluorescence signal measured using a biological sample, the calculation device comprising:

a data acquisition unit configured to acquire the fluorescence signal as time-series data including a dataset (measurement time, fluorescence intensity) of the fluorescence intensity for the measurement time;

a first calculation unit configured to calculate a temporary starting point $(X_{s'}, Y_{s'})$ by processing time-series data acquired by the data acquisition unit; and a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit, wherein the first calculation unit executes a process including:

calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;

calculating a right end $X_2$ value for which an approximate line of the fluorescence signal having the $X_1$ value at the left end has a highest inclination;

calculating an approximate line $f_{max}(x)$ having a highest inclination among approximate lines of fluorescence signal data having the $X_2$ value at a right end;

calculating an intersection between the approximate line $f_{min}(x)$ and the approximate line $f_{max}(x)$ as a temporary criterion point $(X_{c'}, Y_{c'})$; and calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and wherein the second calculation unit executes a process including:

calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;

calculating an intersection between the approximate line $f_b(X)'$ and the approximate line $f_{max}(x)$ as a criterion point $(X_c, Y_c)$;

calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$; and setting the starting point $(X_s, Y_s)$ as a starting point of signal rise.

4. A calculation device for calculating an increased signal intensity from a fluorescence signal measured using a biological sample, the calculation device comprising:

in addition to the calculation device according to claim 3, a third calculation unit configured to calculate an increased intensity of the fluorescence signal by processing data of the starting point $(X_s, Y_s)$ of the signal rise calculated by the second calculation unit and time-series data acquired by the data acquisition unit, wherein the third calculation unit executes a process including:

calculating an average value Y of a fluorescence intensity from consecutive datasets of at least two points retroactively from an $X_s$ value of the starting point and calculating a horizontal line of the average value Y as a line Yline;

setting a point at which a fluorescence intensity of the fluorescence signal is highest as a peak point $(X_p, Y_p)$ and calculating a Y value at a peak point $X_p$ value on the line Yline as a $Y_l$ value;

calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;

calculating a Y value at a peak point $X_p$ value on the approximate line $f_b(x)$ as a $Y_b$ value; and calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and setting the increased intensity (l) of the fluorescence signal or the increased intensity (b) of the fluorescence signal as the increased signal intensity.

5. A calculation program for calculating a starting point $(X_s, Y_s)$ of signal rise from a fluorescence signal measured using a biological sample, the calculation program causing a computer to function as:
- a data acquisition unit configured to acquire the fluorescence signal as time-series data including a dataset (measurement time, fluorescence intensity) of the fluorescence intensity for the measurement time;
- a first calculation unit configured to calculate a temporary starting point $(X_{s'}, Y_{s'})$ by processing time-series data acquired by the data acquisition unit; and
- a second calculation unit configured to calculate the starting point $(X_s, Y_s)$ of the signal rise by processing data of the temporary starting point $(X_{s'}, Y_{s'})$ calculated by the first calculation unit and time-series data acquired by the data acquisition unit,
- wherein the first calculation unit executes a process including:
- calculating an approximate line $f_{min}(x)$ having a lowest inclination among approximate lines of the fluorescence signal having a timepoint when disturbance of the fluorescence signal due to addition of a reagent, which causes a biological reaction, after the addition of the reagent to the biological sample has settled at a left end and a right end $X_1$ value of the approximate line $f_{min}(x)$;
- calculating a right end $X_2$ value for which an approximate line of the fluorescence signal having the $X_1$ value at the left end has a highest inclination;
- calculating an approximate line $f_{max}(x)$ having a highest inclination among approximate lines of fluorescence signal data having the $X_2$ value at a right end;
- calculating an intersection between the approximate line $f_{min}(x)$ and the approximate line $f_{max}(x)$ as a temporary criterion point $(X_{c'}, Y_{c'})$; and
- calculating an initial point at which a moving average calculated from consecutive datasets of at least two points retroactively from an $X_{c'}$ value of the temporary criterion point is consecutively included at least twice within a range including values obtained through addition and subtraction between the approximate line $f_{min}(x)$ and a width wider than a noise width of the fluorescence signal as a temporary starting point $(X_{s'}, Y_{s'})$, and
- wherein the second calculation unit executes a process including:
- calculating an approximate line $f_b(X)'$ having a lowest inclination among approximate lines of the fluorescence signal when the $X_{s'}$ value of the temporary starting point is at a right end and a left end is within a range after a timepoint when disturbance of the fluorescence signal due to addition of a reagent has settled;
- calculating an intersection between the approximate line $f_b(X)'$ and the approximate line $f_{max}(x)$ as a criterion point $(X_c, Y_c)$;
- calculating an initial point at which a moving average calculated from consecutive datasets of at least two points retroactively from an $X_c$ value of the criterion point is consecutively included at least twice within a range including values obtained through addition and subtraction between the approximate line $f_b(X)'$ and a noise width of the fluorescence signal as a starting point $(X_s, Y_s)$, and
- setting the starting point $(X_s, Y_s)$ as a starting point of signal rise.

6. A calculation program for calculating an increased signal intensity from a fluorescence signal measured using a biological sample, the calculation program causing a computer to function as:
- in addition to the calculation program according to claim 3, a third calculation unit configured to calculate an increased intensity of the fluorescence signal by processing data of the starting point $(X_s, Y_s)$ of the signal rise calculated by the second calculation unit and the time-series data acquired by the data acquisition unit,
- wherein the third calculation unit executes a process including:
- calculating an average value Y of a fluorescence intensity from consecutive datasets of at least two points retroactively from an $X_s$ value of the starting point and calculating a horizontal line of the average value Y as a line Yline;
- setting a point at which a fluorescence intensity of the fluorescence signal is highest as a peak point $(X_p, Y_p)$ and calculating a Y value at a peak point $X_p$ value on the line Yline as a $Y_l$ value;
- calculating an approximate line $f_b(x)$ having a lowest inclination among approximate lines of the fluorescence signal when the $X_s$ value of the starting point is at a right end and a left end is within a range after a timepoint when disturbance of the fluorescence signal due to addition of a reagent has settled;
- calculating a Y value at a peak point $X_p$ value on the approximate line $f_b(x)$ as a $Y_b$ value;
- calculating a difference between a peak point $Y_p$ value and the $Y_l$ value as an increased intensity (l) of the fluorescence signal or calculating a difference between the peak point $Y_p$ value and the $Y_b$ value as an increased intensity (b) of the fluorescence signal; and
- setting the increased intensity (l) of the fluorescence signal or the increased intensity (b) of the fluorescence signal as the increased signal intensity.

* * * * *